(12) United States Patent
Hayrabedian

(10) Patent No.: US 11,188,962 B2
(45) Date of Patent: Nov. 30, 2021

(54) SYSTEM AND METHOD FOR MANAGING A REQUEST FOR ROADSIDE ASSISTANCE

(71) Applicant: LETSTOW TRANSPORT INC., Laval (CA)

(72) Inventor: Gary Hayrabedian, Laval (CA)

(73) Assignee: Letstow Transport Inc., Laval (CA)

( * ) Notice: Subject to any disclaimer, the term of this patent is extended or adjusted under 35 U.S.C. 154(b) by 74 days.

(21) Appl. No.: 16/299,345

(22) Filed: Mar. 12, 2019

(65) Prior Publication Data

US 2019/0279266 A1 Sep. 12, 2019

Related U.S. Application Data

(60) Provisional application No. 62/641,647, filed on Mar. 12, 2018.

(51) Int. Cl.
| | |
|---|---|
| *G06Q 30/00* | (2012.01) |
| *G06Q 30/06* | (2012.01) |
| *G06Q 20/40* | (2012.01) |
| *G06Q 20/10* | (2012.01) |
| *G06Q 20/12* | (2012.01) |
| *H04W 4/40* | (2018.01) |

(52) U.S. Cl.
CPC ......... *G06Q 30/0611* (2013.01); *G06Q 20/10* (2013.01); *G06Q 20/127* (2013.01); *G06Q 20/407* (2013.01); *H04W 4/40* (2018.02)

(58) Field of Classification Search
CPC .................................................... G06Q 30/00
See application file for complete search history.

(56) References Cited

U.S. PATENT DOCUMENTS

| | | | |
|---|---|---|---|
| 9,659,301 B1* | 5/2017 | Briggs | G06F 16/22 |
| 10,255,570 B1* | 4/2019 | Brandmaier | G06Q 10/063114 |
| 10,559,038 B1* | 2/2020 | Chen | B60R 16/0234 |
| 2002/0120554 A1* | 8/2002 | Vega | G06Q 30/02 |
| | | | 705/37 |

(Continued)

OTHER PUBLICATIONS appdupe.com, Complete Uber for trucks script, pulled from Wayback machine, dated Jul. 5, 2017. (Year: 2017).*

(Continued)

*Primary Examiner* — Mark A Fadok
(74) *Attorney, Agent, or Firm* — Crowell & Moring LLP

(57) ABSTRACT

A system and method for managing a request for roadside assistance includes receiving an electronic roadside assistance request made from a driver device. A set of available provider entities matching parameters of the request are determined. An electronic roadside assistance solicitation is transmitted to each of the available providers. Electronic roadside assistance offers made by a subset of the provider entities are received, each offer defining a respective offer price and an estimated time of arrival. The received offers are transmitted to the driver device. A response from the driver device indicating an acceptance one of the offers is further received. Electronic payment corresponding to the offer price is also received. A notification to an operator device associated to the provider entity of the accepted offer is further transmitted, the notification indicating the parameters of the roadside assistance request. The system and method are also applicable transportation assistance.

24 Claims, 66 Drawing Sheets

(56) References Cited

U.S. PATENT DOCUMENTS

2013/0246301 A1* 9/2013 Radhakrishnan .. G06Q 30/0282
705/347
2017/0352125 A1* 12/2017 Dicker ............... G06Q 10/1097
2019/0197647 A1* 6/2019 Battleson ............... G06Q 50/30

OTHER PUBLICATIONS

Lohoti, Nitin, Uber for tow trucks App—get roadside assistance on demand, Mobisoft, dated Dec. 14, 2017 (Year: 2017).*
Khald, Amald, "The roadside assistance apps that could make AAA a thing of the past", DailyDot, 2014. (Year: 2014).*
Tow Choice, Want More Call Volume for Your Towing Business?, Website page: https://web.archive.org/web/20170712192332/https://towchoice.com/.

* cited by examiner

Fig. 58

SYSTEM AND METHOD FOR MANAGING A REQUEST FOR ROADSIDE ASSISTANCE

RELATED PATENT APPLICATION

The present application claims priority from U.S. provisional patent application No. 62/641,647, filed Mar. 12, 2018 and entitled "SYSTEM AND METHOD FOR MANAGING A REQUEST FOR ROADSIDE ASSISTANCE", the disclosure of which is hereby incorporated by reference in its entirety.

TECHNICAL FIELD

The present disclosure generally relates to a system and method for managing a request for roadside assistance, and more particularly to a system and method in which a driver requiring roadside assistance can electronically request, from a mobile user device, the assistance and select amongst one or more providers available to provide the assistance. The system and method can further resolve payment between the driver and the provider based on different outcomes of the assistance service.

BACKGROUND

A vehicle breakdown or a road accident can often be a very stressful situation for the driver. A roadside assistance provider can assist the driver in such situations by providing the services required to allow the driver to continue driving or to bring the vehicle to a nearby garage to further service or repair the vehicle.

However, contacting the roadside assistance provider can often be another source of stress to the driver. Often, the driver will not know which providers are located nearby, the price being charged by the providers or the quality of service offered by that provider.

In other contexts, and/or industries, actors may also require the assistance of a service provider that is analogous or similar to a roadside assistance. The service provider can be a roadside assistance provider. Notably, the construction industry, contractors, or the like, may require the moving of equipment from one work site to another, or to a storage facility. Such moving of equipment can often be carried out by a roadside assistance provider.

SUMMARY

According to one aspect, there is provided a method for managing a request for assistance. The method includes:
  receiving, over a communication network, an electronic assistance request from a driver device associated to a driver entity, the request defining a location of the driver device and at least one assistance parameter;
  determining from a pool of provider entities a set of one or more available provider entities, each provider entity of the pool of provider entities being defined by a respective geographical coverage zone and a respective set of assistance capabilities, each available provider entity having a geographical coverage zone encompassing the location and having a set of assistance capabilities encompassing the at least one assistance parameter defined in the received electronic assistance request;
  transmitting, over the communication network, an electronic assistance solicitation to each provider of the set of available providers, the electronic assistance solicitation indicating the location and the at least one assistance parameter defined in the received electronic assistance request;
  receiving, over the communication network, an electronic assistance offer from each of a subset of the set of available provider entities, each electronic assistance offer defining a respective offer price and a respective estimated time of arrival;
  transmitting the received one or more electronic assistance offers to the driver device;
  receiving, over the communication network, an electronic response from the driver device indicating an acceptance of one of the electronic assistance offers;
  receiving an electronic payment from the driver entity of an amount of funds corresponding to the offer price defined in the accepted electronic assistance offer;
  transmitting, over a wireless communication network, a notification to an operator device associated to an assistance operator entity associated to the provider entity of the accepted electronic assistance offer, the notification indicating the location and at least one assistance parameter defined in the received electronic assistance request;
  determining a duration of an operator arrival timer based on the estimated time of arrival defined in the accepted electronic assistance offer; and
  upon transmitting the notification to the operator device, beginning counting down of the operator arrival timer.

According to one aspect, there is provided a system for managing a request for assistance. The system includes at least one data storage device and at least one processor operably coupled to the at least one storage device. The at least one processor is configured for:
  receiving, over a communication network, an electronic assistance request from a driver device associated to a driver entity, the request defining a location of the driver device and at least one assistance parameter;
  determining from a pool of provider entities a set of one or more available provider entities, each provider entity of the pool of provider entities being defined by a respective geographical coverage zone and a respective set of assistance capabilities, each available provider entity having a geographical coverage zone encompassing the location and having a set of assistance capabilities encompassing the at least one assistance parameter defined in the received electronic assistance request;
  transmitting, over the communication network, an electronic assistance solicitation to each provider of the set of available providers, the electronic assistance solicitation indicating the location and the at least one assistance parameter defined in the received electronic assistance request;
  receiving, over the communication network, an electronic assistance offer from each of a subset of the set of available provider entities, each electronic assistance offer defining a respective offer price and a respective estimated time of arrival;
  transmitting the received one or more electronic assistance offers to the driver device;
  receiving, over the communication network, an electronic response from the driver device indicating an acceptance of one of the electronic assistance offers;
  receiving an electronic payment from the driver entity of an amount of funds corresponding to the offer price defined in the accepted electronic assistance offer;

transmitting, over a wireless communication network, a notification to an operator device associated to an assistance operator entity associated to the provider entity of the accepted electronic assistance offer, the notification indicating the location and at least one assistance parameter defined in the received electronic assistance request;

determining a duration of an operator arrival timer based on the estimated time of arrival defined in the accepted electronic assistance offer; and upon transmitting the notification to the operator device, beginning counting down of the operator arrival timer.

According to various systems and methods described herein, the request for assistance is a request for roadside assistance, the electronic assistance request is an electronic roadside assistance, the at least one assistance parameter comprises at least one roadside assistance parameter, the electronic assistance solicitation is an electronic roadside assistance solicitation, the electronic assistance offer is an electronic roadside assistance offer, and the assistance operator entity is a roadside assistance operator entity.

According to various systems and methods described herein, the request for assistance is a request for transportation assistance, the electronic assistance request is an electronic transportation assistance, the at least one assistance parameter comprises at least one transportation assistance parameter, the electronic assistance solicitation is an electronic transportation assistance solicitation, the electronic assistance offer is an electronic transportation assistance offer, and the assistance operator entity is a transportation assistance operator entity.

According to various systems and methods described herein, the transportation assistance operator entity also operates as a roadside assistance operator entity.

According to various systems and methods described herein, each provider entity is further defined by a respective set of roadside assistance capabilities; and each available provider entity further has a set of roadside assistance capabilities encompassing the at least one roadside assistance parameter defined in the received electronic roadside assistance request.

According to various systems and methods described herein, the system and method further includes receiving an assistance adjustment request indicating a change in a status in the performance of the accepted electronic roadside assistance offer, and releasing at least a portion of the received amount of funds based on the assistance adjustment request.

According to various systems and methods described herein, the amount of funds to be released and the recipient of the released portion is determined based on the type of the assistance adjustment request and amount of time remaining on the operator arrival timer at the time of receiving the adjustment request.

According to various systems and methods described herein, the type of the assistance adjustment request is an assistance completion confirmation, and in response to receiving the assistance completion confirmation, a portion of the funds is released to an electronic payment account associated to the provider entity of the accepted electronic roadside assistance offer.

According to various systems and methods described herein, the type of assistance adjustment request is an operator no-show notification, and in response to receiving the operator no-show notification, further receiving an electronic payment from the provider entity of the accepted electronic roadside assistance offer and recording a credit to the driver entity of a portion of the electronic payment received from the provider entity of the accepted electronic roadside assistance offer.

According to various systems and method further include upon expiry of the operator arrival timer, making available at the driver device an interactive element to select an operator no-show notification, and receiving, over the communication network an electronic response from the driver device indicating selection of the operator no-show notification.

According to various systems and methods described herein, the type of the assistance adjustment request is a provider cancellation notification, and in response to receiving the provider cancellation notification: further receiving an electronic payment from the provider entity of the accepted electronic roadside assistance offer, and recording a credit to the user entity of a portion of the electronic payment received from the provider entity of the accepted electronic roadside assistance offer.

According to various systems and methods described herein, the amount of the electronic payment received from the provider entity of the accepted electronic roadside assistance offer is determined based on an amount of time remaining on the operator arrival timer at the time of the provider cancellation notification.

According to various systems and methods described herein, the type of the assistance adjustment request is a driver cancellation notification and in response to receiving the driver cancellation notification, a first portion of the funds are refunded to the driver entity and a second portion of the funds are released to an electronic payment account associated to the provider entity of the accepted electronic roadside assistance offer.

According to various systems and methods described herein, the amount of funds refunded to the driver entity and the amount of funds released to the electronic payment account associated to the provider is determined based on an amount of time remaining on the operator arrival timer at the time of the driver cancellation notification.

According to various systems and methods described herein, the one or more electronic roadside assistance offers are transmitted for display on the driver device, and the offer price of each roadside assistance offer is displayed on the driver device and the identity of the provider entity for each roadside assistance offer is hidden from view on the display of the driver device.

According to various systems and methods described herein, after receiving the electronic response indicating the acceptance of the one of the electronic roadside assistance offers, displaying on the driver device the identity of the provider entity for the accepted electronic roadside assistance offer.

According to various systems and methods described herein, after receiving the electronic response indicating the acceptance of the one of the electronic roadside assistance offers and after receiving the electronic payment from the driver entity of the amount of funds corresponding to the offer price defined in the accepted electronic roadside assistance offer, displaying on the driver device the identity of the provider entity for the accepted electronic roadside assistance offer.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIGS. 58 to 62 are screenshots of the user portal displayed on a provider device (desktop computer/laptop computer, or the like) to permit a user entity to make an electronic roadside assistance offer;

Figure 1:
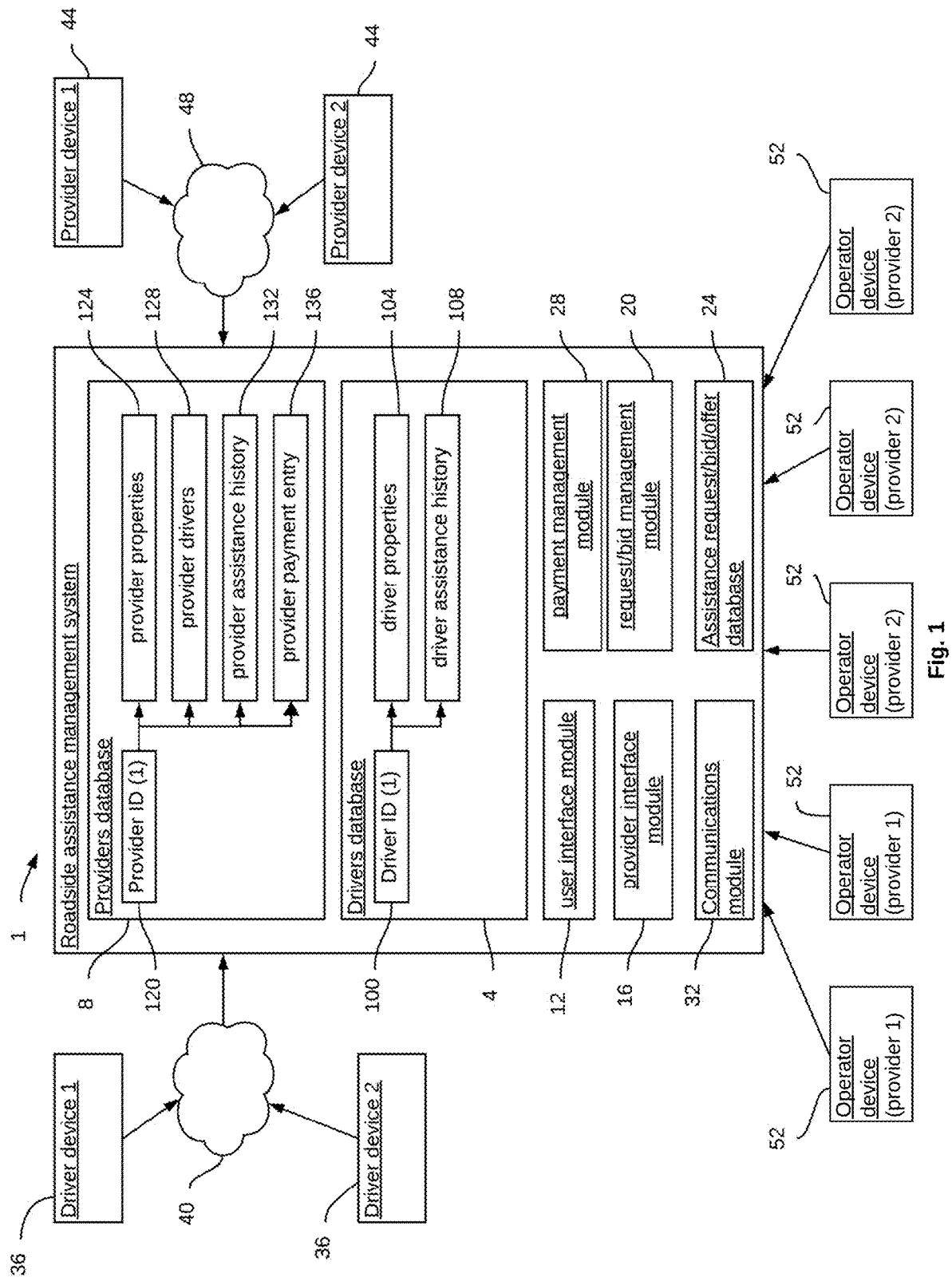
FIG. 1 illustrates a schematic diagram of the operational modules of a roadside assistance management system according to one example embodiment.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

"Driver entity" herein refers to a human person that operates a road vehicle and that may periodically require roadside assistance. "Driver entity" can also refer to an organization having a plurality of human drivers, such as an organization having a fleet of road vehicles. "Driver entity" can also refer to another entity or an organization that represents and acts on behalf of a human person operating the road vehicle, such as an insurance company or roadside assistance service to which the human operator is a member.

The road vehicle can be any type of vehicle that may require roadside assistance when being operated and can included, but is not limited to, any motor vehicles, such as cars, trucks, buses and motorcycles.

In an analogous context, the "driver entity" can also comprise suppliers or users of equipment, such as construction companies, rental companies, and/or contractors, that may periodically require services analogous to a roadside assistance. In one example, the service analogous to a roadside assistance is the transportation of construction equipment (ex: heavy machinery) from one work site to another, to a storage facility, or vice versa.

"Provider entity" herein refers to an organization of one or more people that has the capabilities to provide different types of roadside assistance services. For example, a provider entity can control a fleet of one or more operator entities. The "provider entity" can also provide services analogous to roadside assistance services, such as equipment transportation services.

"Operator entity" herein refers to a human operator that operates a roadside assistance vehicle, such as a flatbed truck, wheel lift pick up, service van (for smaller jobs such as boosting, fueling, lockout and tire service), and the like. The operator entity can be associated to and/or controlled by a provider entity, such as being employed by that provider entity. The "operator entity" can also operate a transportation assistance vehicle to provide equipment transportation services. In some situations, a roadside assistance vehicle can also be used for transportation assistance services, and vice versa.

One or more systems and methods described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, personal computer, cloud based program or system, or blockchain network.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein. In some embodiments, the systems may be embedded within an operating system running on the programmable computer.

Referring now to FIG. 1, therein illustrated is a schematic diagram of the operational modules of a roadside assistance management system 1 according to one example embodiment. The roadside assistance management system 1 includes a drivers database 4, a providers database 8, a drivers interface module 12, a providers interface module 16, a request/bid management module 20, an assistance instance database 24, a payment management module 28 and a communications module 32.

One or more driver devices 36 can be in communication with the roadside assistance management system 1 over a suitable communications network 40. A driver device herein refers to an electronic device being used by a driver entity. For example, the driver device 36 could be a laptop, personal data assistant, smart phone, desktop computer, tablet, set-top box, vehicle infotainment system, video game console, or virtual reality headset. For example, the user device 36 can run one or more of a variety of operating systems or platforms, such as Windows, Mac OS, OS X, iOS or Android. In most situations, the driver device 36 is a mobile device on or in proximity of the driver entity while driving a vehicle. Typically, the driver device 36 communicates wirelessly over the communications network 40 with the roadside assistance management system 1.

One or more interactive elements, such as an user portal, can be displayed on the driver device 36 that allows the driver device 36 to transmit commands or other information to the roadside assistance management system 1. The interactive element can be displayed within an interactive environment, such as web page, mobile app, or the like. For example, the drivers interface module 12 of the roadside assistance management system 1 can transmit data information and other commands to make different information and interactive elements available to the driver entity via the driver device 36 being operated by that driver entity. As is known in the art, the driver entity can provide the appropriate credentials (ex: login information) to access the roadside assistance management system 1. As described elsewhere herein, the driver device 36 is principally used by a driver entity to make an electronic request for roadside assistance, receive and display offers from roadside assistance providers, make a selection of a given provider, and provide payment for the received roadside assistance service.

One or more provider devices 44 can be in communication with the roadside assistance management system 1 over a suitable communications network 48. This network 48 can be the same network as communications network 40. A provider device herein refers to an electronic device being used by a provider entity. For example, the provider device 44 could be a laptop, personal data assistant, smart phone, desktop computer, tablet, set-top box, vehicle infotainment system, video game console, or virtual reality headset. For example, the driver device 44 can run one or more of a variety of operating systems or platforms, such as Windows, Mac OS, OS X, iOS or Android.

One or more interactive elements, such as an user portal, can be displayed on the provider devices 44 that allow the provider devices 44 to transmit commands or other information to the roadside assistance management system 1. The interactive element can be displayed within an interactive environment, such as web page, mobile app, or the like. For example, the providers interface module 16 of the roadside assistance management system 1 can transmit data information and other commands to make different information and interactive elements available to the provider entity via the provider device 44 being operated by that provider entity. As is known in the art, the provider entity can provide the appropriate credentials (ex: login information) to access the roadside assistance management system 1. As described elsewhere herein, the provider device 44 is principally used by a provider entity to respond to an electronic roadside assistance solicitation, and manage operator entities associated to the provider entity.

One or more operator devices 52 can be also be in communication with the roadside assistance management system 1 over a suitable communications network, which may be the same network (ex: internet), or a separate network (ex: cellular network). An operator device herein refers to an electronic device being used by an operator entity. For example, the operator device 52 could be a laptop, personal data assistant, smart phone, desktop computer, tablet, set-top box, vehicle infotainment system, video game console, or virtual reality headset. For example, the operator device 52 can run one or more of a variety of operating systems or platforms, such as Windows, Mac OS, OS X, iOS or Android. In most situations, the operator device 52 is a mobile device on or in proximity of the operator entity while driving a roadside assistance vehicle. Typically, the operator device 52 communicates wirelessly over the communications network with the roadside assistance management system 1.

One or more interactive elements, such as an user portal, can be displayed on the provider devices 52 that allow the operator devices 52 to receive information from and transmit commands or other information to the roadside assistance management system 1. The interactive element can be displayed within an interactive environment, such as web page, mobile app, or the like. The roadside assistance management system 1 can make available to the operator device 52 information regarding a roadside assistance instance (ex: location and type of assistance defined in an accepted assistance offer) that an operator has to respond to. For example, the location and the route to the location can be displayed on a graphical map on the operator device 52. Displayed interactive elements can also include an option to indicate completion of a requested assistance and to enter a confirmation code, as described elsewhere herein. The drivers database 4 stores electronic data containing information pertaining to a plurality of driver entities and their use of the roadside assistance management system 1. The drivers database 4 stores a plurality of driver ID entries 100. Each ID entry is associated with a driver entity and corresponds to a user account within the roadside assistance management system 1 for that driver entity. The driver entity can register a user account, which results in a driver ID entry being assigned to the driver entity. A driver entity can register an account while making an assistance request.

Each driver ID entry 100 is associated with a respective driver properties entry 104. The driver properties entry 104 stores identification information for the driver entity and vehicle information for the driver entity. For example, vehicle information may include the make, model, year of one or more vehicles belonging to the driver entity as well as information pertaining to modification or customization brought to the vehicle. It will be appreciated that the vehicle information can be used to define parameters of a roadside assistance request. The vehicle information can be obtained from the process of the driver entity registering within the roadside assistance management system 1. The vehicle information can also be obtained when a driver is making a roadside assistance request.

Each driver ID entry 100 can also be associated with driver assistance history entry 108, which stores history of previous roadside assistance instances involving the driver entity. The roadside assistance history 108 can also be used to define parameters of a roadside assistance request being made by the driver entity. In some example embodiments, and as described elsewhere herein, the roadside assistance history 108 can be used for resolving disputes between a driver entity and a provider entity.

The providers database 8 stores electronic data containing information pertaining to a plurality of provider entities and their use of the roadside assistance management system 1. The providers database stores a plurality of provider ID entries 120. Each provider ID entry 120 is associated to a provider entity and corresponds to a provider entity account within the roadside assistance management system 1 for that provider entity. The provider entity can register a provider user account, which results in a provider ID entry being assigned to the provider entity.

Each provider ID entry 120 is associated with a respective provider properties entry 124. The provider properties entry 124 stores identification information for the provider entity, and location information for the provider entity. roadside assistance capabilities of the provider entity. The location information may indicate a geographical coverage zone that the provider has defined as being a zone in which the provider is capable of operating. It will be appreciated that the location information can be used to determine whether the provider entity is a match for a roadside assistance request made by a driver entity. The location information is used to determine whether the geographical coverage zone for a provider covers the location of a driver entity making a roadside assistance request.

The provider properties may further store the current location of each of one or more operators associated to the provider entity. The current location of the operators can be updated in real-time (based on GPS information of each operator), or may be updated intermittently (ex: a provider can manually enter the current location of an operator). Accordingly, a defined radius (ex: 5 km) surrounding each operator's current location can define additional zones in which the provider is capable of operating.

In some embodiments, the provider properties may also store roadside assistances capabilities of the provider entity. The roadside assistance capabilities of the provider entity define the types of roadside assistance services that the provider is able to perform. The roadside assistance capabilities can also be used to determine whether the provider entity is a match for a roadside assistance requested made by the driver entity.

In some embodiments, the provider properties may store a provider reputation entry. As a provider entity carries out roadside assistance for driver entities, the driver entities can provide ratings indicating the quality of the services provided by that entity. These ratings are used to indicate the provider reputation, which may be helpful to driver entities choosing a provider entity for future assistance requests.

The types of services of the provider entity may include boost, lockout, refueling, tire change, transporting vehicle and equipment, pulling out vehicle. These capabilities can depend on the type of equipment carried by operator entities associated to the provide entity and on the certifications received by those operator entities.

Each provider ID entry 120 can also be associated with a respective provider's operators entry 128. The provider's operators entry 128 stores information pertaining to operator entities controlled by the given provider entity, which may include one or more of identification information, contact information, roadside assistance capabilities, and current assistance status of each operator.

Each provider ID entry 120 can also be associated with provider assistance history entry 132, which stores history of previous roadside assistance instances involving the driver entity. The roadside assistance history 132 can also be used to validate that a provider is match for a roadside assistance request by a driver entity. In some example embodiments, and as described elsewhere herein, the roadside assistance history 132 can be used for resolving disputes between a driver entity and a provider entity.

Each provider ID entry 120 can also be associated with provider payment entry 136, which stores information pertaining to receiving and transmitting electronic payments by the provider entity for providing roadside assistance services. For example, the provider payment entry 136 can store electronic payment information for the provider entity, such as the provider entity's banking information, credit card account or online payment account (ex: PayPal™ or Striper™).

Continuing with FIG. 1, the assistance management module 20 is configured to manage instances of roadside assistance within the roadside assistance management system 1. More particularly, the assistance management module 20 is configured to respond to an electronic roadside assistance request received from a driver device 36 belonging to a given driver entity, determine for each received request the provider entities that match the request, transmit electronic roadside assistance solicitations to the provider devices 44 of the matching provider entities, receiving assistance offers from the provider devices 44, transmitting the offers to the driver device 36, receiving a response from the driver device 36 indicating an acceptance of the offer, and further creating an electronic roadside assistance instance within the roadside assistance management system 1.

In a situation where a given driver entity has a vehicle accident, vehicle breakdown, or the like, the driver entity can interact via the user portal displayed on the driver device 36 to make an electronic roadside assistance request. As described elsewhere herein, from interacting with the user portal, the driver entity can indicate within the request the current location of the vehicle and one or more roadside assistance parameters defining the type of assistance required.

The electronic roadside assistance request is transmitted from the driver device 36 over the communication network 40 and received by the assistance management module 20. In response to receiving the given electronic roadside assistance request, the assistance management module 20 creates an electronic roadside assistance instance within the assistance instance database 24 to track and manage the request and response thereto by one or more providers.

Further in response to receiving the roadside assistance request, the assistance management module 20 is configured to determine from the pool of provider entities registered to the roadside assistance management system 1 (i.e. those provider entities having ID entries 120 stored within the providers database 120) a set of one or more available providers entities.

The available providers entities correspond to those provider entities that represent a match for the received roadside assistance request. In one example embodiment, the available provider entities representing a match are those provider entities having geographical coverage zone(s) that encompass the location of the driver entity making the roadside assistance request.

In another example embodiment, the assistance management module 20 identifies those provider entities that have a defined geographical coverage zone that encompasses the current location of the vehicle and that has a set of roadside assistance capabilities encompassing the parameters of the type of assistance defined within the request.

As described elsewhere herein, the geographical coverage zone for a provider can also include the current location of the operators, with that location being updated in real-time or intermittently based on movement of each operator. Accordingly, the assistance management module 20 can identify those provider entities that currently have an operator that is in vicinity (ex: within a defined radius) of the requesting driver entity and that operator having a set of roadside assistance capabilities encompassing the parameters of the type of assistance defined within the request.

Provider entities identified in this way are determined as belonging to the set of available provider entities for the given request.

The assistance management module 20 is further configured to transmit, via the communications module 32 and over the communications network 48, an electronic roadside assistance solicitation to the provider device 44 associated to each provider entity of the set of available provider entities. The electronic roadside assistance solicitation corresponds to an invitation to the provider entity to submit an offer or bid to assist the driver entity.

At a provider device 44, in response to receiving an electronic roadside assistance solicitation, an interactive element can be presented within the user portal displayed on the provider device 44 that allows the provider entity associated to that device to submit an offer to assist the driver entity. The provider entity can define a price to be paid by the driver entity within the offer to assist. The provider entity can also define an estimated time of arrival to indicate how soon the provider expects one of its operators to arrive at the location of the requesting driver entity. The provider entity can also define one of the operators controlled by the provider entity that the provider entity wishes to assign to the assistance. As described elsewhere herein, a provider dashboard can display the received electronic roadside assistance solicitations as an active request, and an user representing the provider entity can submit an offer to assist the driver entity that made the assistance request.

The assistance management module 20 is further configured to receive over the communications network 48 and via the communications module 32, an electronic roadside assistance offer from each of a subset of the set of available providers. The subset corresponds to those provider entities that responded to the electronic roadside assistance solicitation by submitting an offer to assist. Each electronic roadside assistance offer defines a respective offer price and a respective estimated time of arrival as indicated by the provider entity when responding to the assistance solicitation. It will be appreciated that where a plurality of electronic roadside assistance offers are received, the offer price and the estimated time of arrival can be different across these offers. The reputation rating of each provider entity making an offer can also be displayed.

The assistance management module 20 is further configured to transmit the received one or more electronic roadside assistance offers to the driver device 36 from which the electronic roadside assistance request was made.

According to one example embodiment, in addition to automatically responding to received electronic roadside assistance requests and automatically generating electronic roadside assistance solicitations to available provider entities, the assistance management module 20 can include a human-controllable component that allows a human administrator to act on behalf of a driver entity and/or on behalf a provider entity.

In the context of the human operator acting on behalf of a driver entity, the human administrator can manually create an electronic roadside assistance request, whereby the manually created electronic roadside assistance request will then be treated by the assistance management module 20 in the same way as an electronic roadside assistance request received from a driver device 36. This may be useful where a driver entity does not have access to a driver device 36, or requires live human assistance, and telephones the administrator (ex: a customer service center controlled by the administrator of the assistance management system 1) to make an electronic roadside assistance request. This may also be useful where an initial request made by a driver device 36 was unable to identify available provider entities.

In the context of the human operator acting on behalf a provider entity, the human administrator can manually create an electronic roadside assistance offer, whereby the manually created electronic roadside assistance offer will then be treated by the assistance management module 20 in the same way as an electronic roadside assistance request received from a provider device 44. This may be useful where no available provider entities are originally identified (ex: due to the parameters of a request being uncommon or all provider entities being busy and unavailable). The human administrator can directly contact a provider entity (ex: by telephone call). Upon the contacted provider entity agreeing to assist, an electronic roadside assistance offer may be created by the human administrator within the assistance management system 1 and transmitted to the driver device 36 to be displayed thereon.

At the driver device 36, in response to receiving the electronic roadside assistance offers, one or more interactive elements can be presented within the user portal displayed on the user device 36 that allows the driver entity associated to that device to select one of the assistance offers. An interactive element can be displayed for each received electronic roadside assistance offer. Each interactive element, can indicate the offer price and the estimated time of arrival indicated within the assistance offer for that interactive element.

In some example embodiments, the identity of the provider entity that made the offer can also be displayed. A link to reviews for prior assistance by that provider entity can also be displayed. In some embodiments, the operator chosen by the provider entity within each electronic roadside assistance offer is not displayed at the driver device 36.

Alternatively, the identity of the provider entities that made an offer are hidden from view to the driver entity using the driver device 36. Links to reviews may also be hidden from view. However, the reputation scores for the provider entities may be displayed. The identity of a given provider entity is only revealed upon the driver selecting an assistance offer and providing payment. If the identity of the provider entities were provided to the driver entity, the driver entity could directly contact one or more of the provider entities and possibly negotiate a different price than the offer price. Hiding the identity of the provider entities from view ensures that the driver entity cannot circumvent the roadside assistance management system 1 in this way.

The driver entity is expected to select one of the electronic roadside assistance offers via an interaction with one of the displayed interactive elements. The selection indicates that the driver entity has accepted one of the assistance offers from the provider entities.

The assistance management module 20 is further configured to receive an electronic response from the user device 36 indicating the selection/acceptance by the driver entity of the one of the assistance offers. As described elsewhere herein, the electronic response indicating an acceptance of an assistance offer can also be received at the payment management module 28.

The assistance management module 20 is also configured to, upon receiving the electronic response from the user device 36 indicating the acceptance of one of the assistance offer, transmit over a wireless communication network (ex: internet over a cellular network) a notification to the operator entity that was defined within the electronic roadside assistance offer that has been accepted. It will be appreciated that this operator entity is the one that the provider entity had chosen to assign to the roadside assistance instance when the provider entity initially made the roadside assistance offer. The notification transmitted to the operator entity indicates the assistance location and the at least one roadside assistance parameter defined in the electronic roadside assistance request the driver entity requesting the assistance had initially transmitted to the roadside assistance management system 1. The estimated time of arrival at the assistance location can also be transmitted to the operator entity. It will be appreciated that the assistance location and the at least one roadside assistance parameter provides sufficient information to allow the operator entity to carry out the requested assistance task. Other information in the transmitted notification may include an assistance order number, service name, driver name, driver contact information and estimated time of arrival. The information can aid the operator entity to complete the assistance request. For example, within user portal displayed on the operator device (such as an app running on a smartphone, tablet or vehicle infotainment system), a route from the operator entity's current location to the location of the driver requiring the roadside assistance can be determined and displayed on a graphical navigation map.

According to one example embodiment, the assistance management module 20 is further configured to set a duration of an operator arrival timer based on the estimated time of arrival defined in the electronic roadside assistance offer that was accepted by the user entity. In one example embodiment, the operator arrival timer can be set to be equal to the estimated time of arrival defined in the accepted offer. The assistance management module 20 can be further configured to trigger the beginning of counting down of the operator arrival timer upon transmitting the notification to the operator device. As described elsewhere herein, the operator arrival timer is used for determining the response to various types of adjustments to the assistance instance.

Continuing with FIG. 1, the payment management module 28 is configured to manage the receiving, holding in escrow, and releasing of monetary funds provided via electronic payments. Within an assistance instance, the payment management module 28 is at least configured to also receive the electronic response from the driver device 36 that indicates the acceptance of one of the electronic roadside assistance offers from the available provider entities. As described elsewhere herein, the electronic roadside assistance offer defines an offer price, which is the price that the provider entity wishes to charge in exchange to performing the requested roadside assistance task. Upon receiving the electronic response from the driver device 36, the payment management module 28 is configured to communicate, via the communication module, with an external authorized financial institution (ex: online banking account or PayPal™ or Stripe™) and to receive therefrom an amount of funds corresponding to the offer price defined in the accepted electronic roadside assistance offer. In one example embodiment, the received amount of funds can be equal to the offer price (plus applicable taxes). While the assistance instance is still open (i.e. not yet completed), the received amount of funds are held in escrow by the roadside assistance management system 1.

Both the assistance management module 20 and the payment management module 28 are configured to receive, via the communication module 32, an assistance adjustment request that indicates a change in the status of the assistance instance. The assistance adjustment request can be of the "assistance completed" type, which indicates that the requested roadside assistance task has been completed and the assistance instance has been completed. In response to receiving the assistance adjustment request of the "assistance completed" type, the assistance management module 20 updates the appropriate database entry within the assistance instance database 24 to indicate that the status of that assistance instance is now complete. The information associated to that assistance instance can then be stored within the provider assistance history 132 and the driver assistance history 108. Furthermore, in response to receiving the assistance adjustment request of the "assistance completed" type, the payment management module 28 releases the amount of funds received from the driver entity payment account for the assistance instance. The amount of funds is further transferred to an electronic payment account associated to the provider entity whose operator executed the roadside assistance task. Alternatively, funds that are received can be held by an entity that manages the roadside assistance management system 1 and that entity can periodically transfer funds to the provider entities.

Continuing with FIG. 1, the assistance instance database 20 can be updated from each operation carried out by the assistance management module 20. In response to initially receiving an electronic roadside assistance request from a driver device belonging to a driver entity, a new assistance instance entry is created within the assistance instance database 24. The set of available provider entities determined to be a match (ex: at least having coverage zones encompassing the location of the driver entity) for the request can also be stored within the assistance instance database 24 and in association with the assistance instance entry. The received electronic roadside assistance offer from the subset of the set of available providers can also be stored in association with the assistance instance entry. Furthermore, in response to receiving the electronic response indicating an acceptance of one of the electronic roadside assistance offers, a status entry stored in association with the assistance instance entry is initiated to indicate that the execution of the requested assistance is pending. A start time and a duration of the operator arrival timer for the assistance instance can also be stored in association with the assistance instance entry. The status entry can be modified in response to receiving various types of assistance adjustment request, as described elsewhere herein.

The status entry stored in association with the assistance instance entry can also include a current (ex: substantially real-time) status of the operator entity selected by the provider entity to complete the requested roadside assistance. For example, a current location of the operator entity (as determined by a GPS device of the operator device 52 used by the operator entity) can be periodically received at the roadside assistance management system 1. This information can be further transmitted to the driver device 36 associated to the given assistance instance entry. Accordingly, the driver entity can perceive the location of the operator entity, such as from displaying and periodically updating, the current location of the operatory entity displayed on a graphical map. It will be appreciated that this helps the driver entity determine when the operator entity will arrive at the location of the requested assistance.

Figure 2:
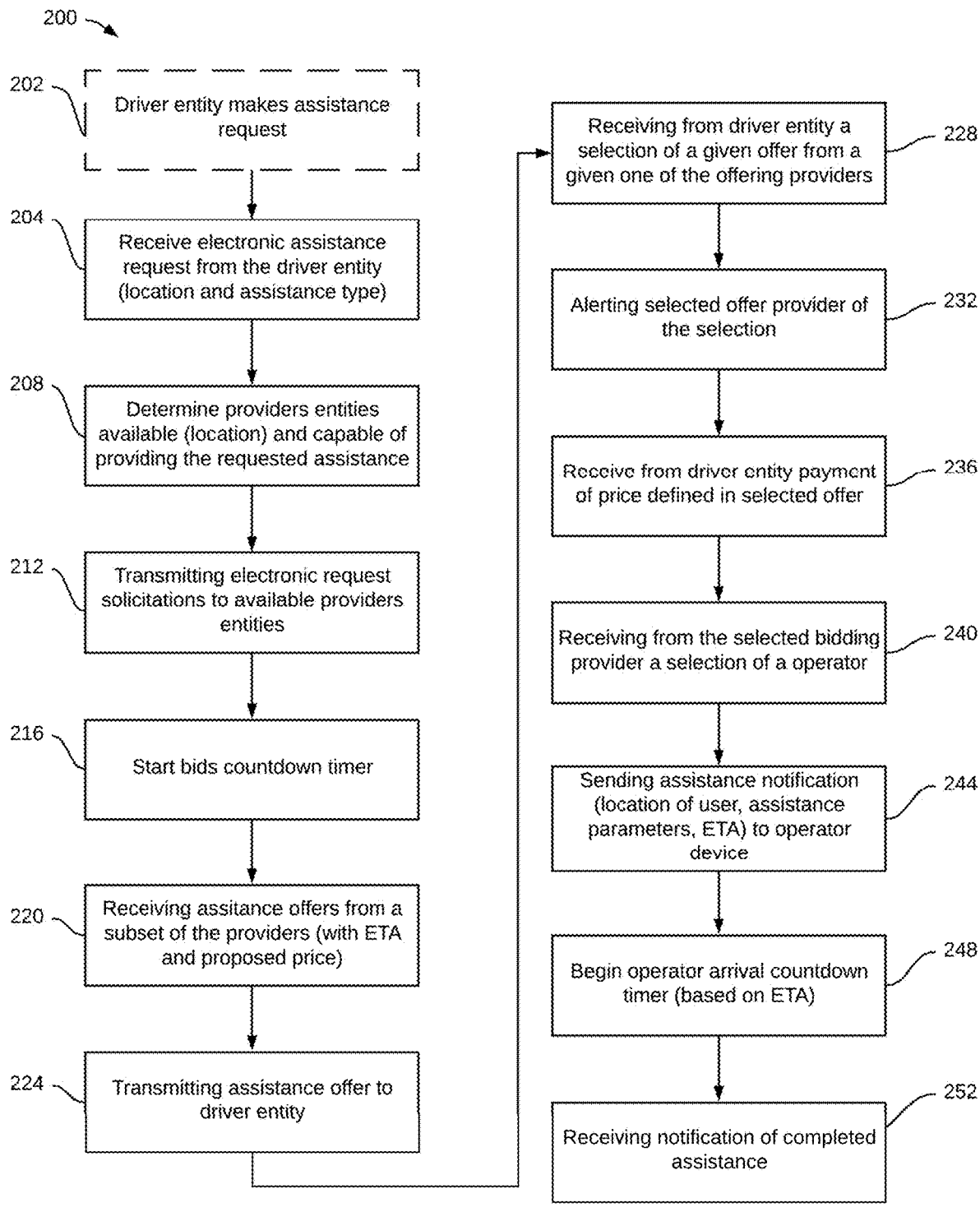
FIG. 2 illustrates a flowchart showing the operational steps of a method for managing a roadside assistance instance according to an example embodiment.

Referring now to FIG. 2, therein illustrated is a flowchart showing the operational steps of a method 200 for managing a roadside assistance instance according to an example embodiment. The method 200 can be performed at the roadside assistance management system 1 described herein. More particularly, steps of the method can be performed by the assistance management module 20 and the payment management module 28 as described herein.

At step 202, a driver entity makes an assistance request. As described elsewhere herein, a user can interact with the driver device 36 to define parameters of the roadside assistance request. A user interface can be presented as a series of questions so that the driver entity can accurately define the type of service required while avoiding errors or contradictions when defining the request. Step 202 is illustrated using dashed lines to indicate that this step may be carried on the driver device 36 and outside the roadside assistance management system 1.

At step 204, an electronic roadside assistance request made by the driver entity from interacting with the driver device 36 is received. The request indicates a current assistance location of the driver entity's vehicle and at least one assistance parameter.

At step 208, the set of available provider entities for the received electronic roadside assistance request is determined.

At step 212, electronic roadside assistance solicitations are transmitted to the provider devices of each of the available provider entities.

At step 216, a solicitation countdown timer can be optionally initialized. The countdown timer defines a window of time during which provider entities can respond to the solicitation by making electronic roadside assistance offers.

Steps 208 to 216 may be repeated iteratively in some example embodiments. For example, in a first iteration, providers being located within a first radius (ex: 50 km) of the location of the driver entity can be determined as forming a match and being part of the set of available providers. Solicitations are then sent to this first set of available providers at step 212 and a first solicitation countdown can be initialized at step 216. If no available provider entities are found, or if no provider entities make an offer before the expiry of the first solicitation countdown, a second iteration is commenced, in which the radius is expanded to a second radius (ex: 100 km) and a second solicitation countdown is initialized. The radius can be gradually expanded in this way until a roadside assistance offer is received.

At step 220, one or more electronic roadside assistance offers are received from a subset of the available providers. Each offer can define an offer price and an estimated time of arrival of a roadside assistance operator. In an embodiment wherein a solicitation countdown timer is initialized, only electronic roadside assistance offers received while the solicitation countdown timer has not expired will be considered.

At step 224, the received one or more electronic roadside assistance offers are further transmitted to the user device belonging to the user entity that initially made the roadside assistance request. As described elsewhere herein, the assistance offer can be displayed on the driver device 36 along with information pertaining to the offer (ex: provider ratings, estimated time of arrival, offer price, etc.)

At step 228, an electronic response indicating an acceptance/selection of one of the electronic roadside assistance offers is received.

At step 232, an alert message is transmitted to the provider device belonging to the provider entity whose electronic roadside assistance offer was accepted at step 228.

At step 236, electronic payment of an amount of funds corresponding to the offer price defined in the accepted electronic roadside assistance offer is received. In some example embodiments, the electronic payment of funds is received prior to an alert message being transmitted to the provider device.

At step 240, an indication of a selection of an operator entity controlled by the provider entity is received. In some embodiments, the selection of the operator entity can be defined earlier within step 220.

At step 244, a notification is transmitted to the selected operator entity. The notification may indicate a location of the driver entity requiring roadside assistance and the parameters of the requested roadside assistance.

At step 248, an operator arrival countdown timer is initialized. The countdown timer can be made available to the driver device 36 of the driver entity so that the driver can see how much time is left before the ETA provided by the provider remains. An option can be made available on the driver device 36 for a driver entity to indicate that the requested roadside assistance has been completed (ex: "SERVICE COMPLETE", see FIG. 49). In some embodiments, a confirmation code can also be transmitted to the driver device 36. The confirmation code can be used by the driver entity to confirm completion of the requested assistance.

At step 252, a notification that indicates completion of the requested roadside assistance is received. The indication can be received from the driver device 36 (ex: from the driver entity selecting "SERVICE COMPLETE"). The indication can also be received from an operator device 52. In the latter case, the indication includes the confirmation code that was shared by the driver entity to the operator entity. This code can be used to confirm that the requested roadside assistance has been completed by the operator that was dispatched.

FIGS. 3 to 52 illustrate screenshots of the user portal displayed on a driver device 36 to permit a user entity to make an electronic roadside assistance request and to choose an assistance offer according to an example embodiment. The driver entity will typically operate the driver device where the driver entity's vehicle has broken down or has been involved in an accident. FIGS. 3 to 52 illustrate an interactive environment as displayed on a mobile device, such as a smartphone, but it will be understood that a substantially similar interactive environment can be displayed on another device, such as a computer, laptop, or vehicle infotainment system. The interactive environment can be provided in the form of a series of questions, wherein the subsequent questions that are posed depend on the answers to previously posed questions. The questions that are posed follows a logical flow so that the driver entity is directed to accurately define the parameters of the electronic roadside assistance request.

Figure 3:
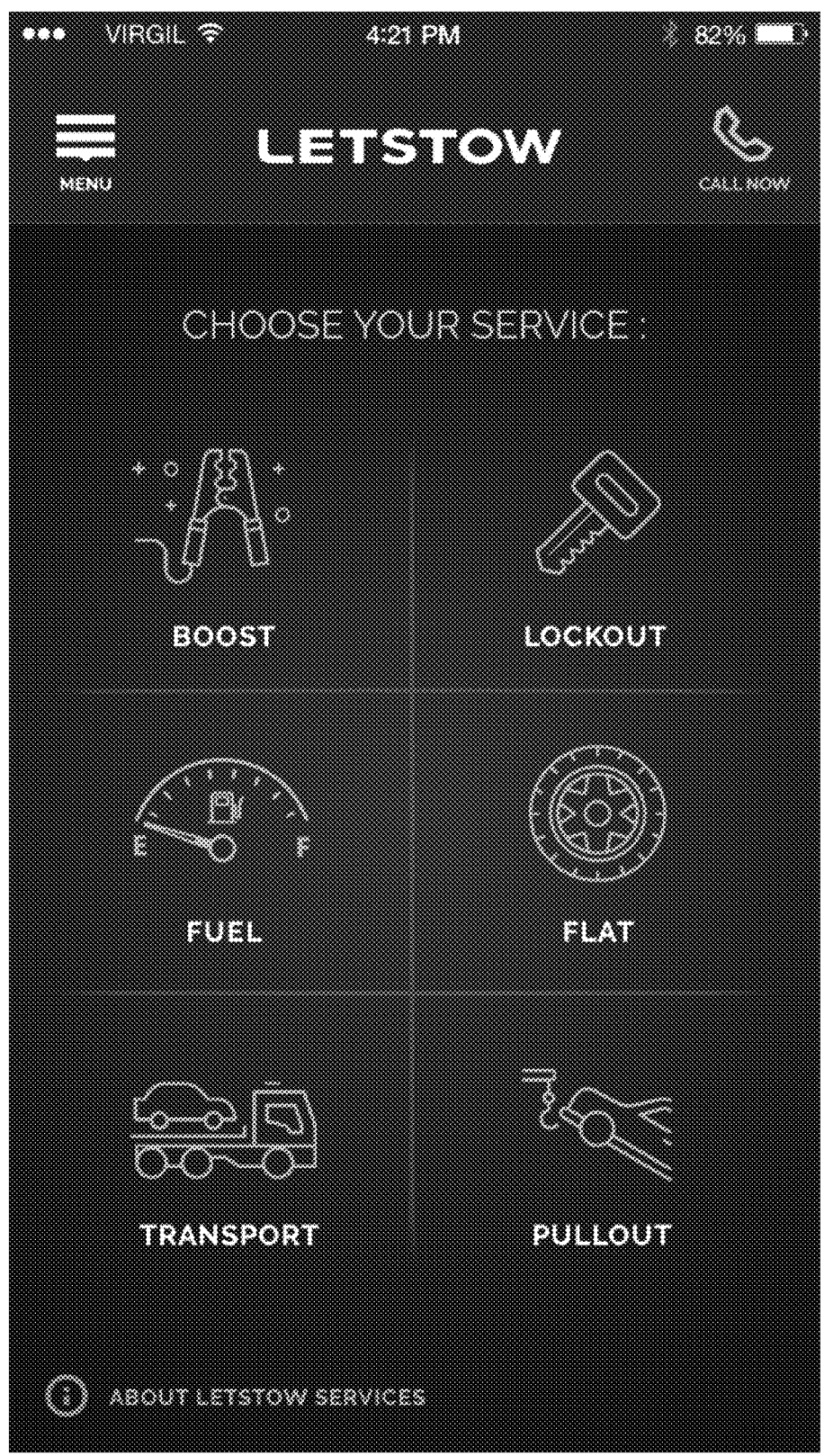
FIGS. 3 to 52 illustrate screenshots of the user portal displayed on a driver device to permit a user entity to make an electronic roadside assistance request according to an example embodiment.

FIG. 3 is a screenshot presented on the driver device 36 for initially selecting a type of requested roadside assistance. This screen can be presented after the driver entity has registered with roadside assistance management system. Alternatively, the driver entity can register after completing the roadside assistance questionnaire. In FIG. 3, the user can choose between the services boost, lockout, fuel, flat, transport and pullout.

Figure 4:
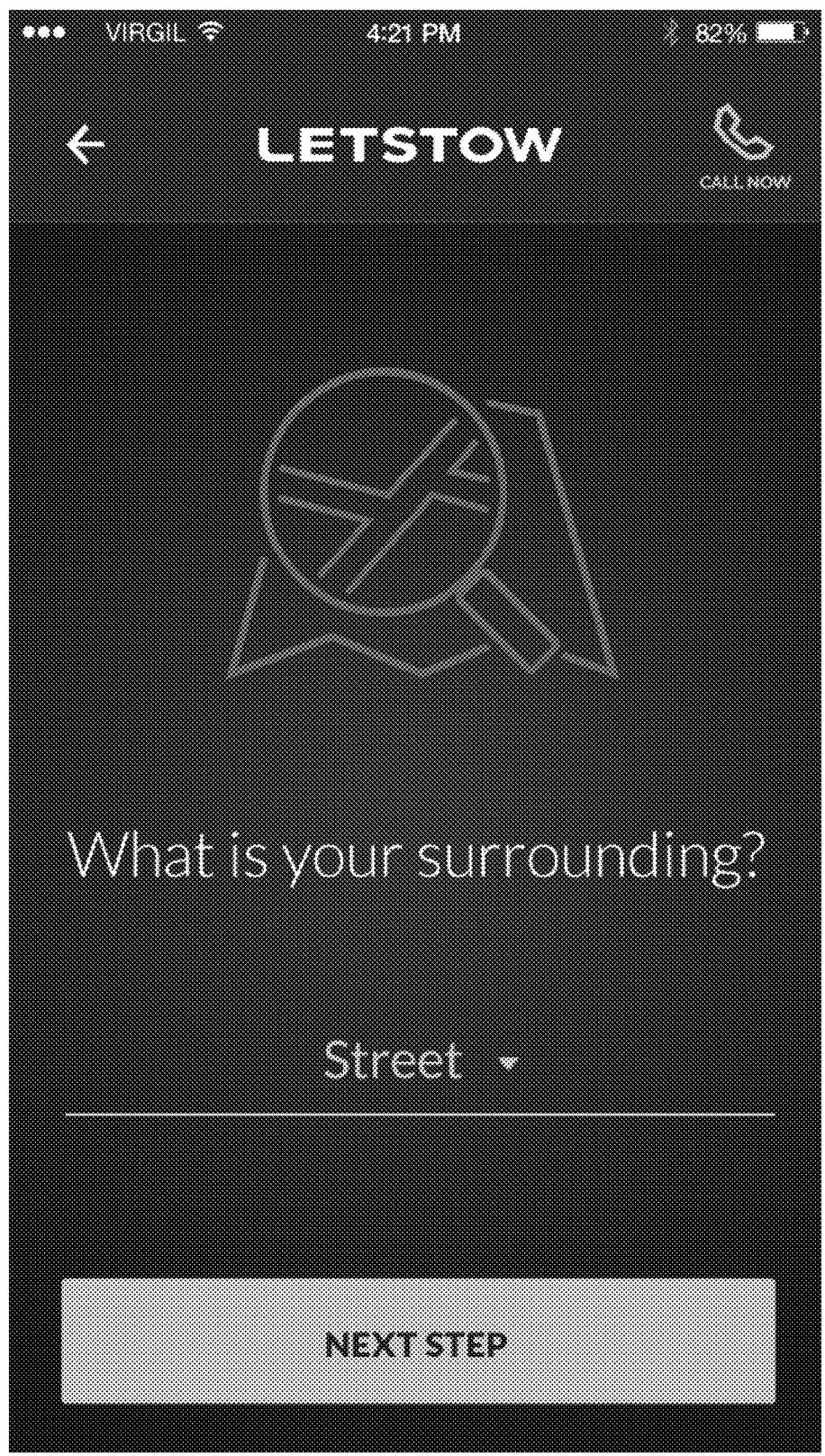

FIG. 4 is a screenshot of a first submenu allowing selection of a first parameter of the location of the driver entity's vehicle.

Figure 5:
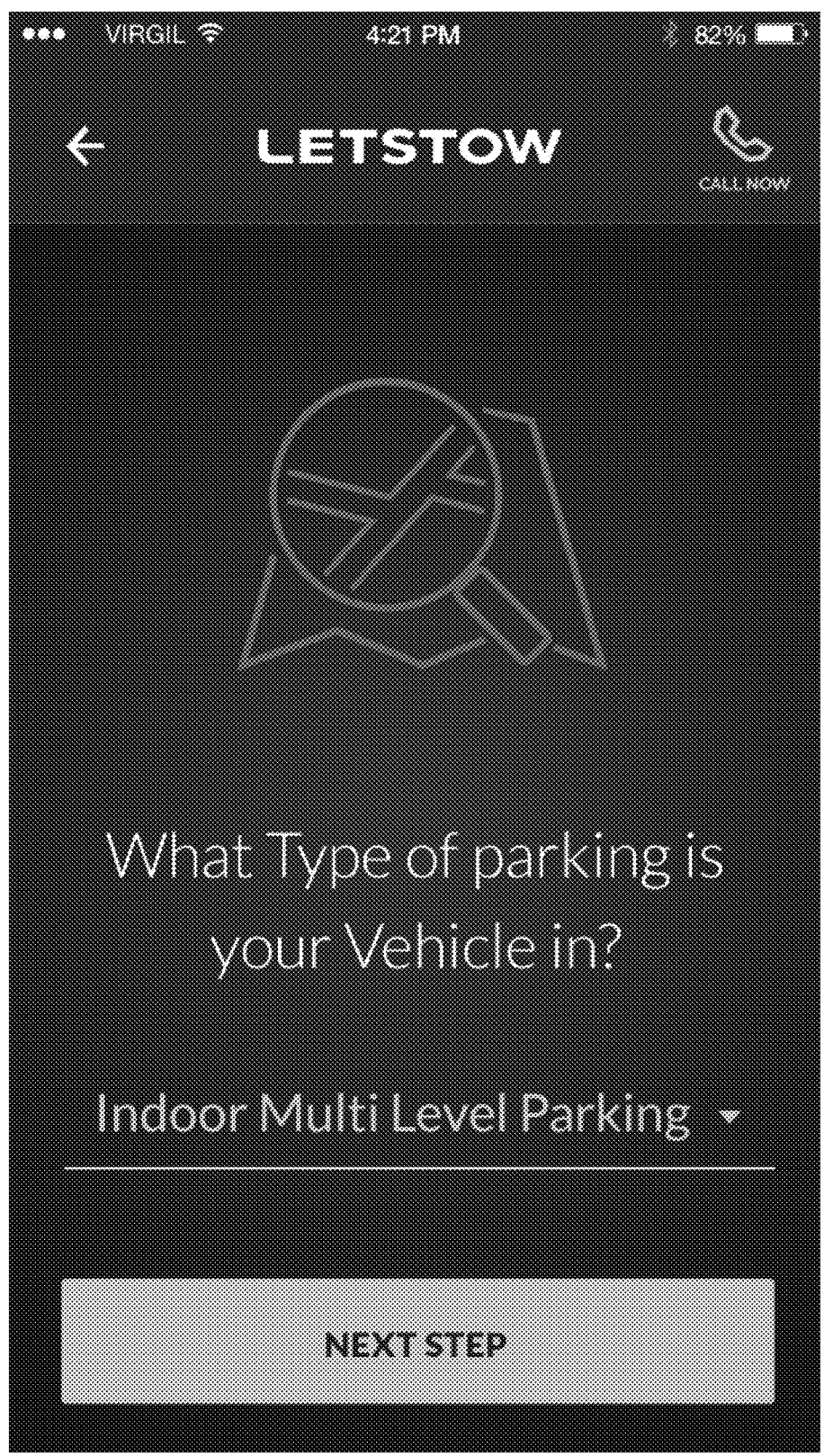

FIG. 5 is a screenshot of a second submenu allowing selection of a second parameter of the location of the driver entity's vehicle.

Figure 6:
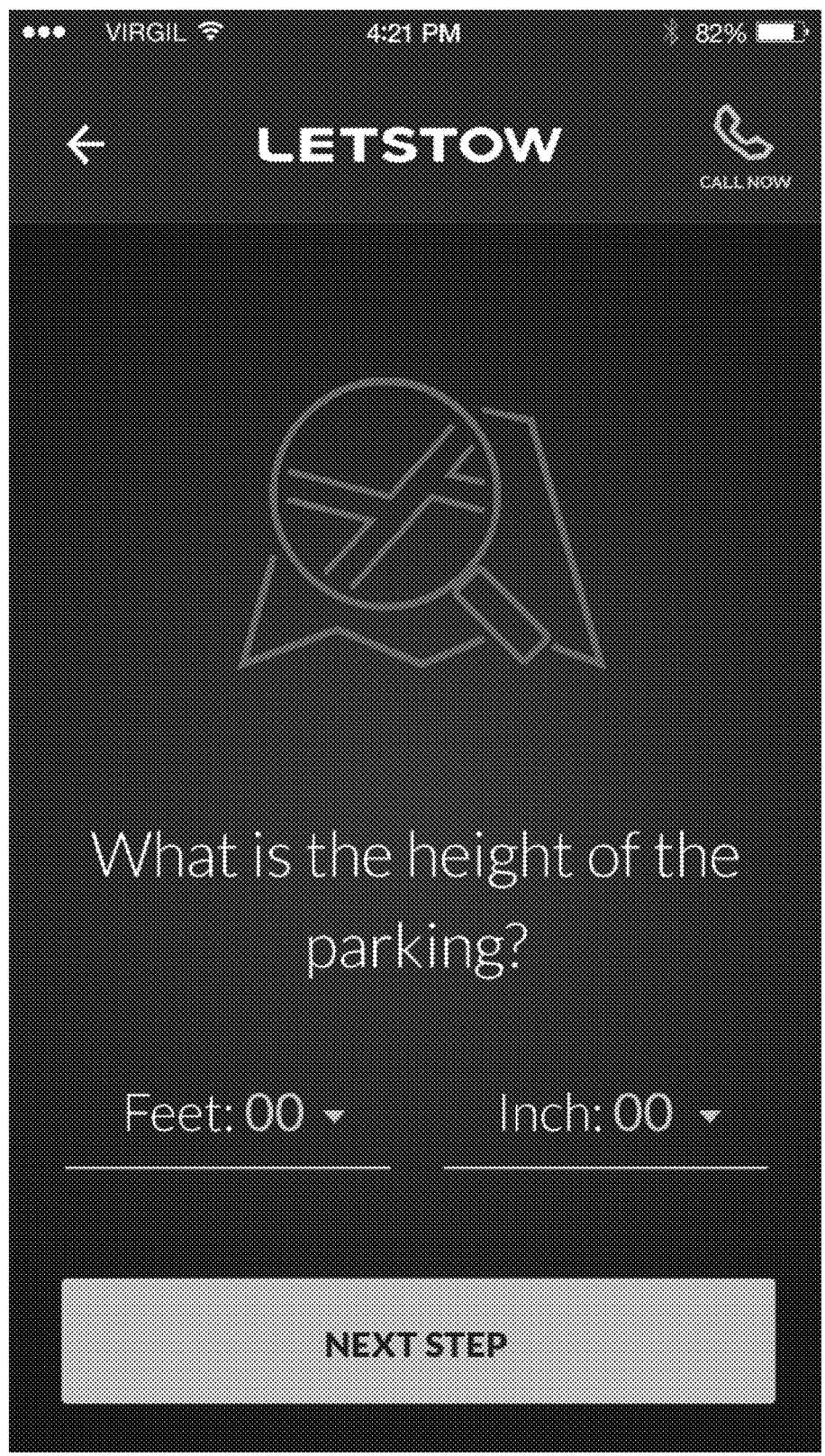

FIG. 6 is a screenshot of a third submenu allowing selection of a third parameter of the location of the driver entity's vehicle. It will be appreciated that this third submenu is only presented where the option "indoor parking" is selected in the second submenu illustrated in FIG. 5.

Figure 7:
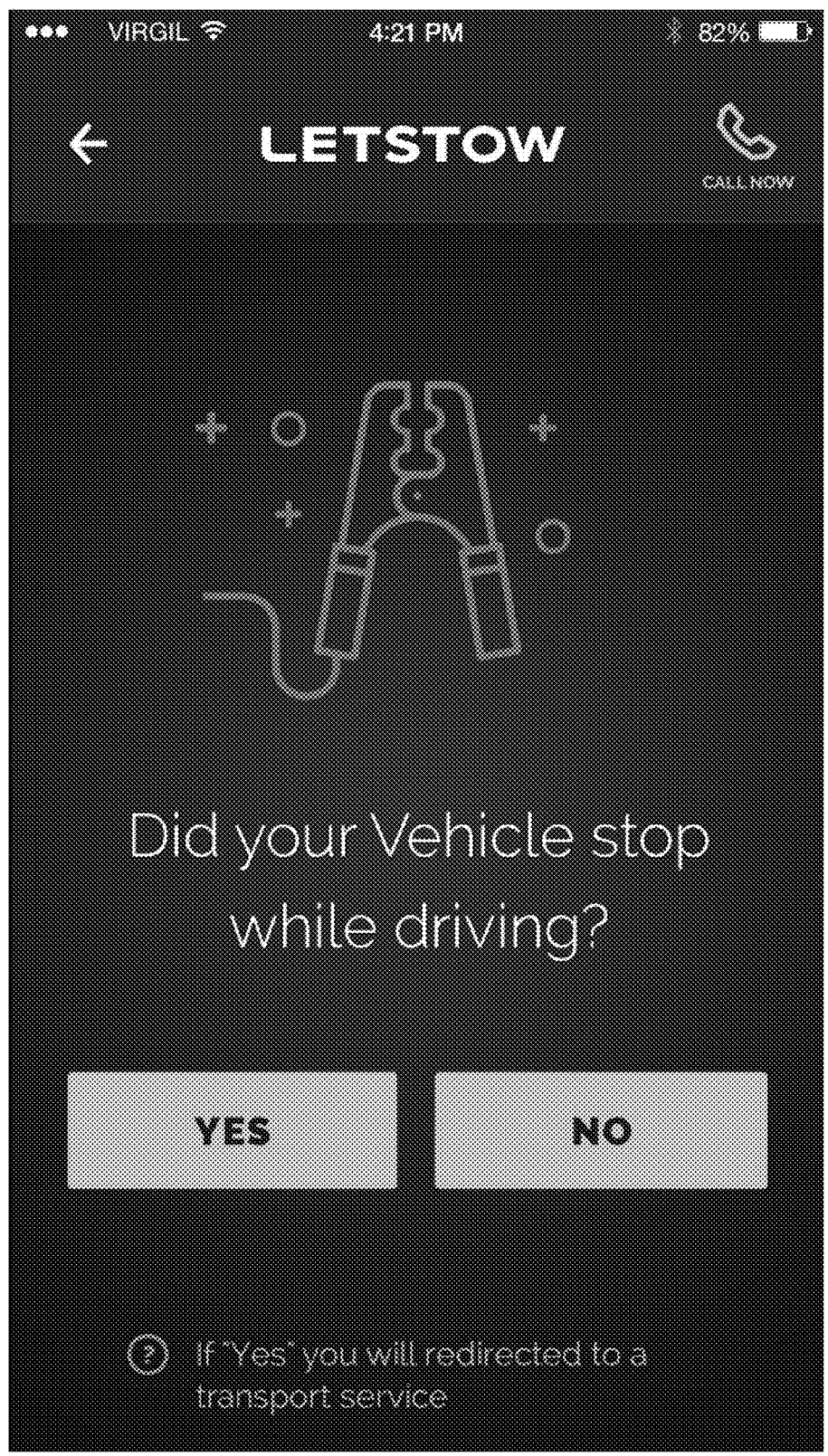

FIG. 7 is a screenshot of a submenu allowing selection of a subparameter of the boost service type.

Figure 8:
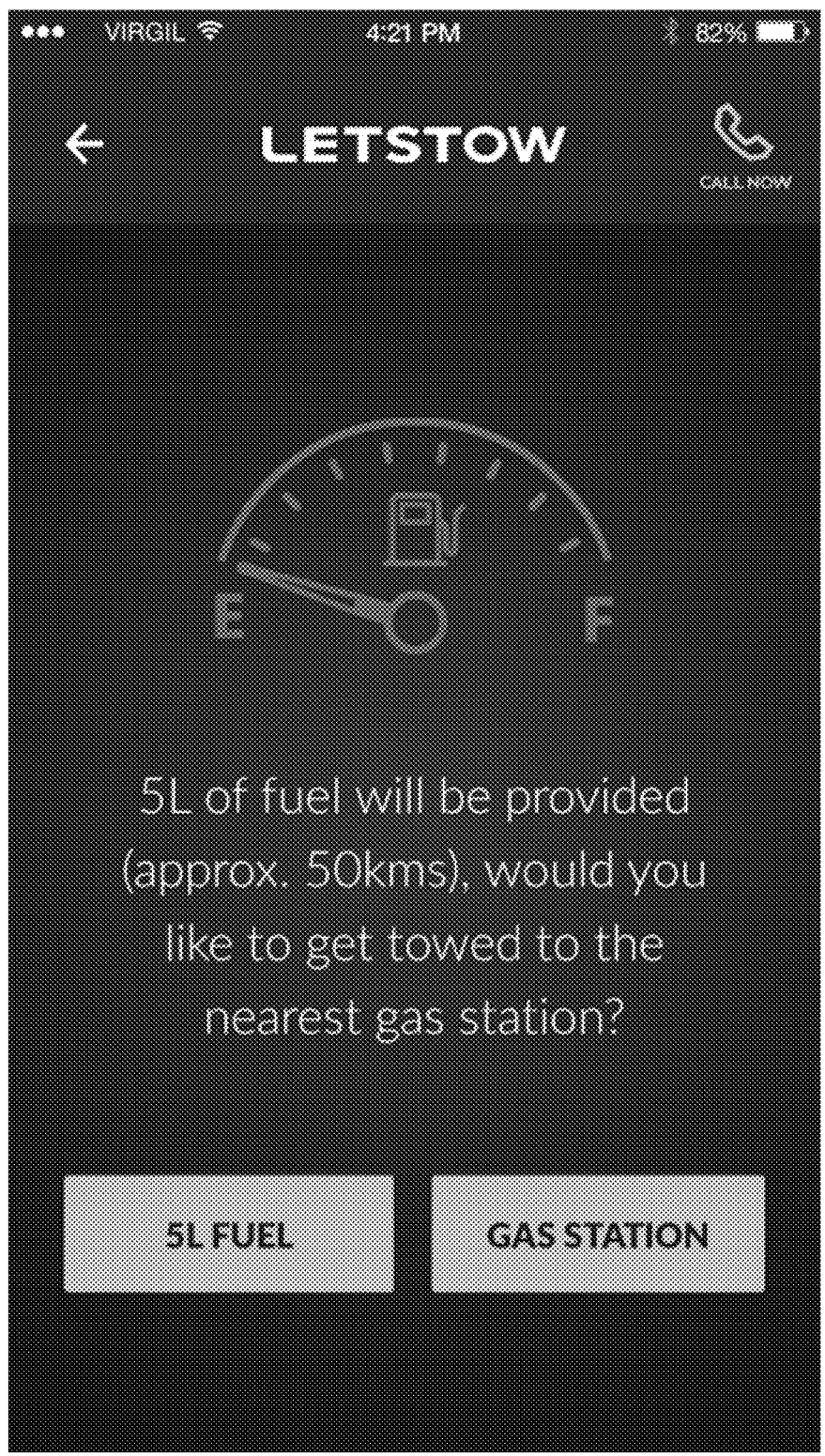

FIG. 8 is a screenshot of a first submenu allowing selection of a first subparameter of the fuel service type.

Figure 9:
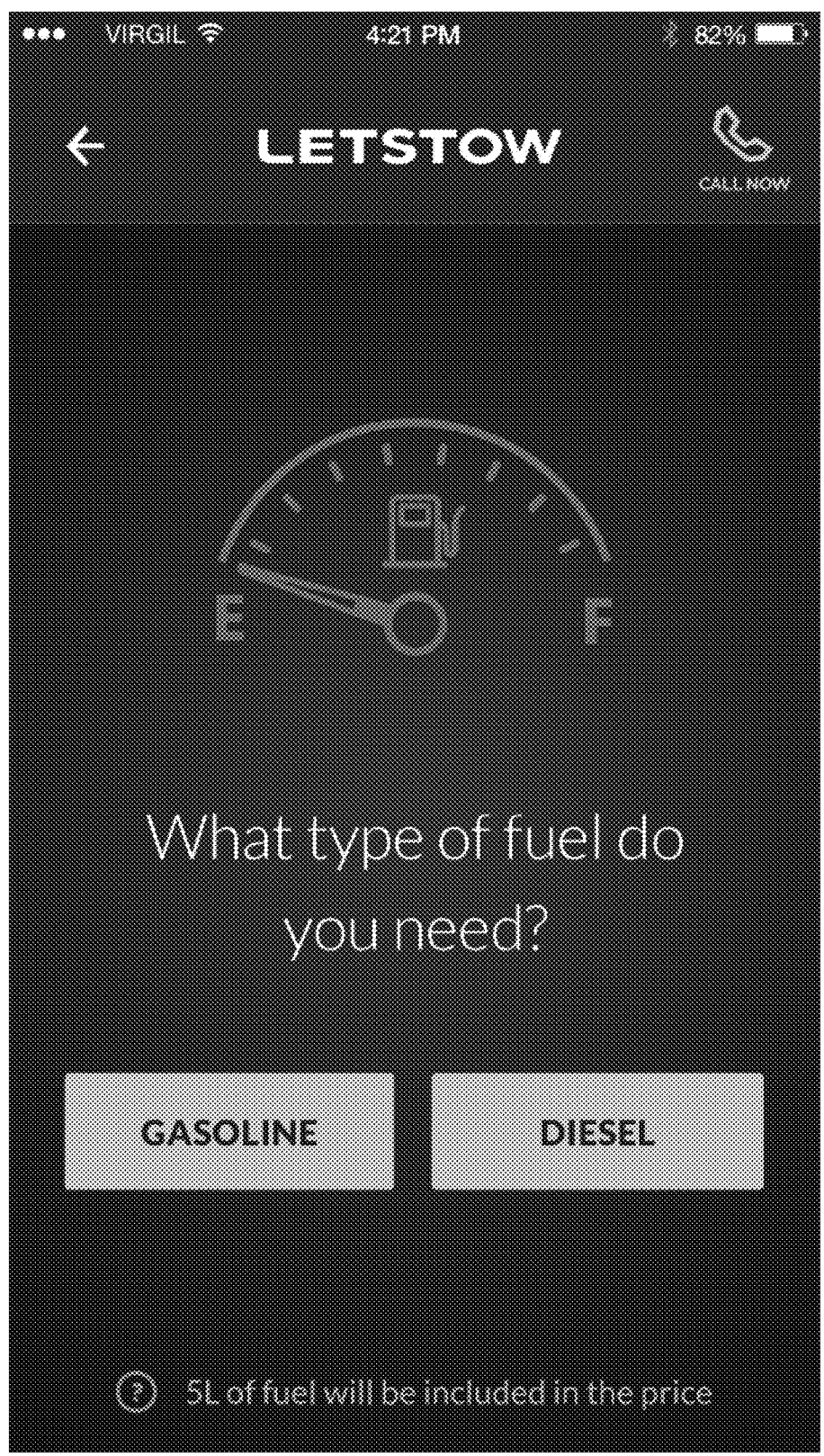

FIG. 9 is a screenshot of a second submenu allowing selection of a second subparameter of the fuel service type.

Figure 10:
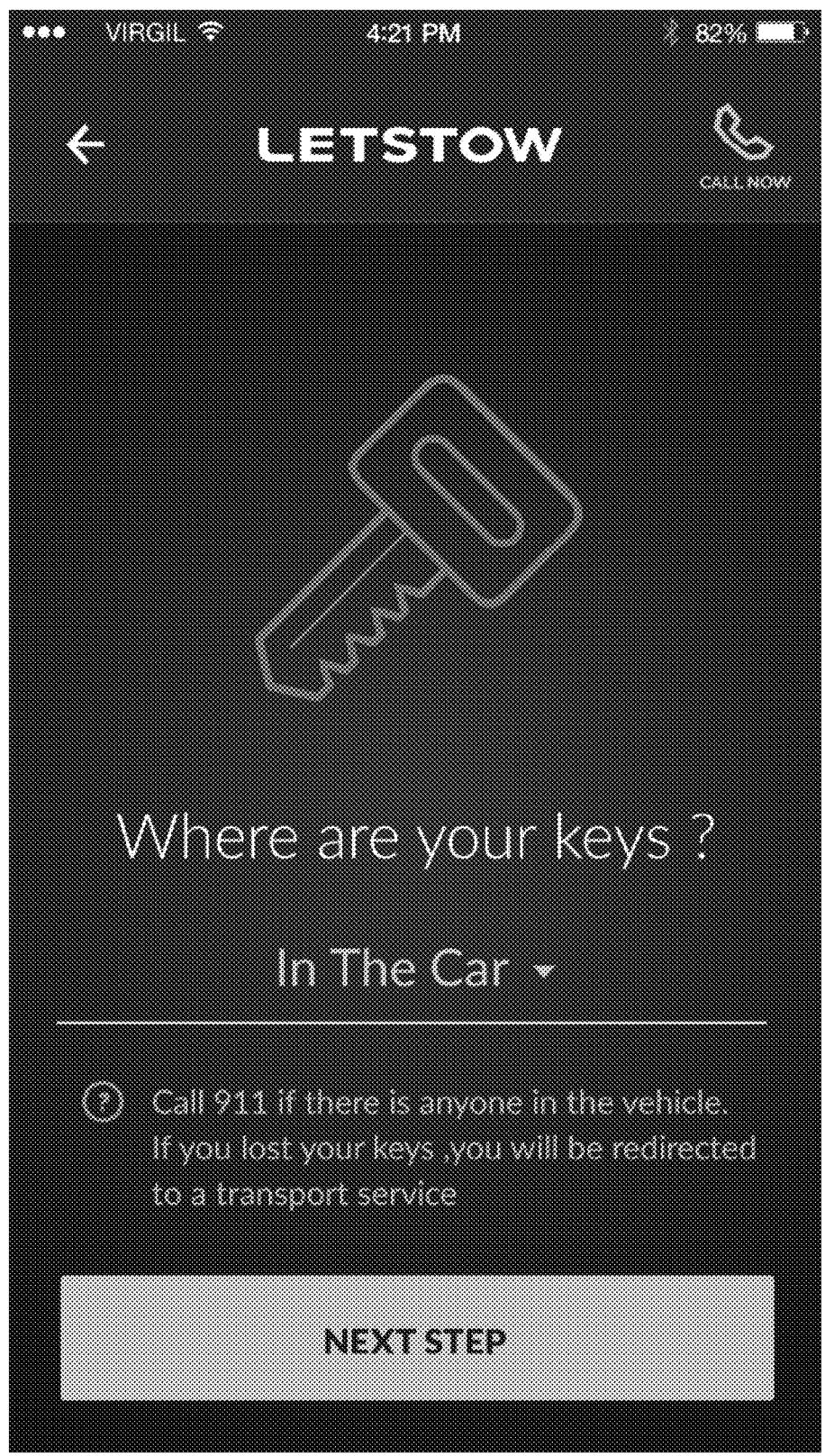

FIG. 10 is a screenshot of a first submenu allowing selection of a first subparameter of the lockout service type.

Figure 11:
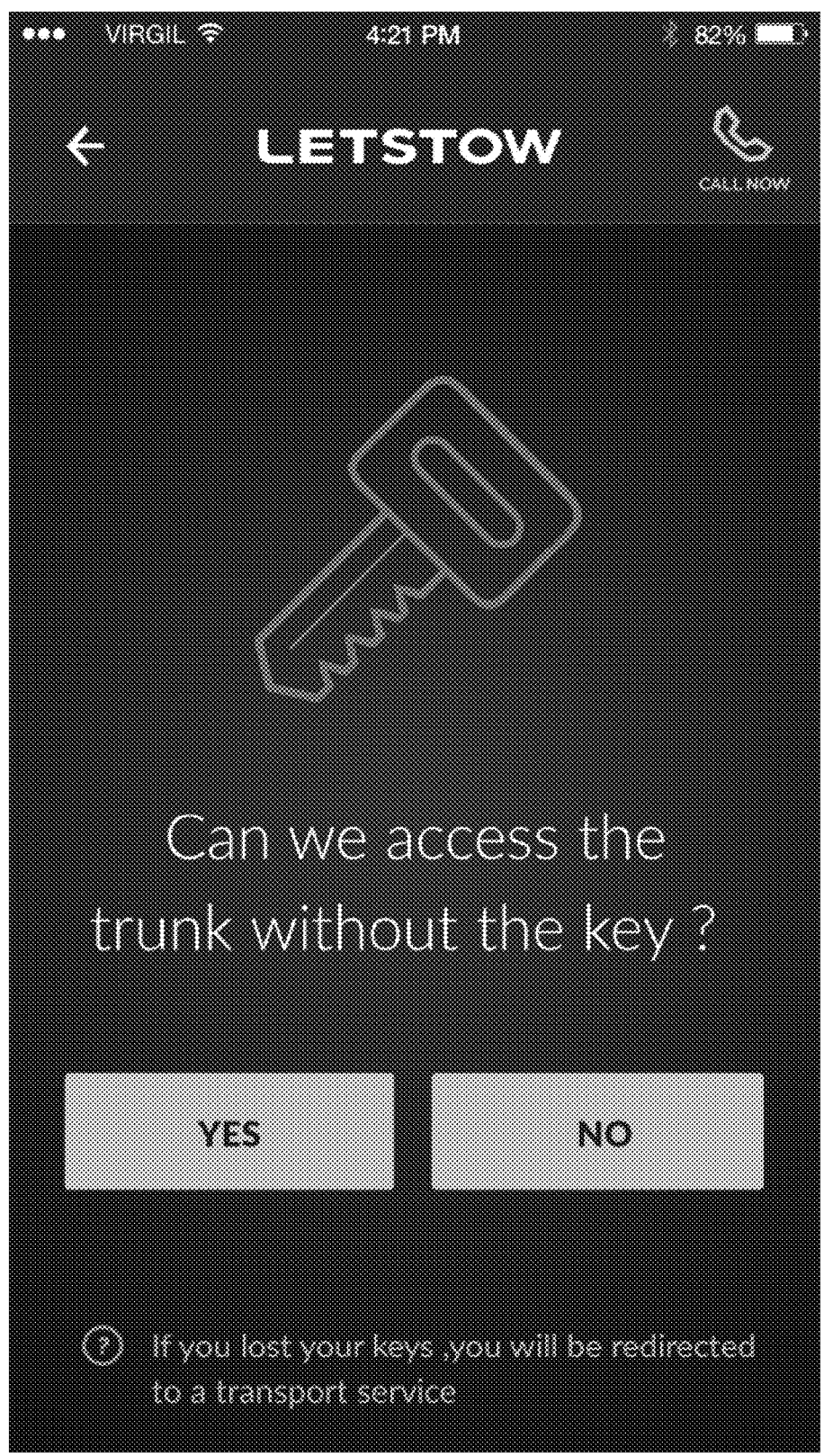

FIG. 11 is a screenshot of a second submenu allowing selection of a second subparameter of the lockout service type. It will be appreciated that this second submenu is only presented where the option "in the trunk" is selected in the first submenu illustrated in FIG. 10.

Figure 12:
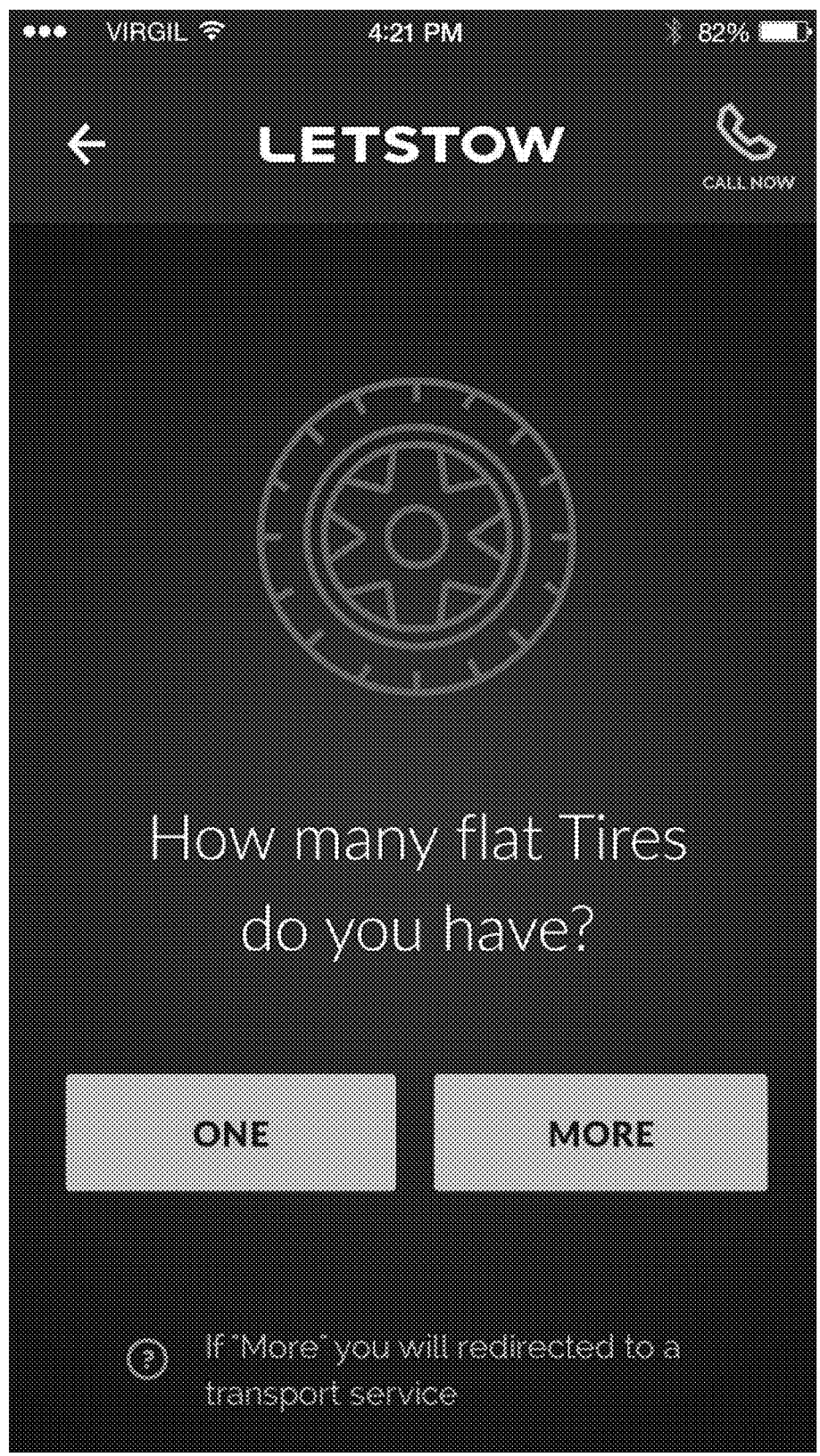

FIG. 12 is a screenshot of a first submenu allowing selection of a first subparameter of the flat tire service type.

Figure 13:
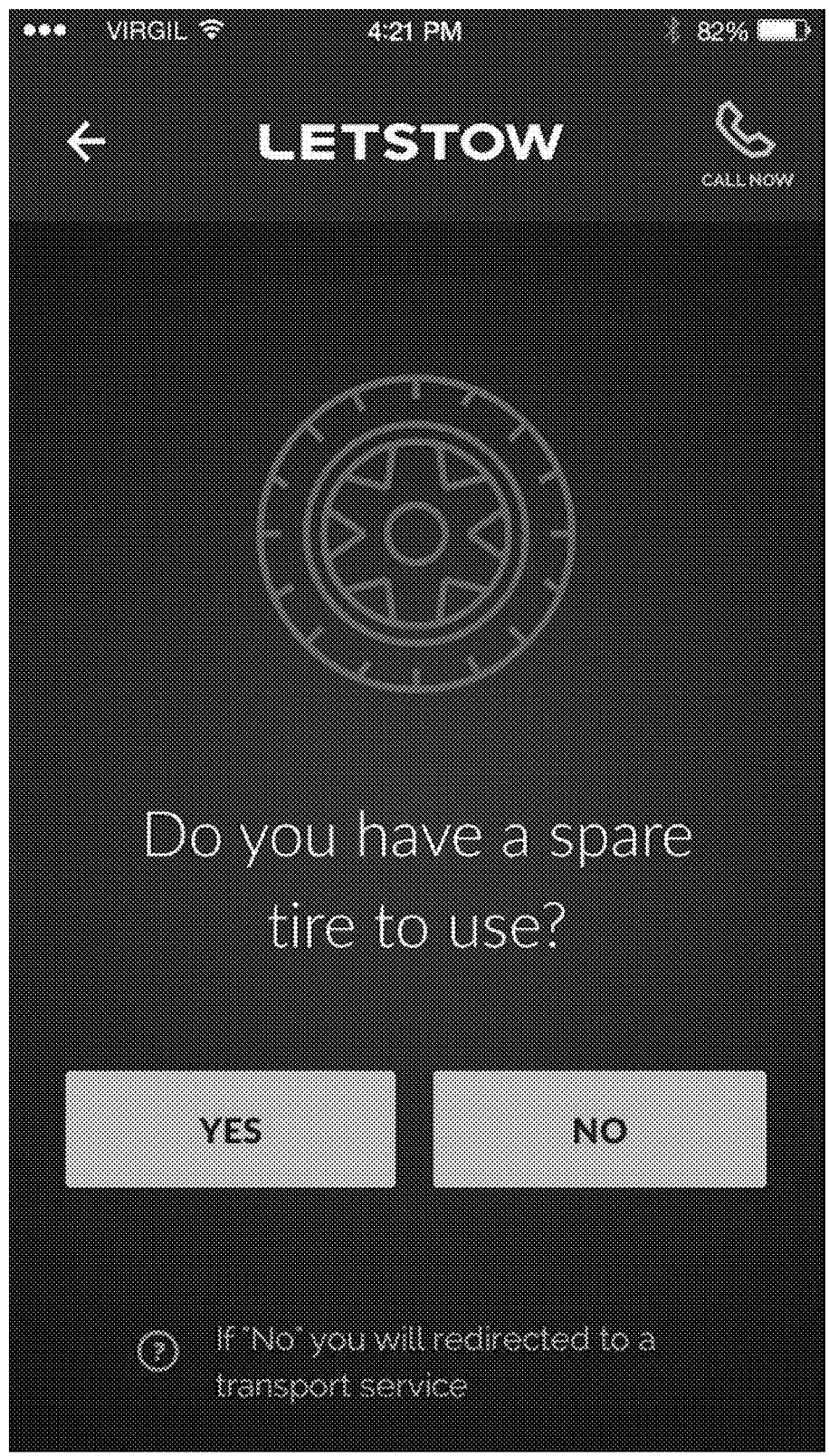

FIG. 13 is a screenshot of a second submenu allowing selection of a second subparameter of the flat tire service type.

Figure 14:
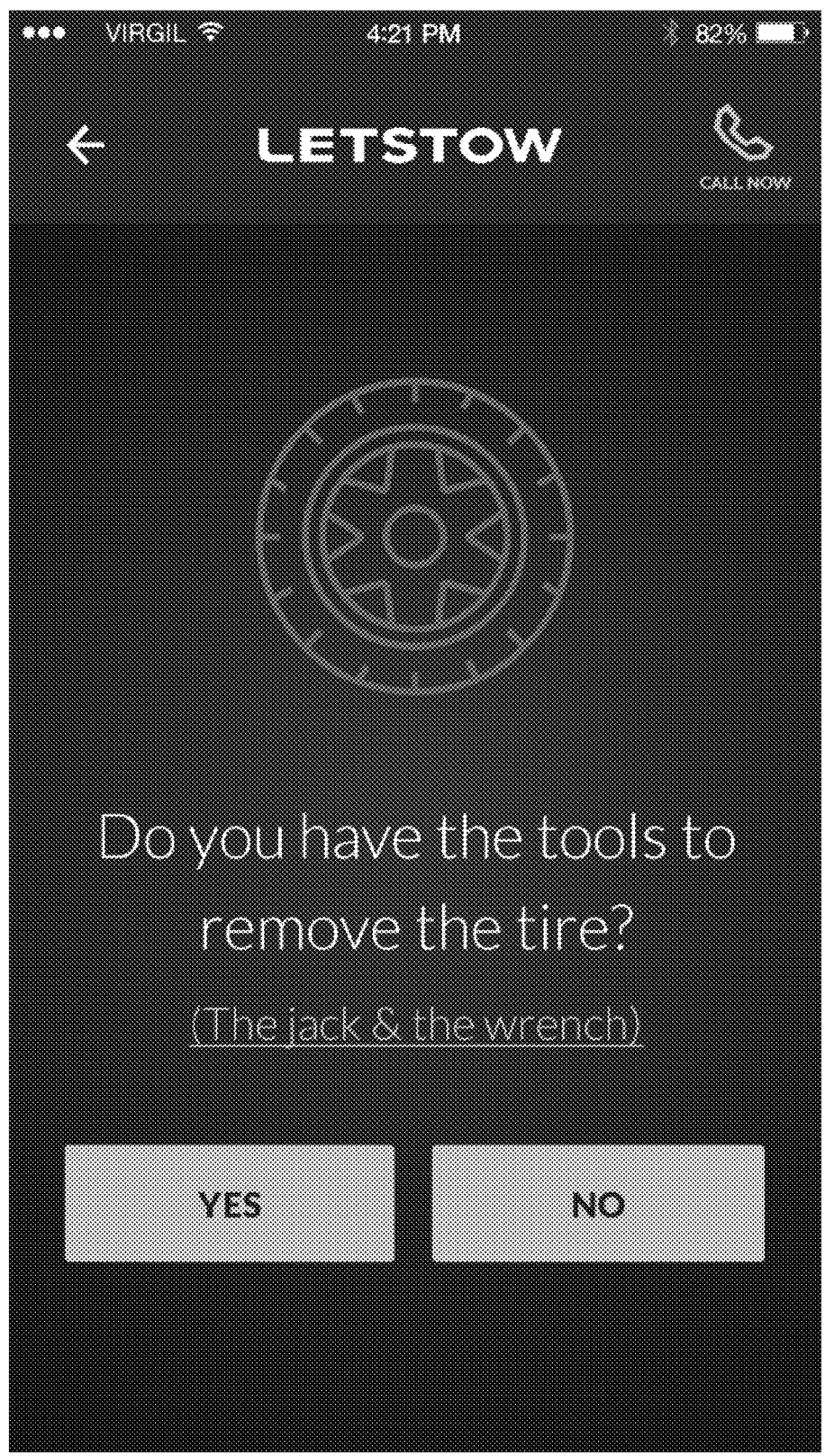

FIG. 14 is a screenshot of a third submenu allowing selection of a third subparameter of the flat tire service type.

Figure 15:
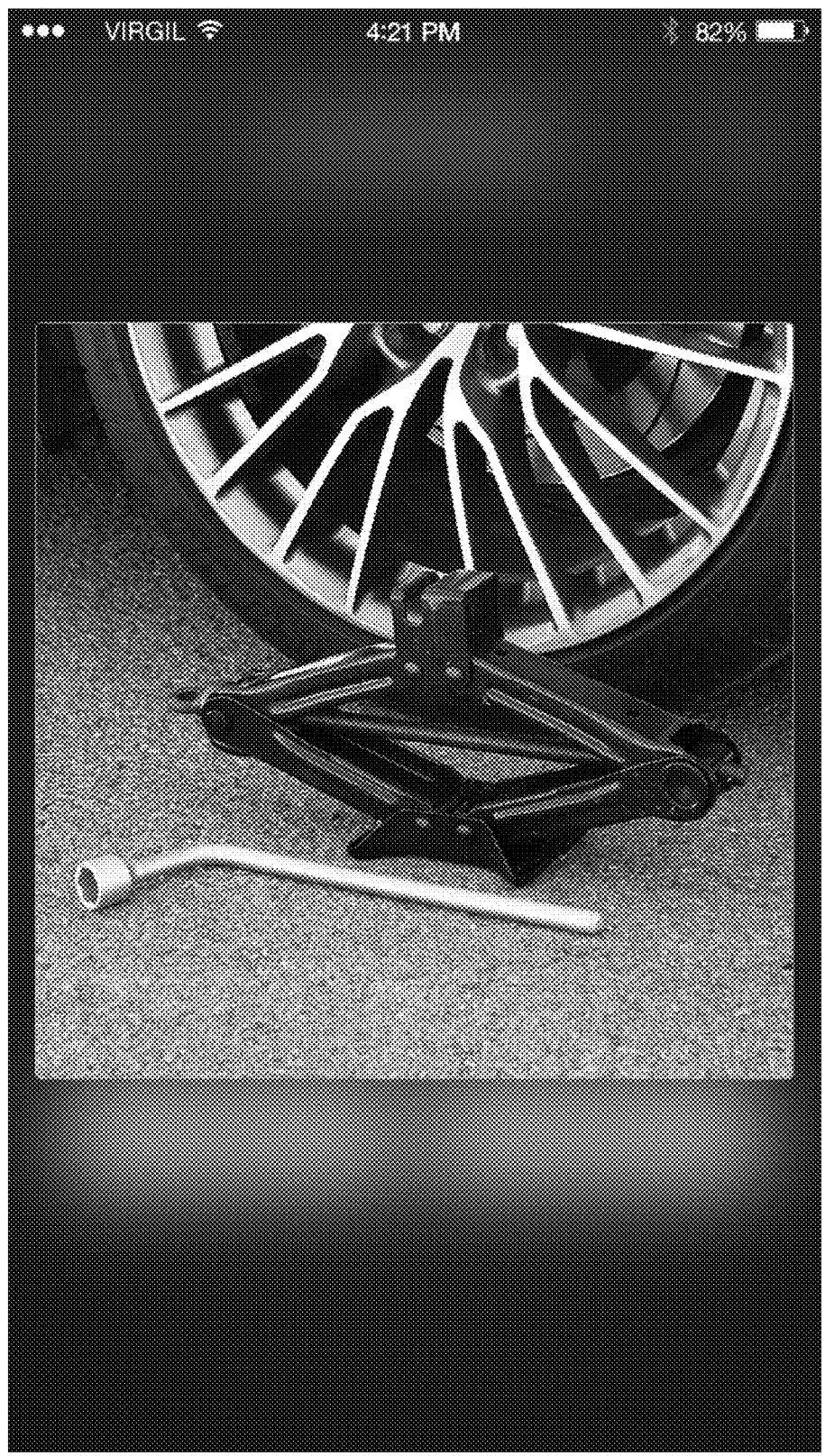

FIG. 15 is a screenshot of a photograph showing an example of types of tools, which a driver can study to answer the third submenu illustrated in FIG. 14.

Figure 16:
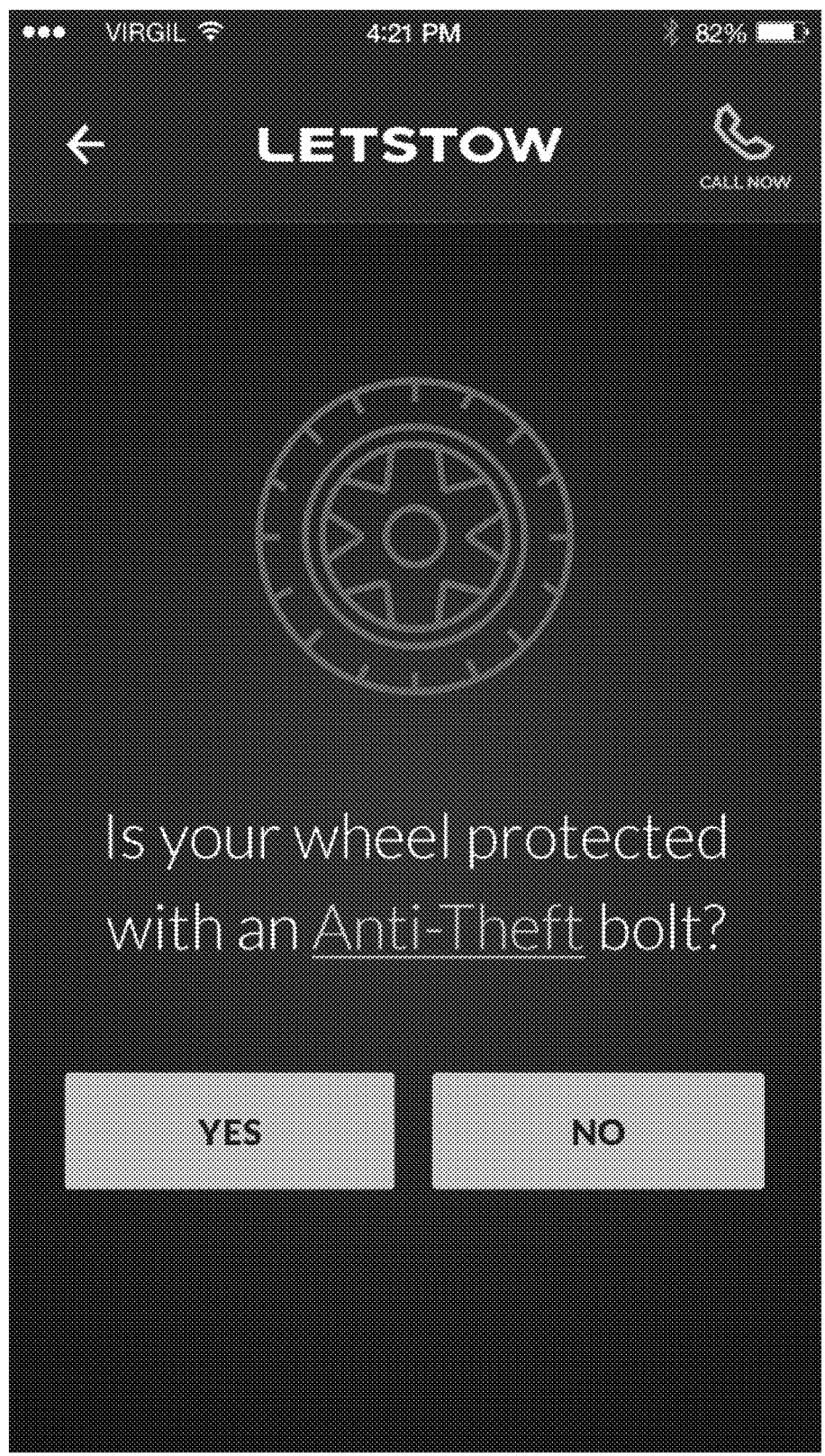

FIG. 16 is a screenshot of a fourth submenu allowing selection of a fourth subparameter of flat service type.

Figure 17:

FIG. 17 is a screenshot of a photograph showing an example of a type of bolt, which a driver can study to answer the fourth submenu illustrated in FIG. 16.

Figure 18:
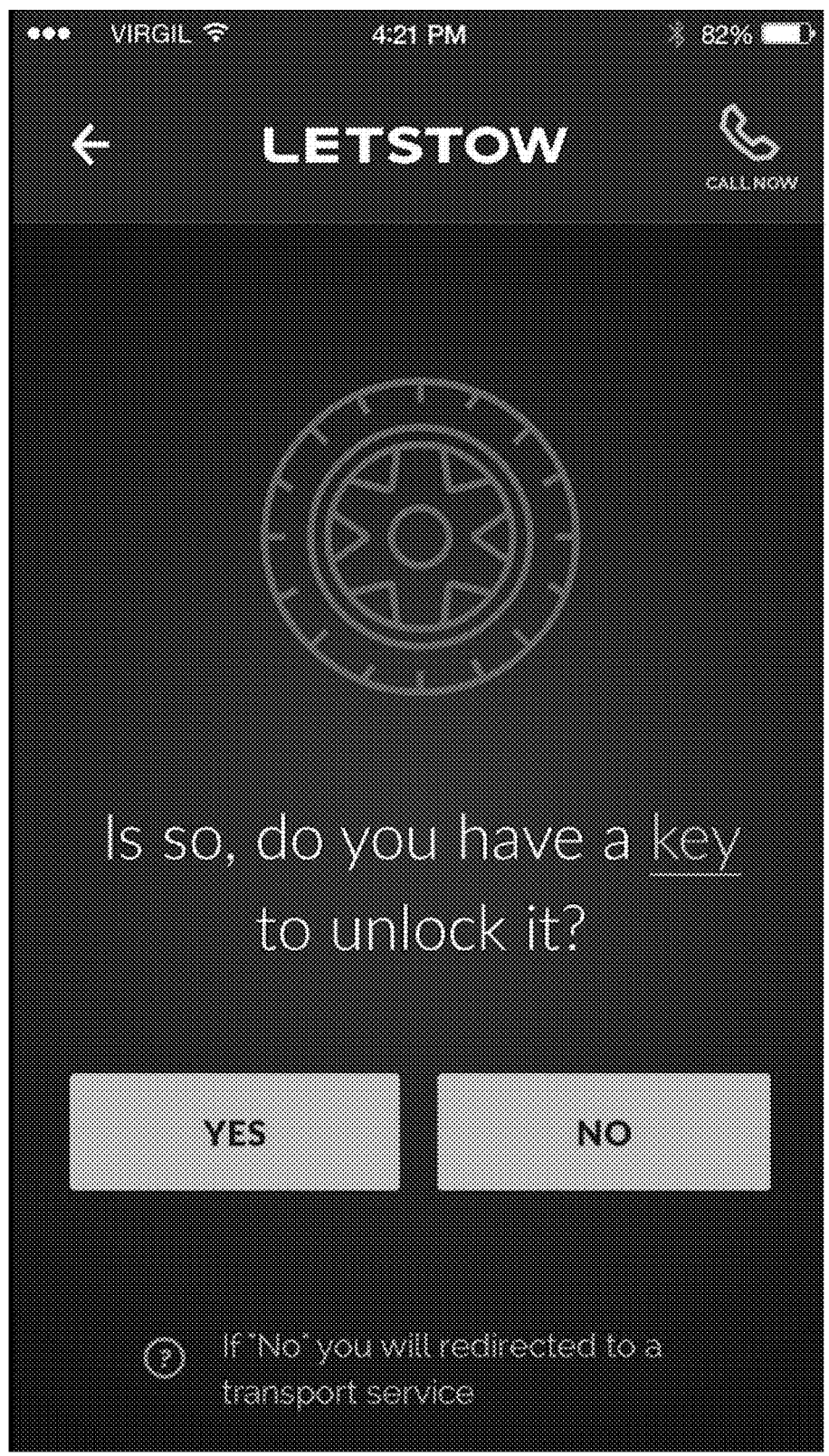

FIG. 18 is a screenshot of a fifth submenu allowing selection of a fifth subparameter of flat service type.

Figure 19:

FIG. 19 is a screenshot of a photograph showing an example of a type of blot, which a driver can study to answer the fourth and fifth submenu illustrated in FIG. 18.

Figure 20:
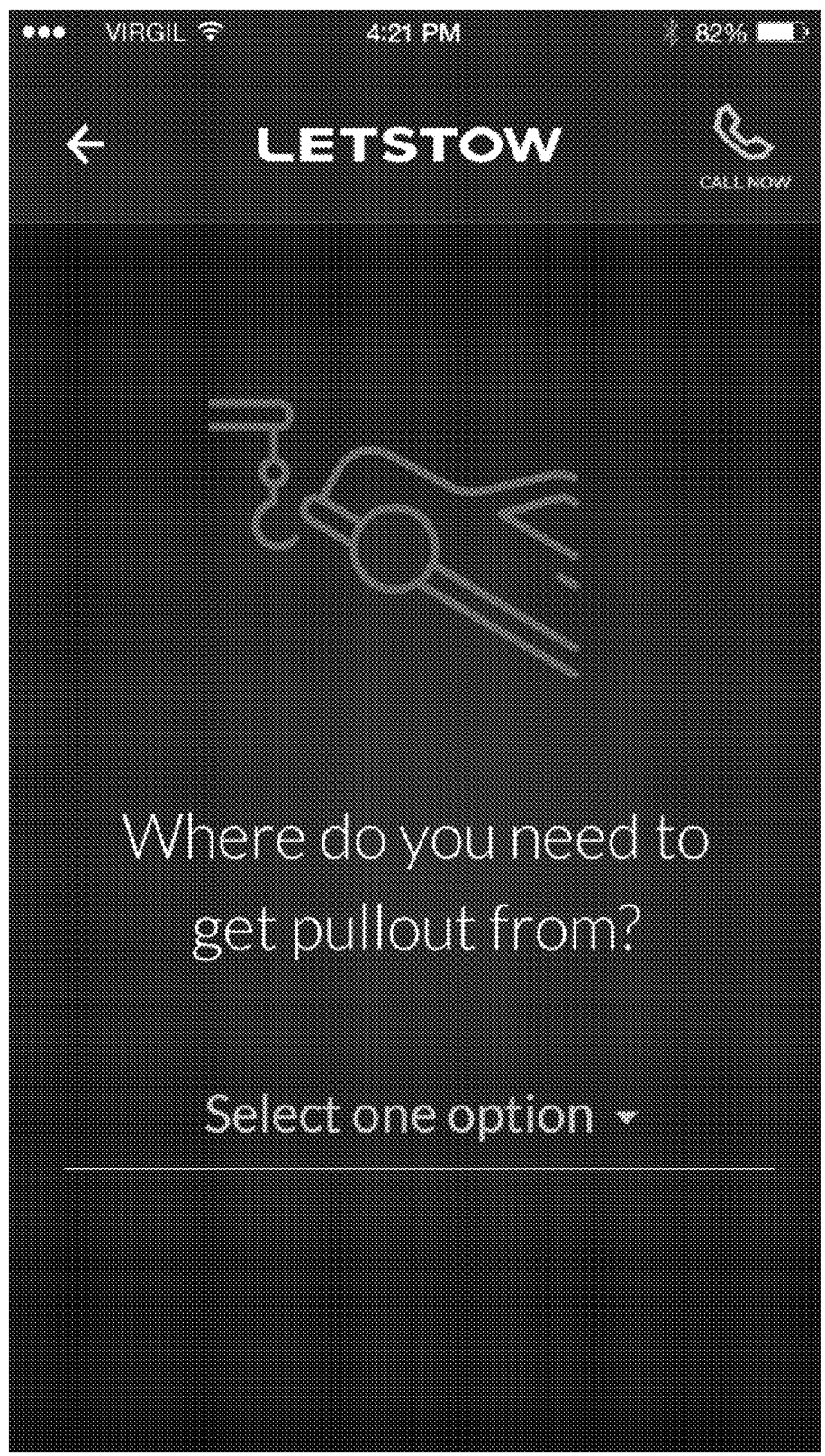

FIG. 20 is a screenshot of a first submenu allowing selection of a first subparameter of the pullout type.

Figure 21:
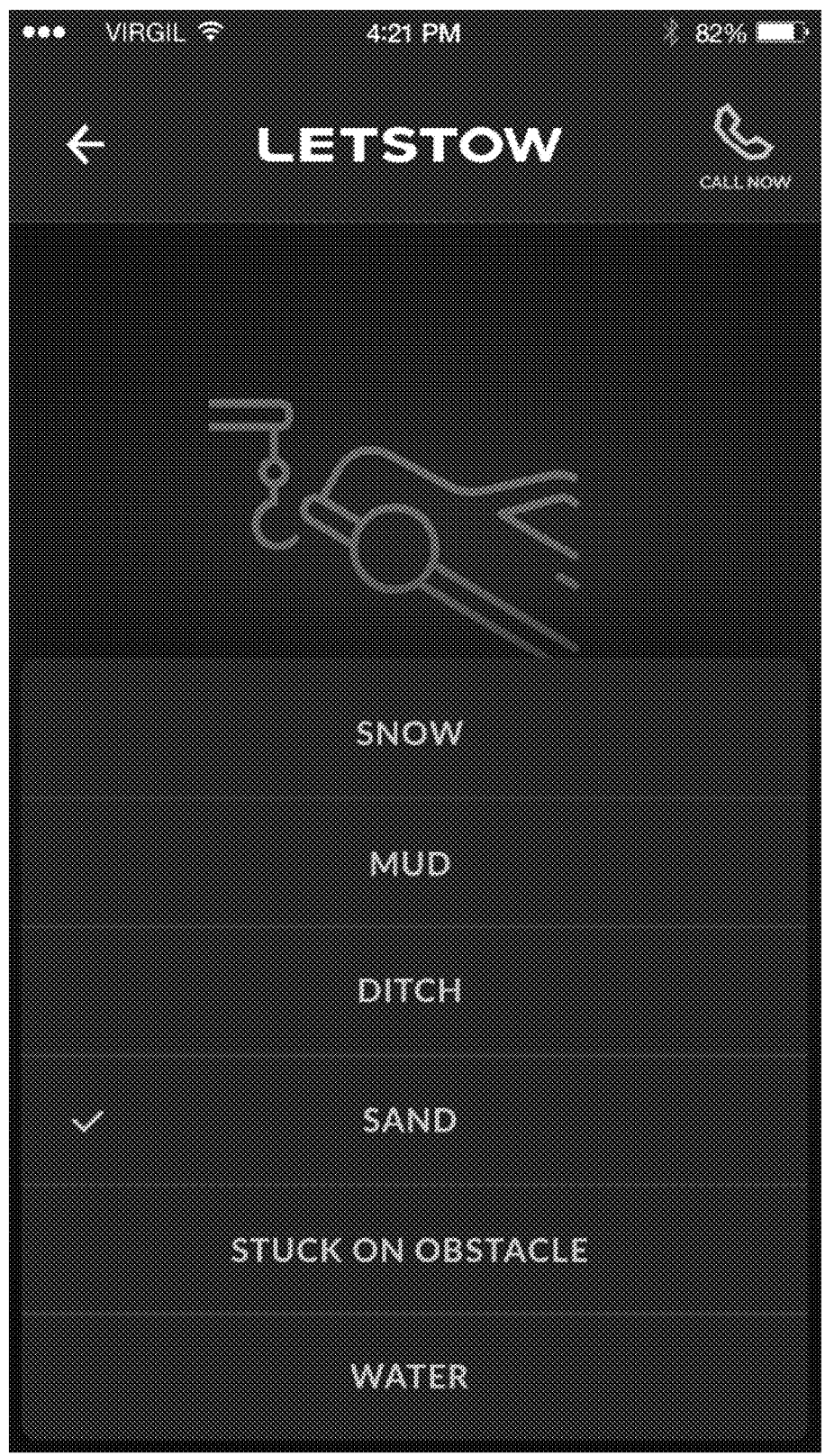

FIG. 21 is a screenshot showing the drop-down options of the first submenu illustrated in FIG. 20.

Figure 22:
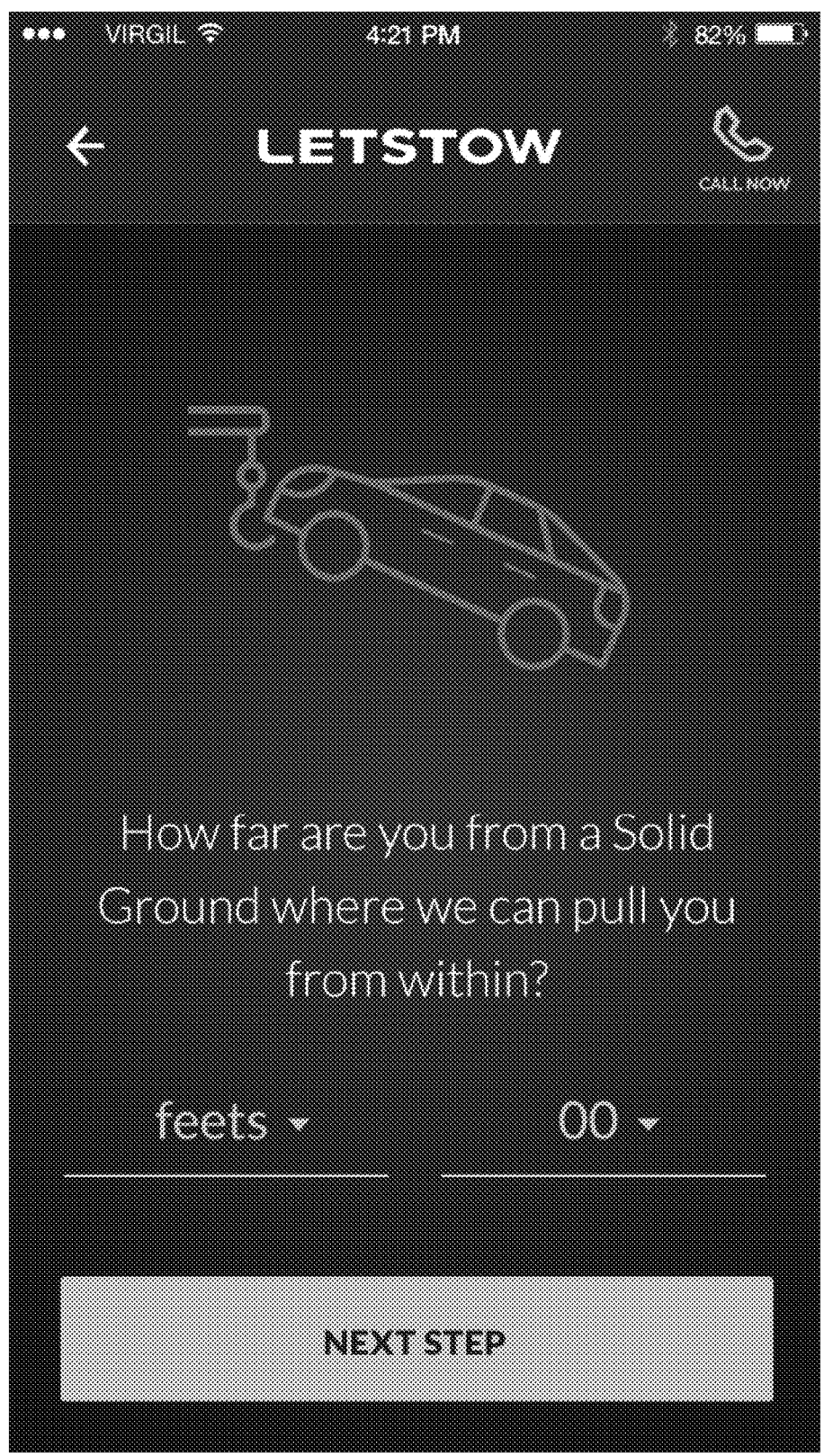

FIG. 22 is a screenshot of a second submenu allowing selection of a second subparameter of the pullout type.

Figure 23:
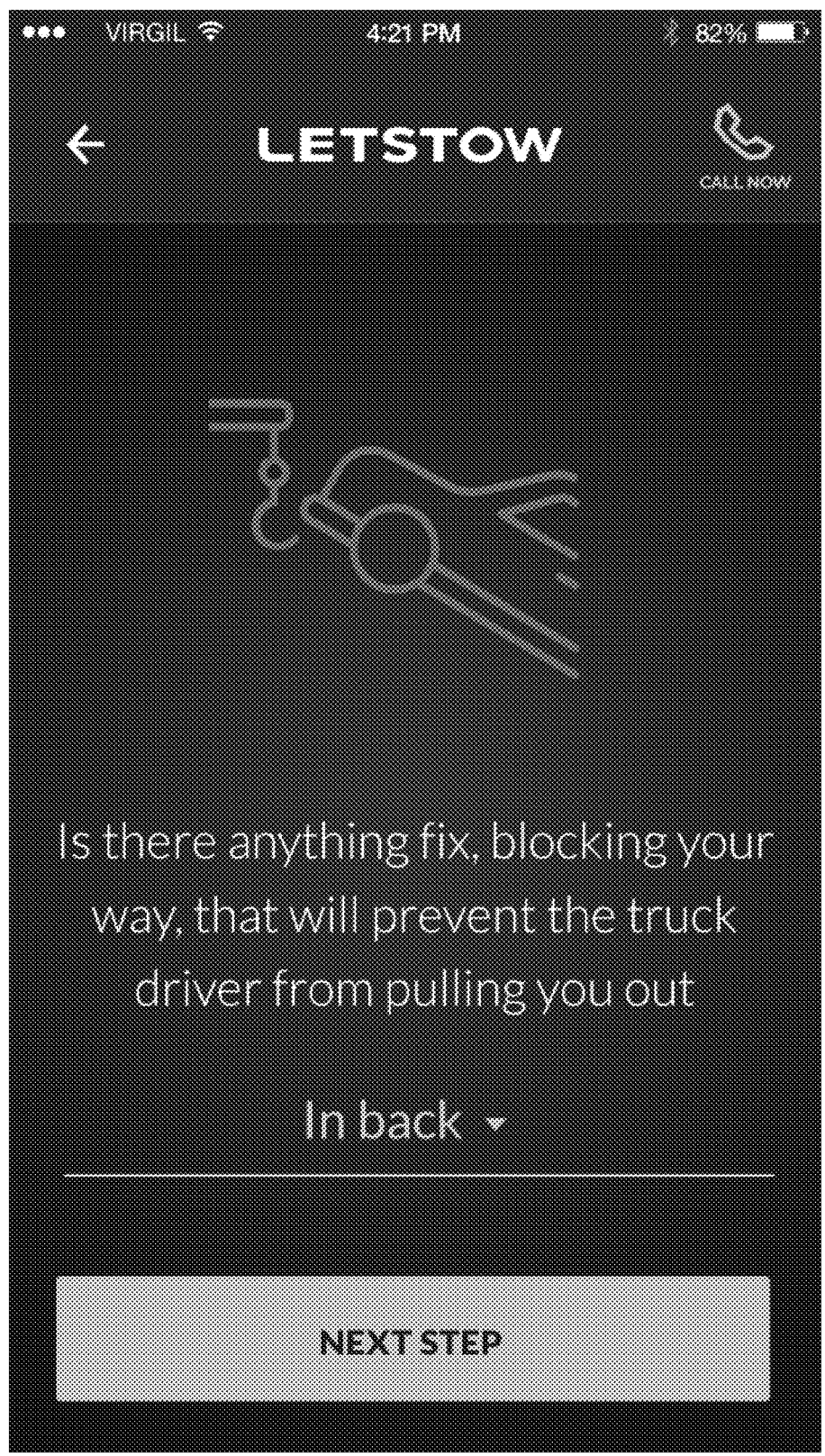

FIG. 23 is a screenshot of a third submenu allowing selection of a third subpamareter of the pullout type.

Figure 24:
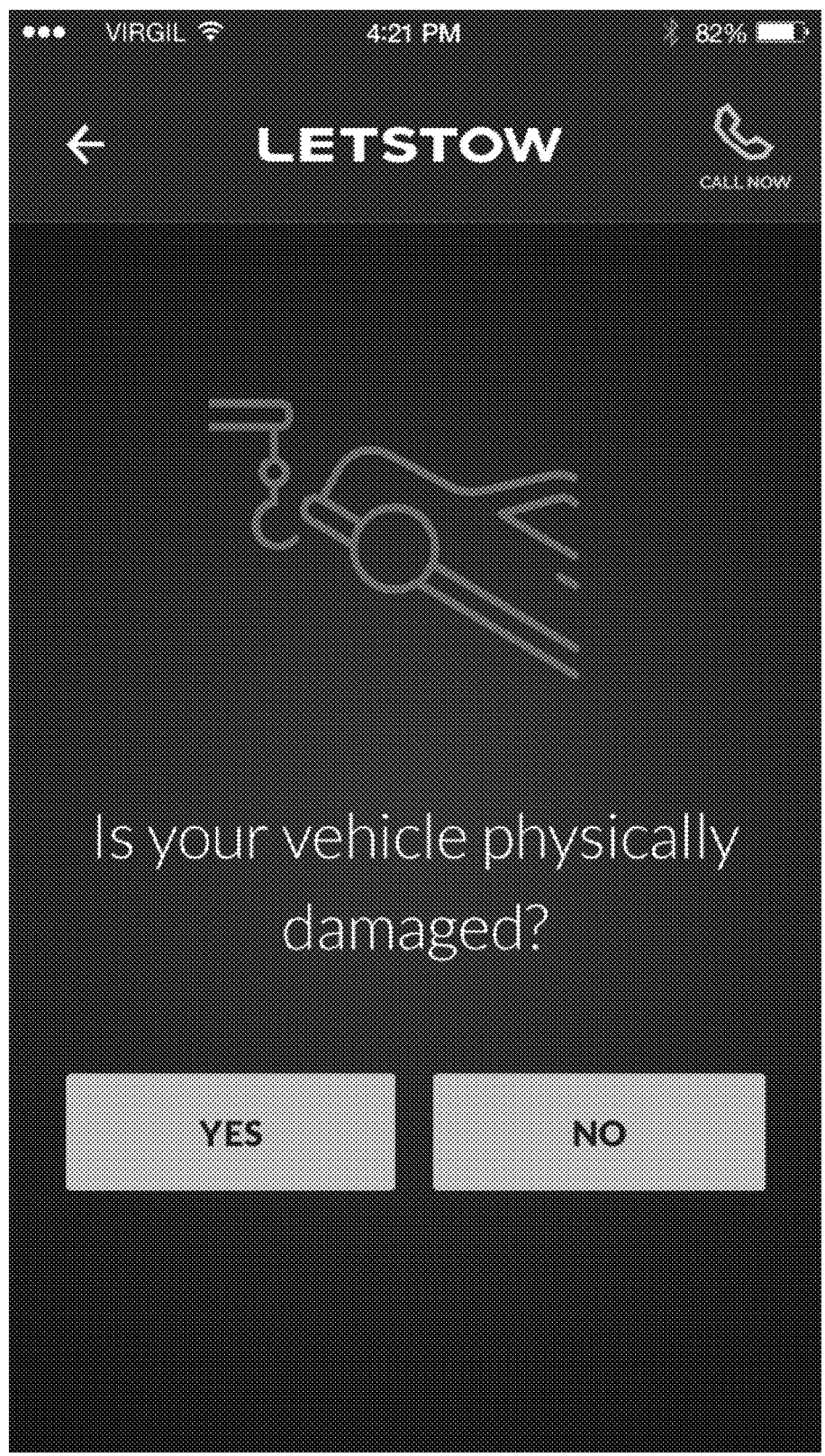

FIG. 24 is a screenshot of a fourth submenu allowing selection of a fourth subparameter of the pullout type.

Figure 25:
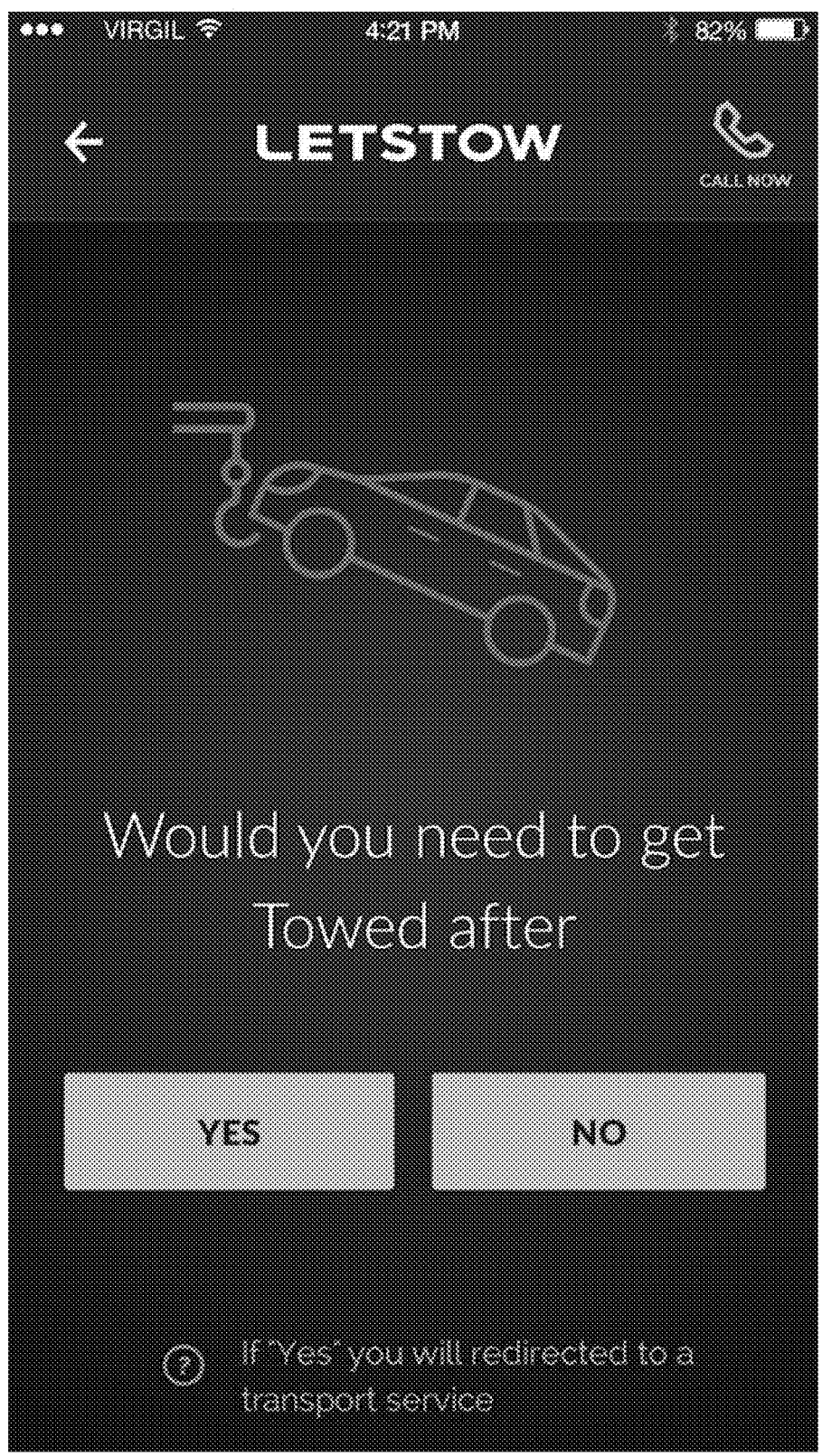

FIG. 25 is a screenshot of a fifth submenu allowing selection of a fifth subparameter of the pullout type.

Figure 26:
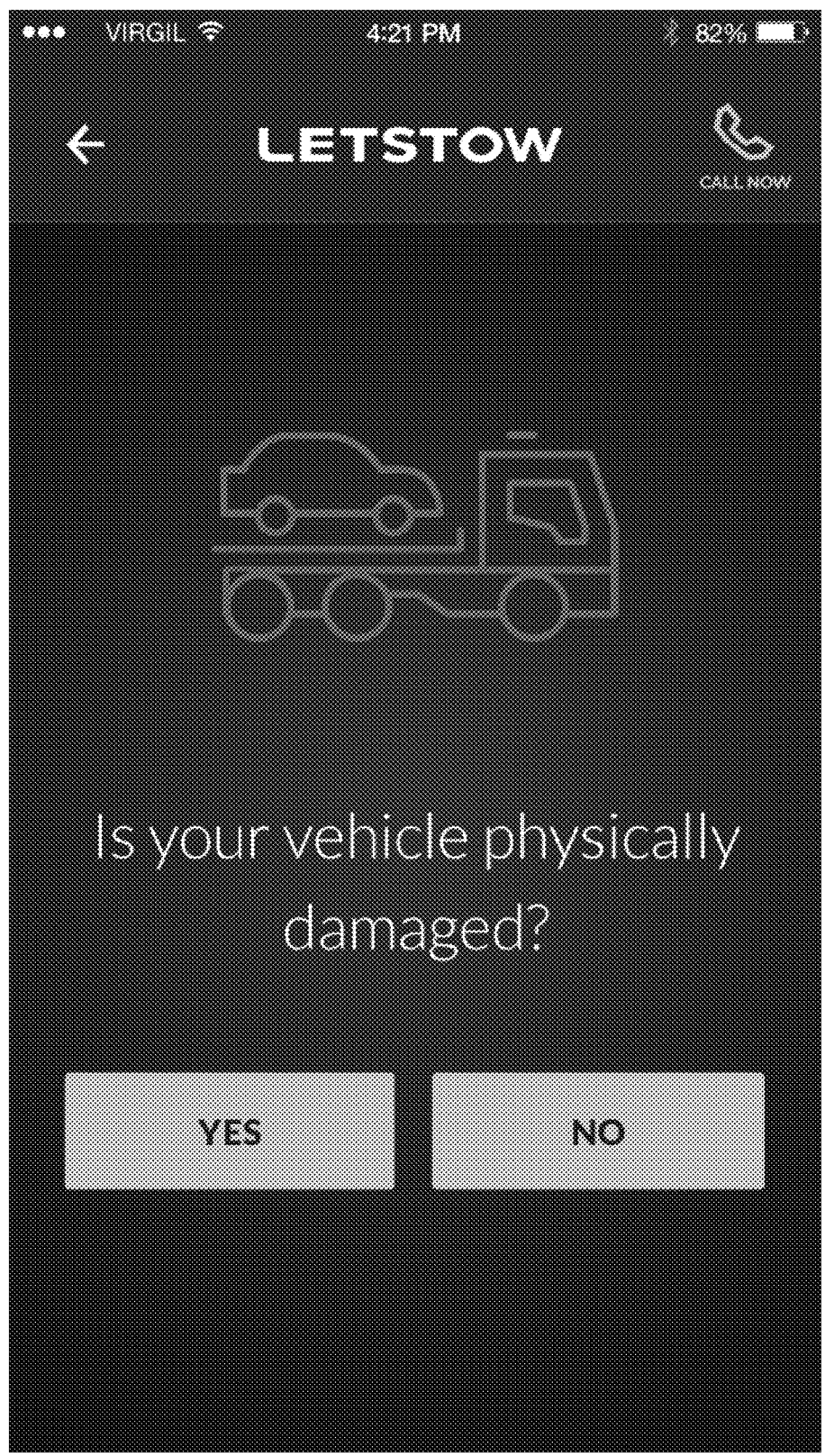

FIG. 26 is a screenshot of a first submenu allowing selection of a first subparameter of the transport type.

Figure 27:
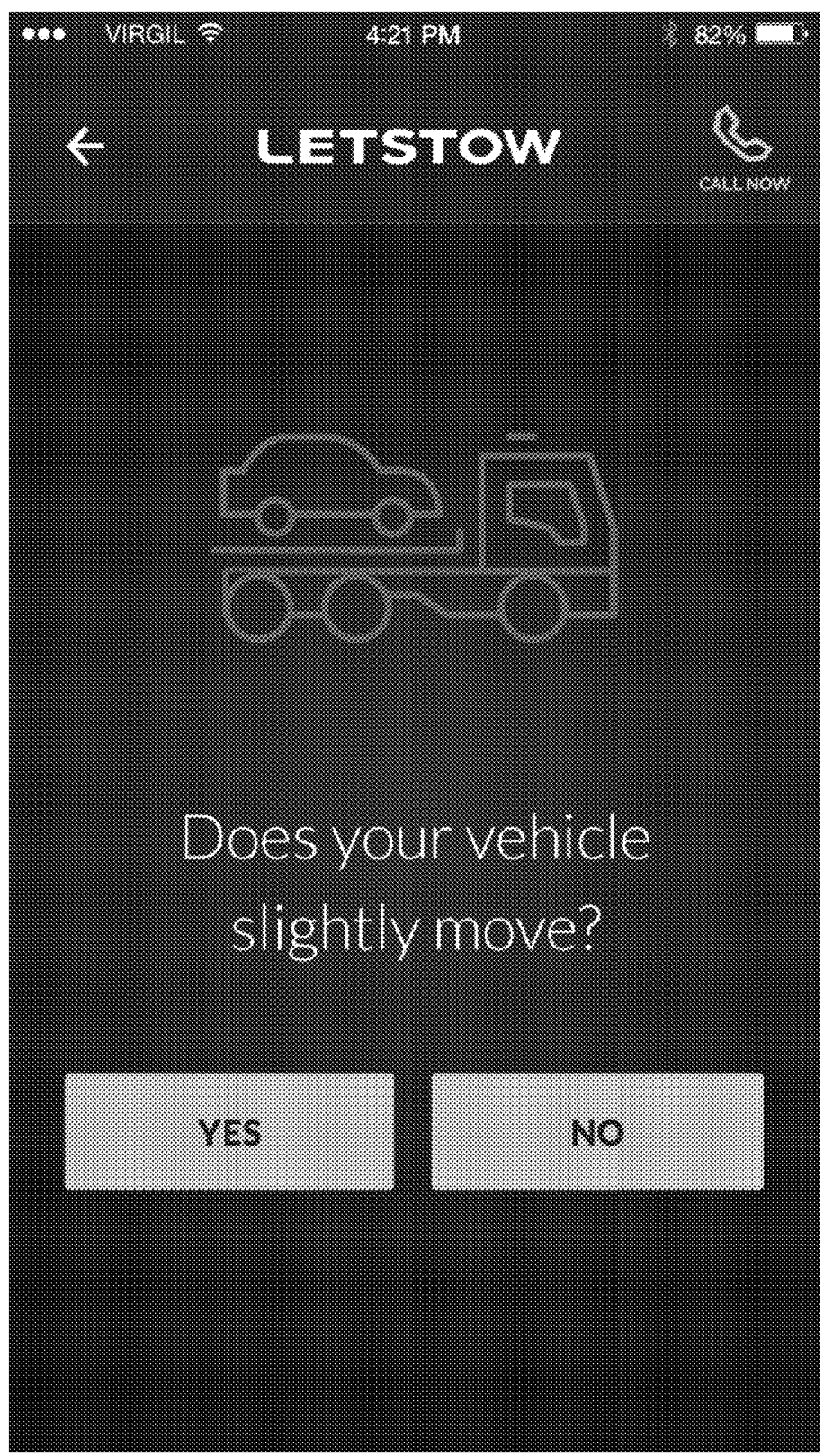

FIG. 27 is a screenshot of a second submenu allowing selection of a second subparameter of the transport type.

Figure 28:
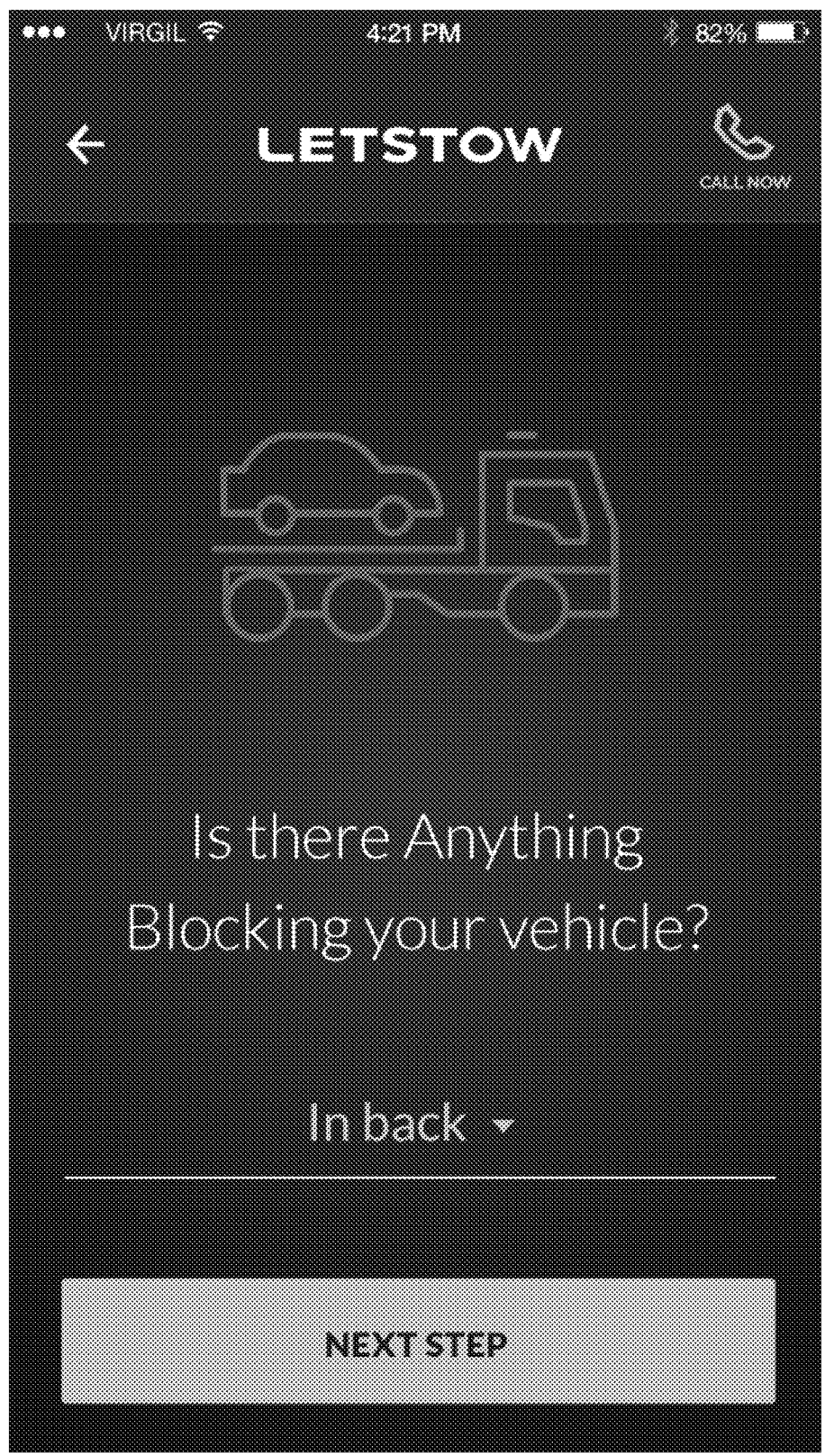

FIG. 28 is a screenshot of a third submenu allowing selection of a third subparameter of the transport type.

Figure 29:
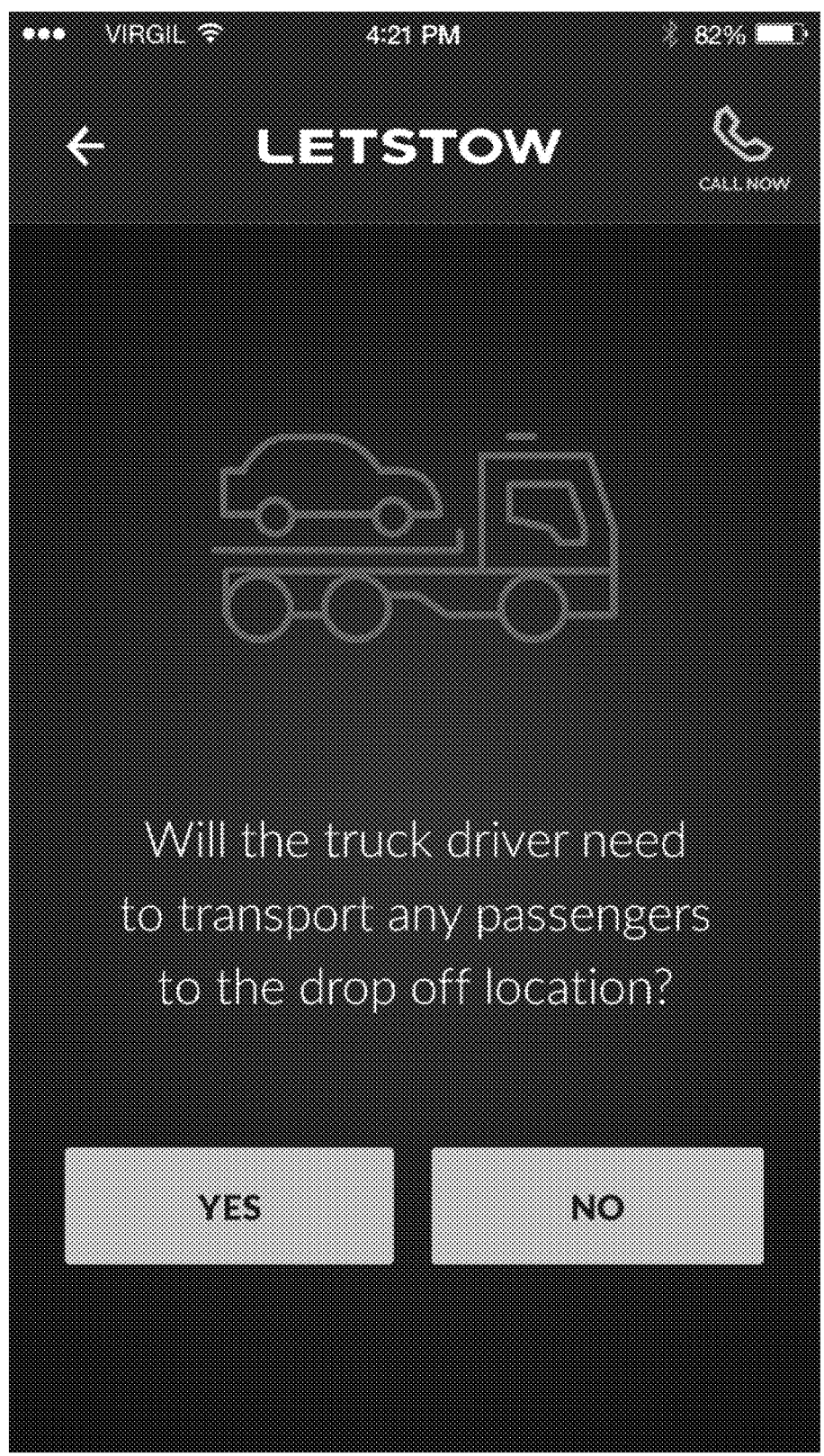

FIG. 29 is a screenshot of a fourth submenu allowing selection of a fourth subparameter of the transport type, which may also be a follow-up to any one of the following types of services: pullout, boost, lockout and tire.

Figure 30:
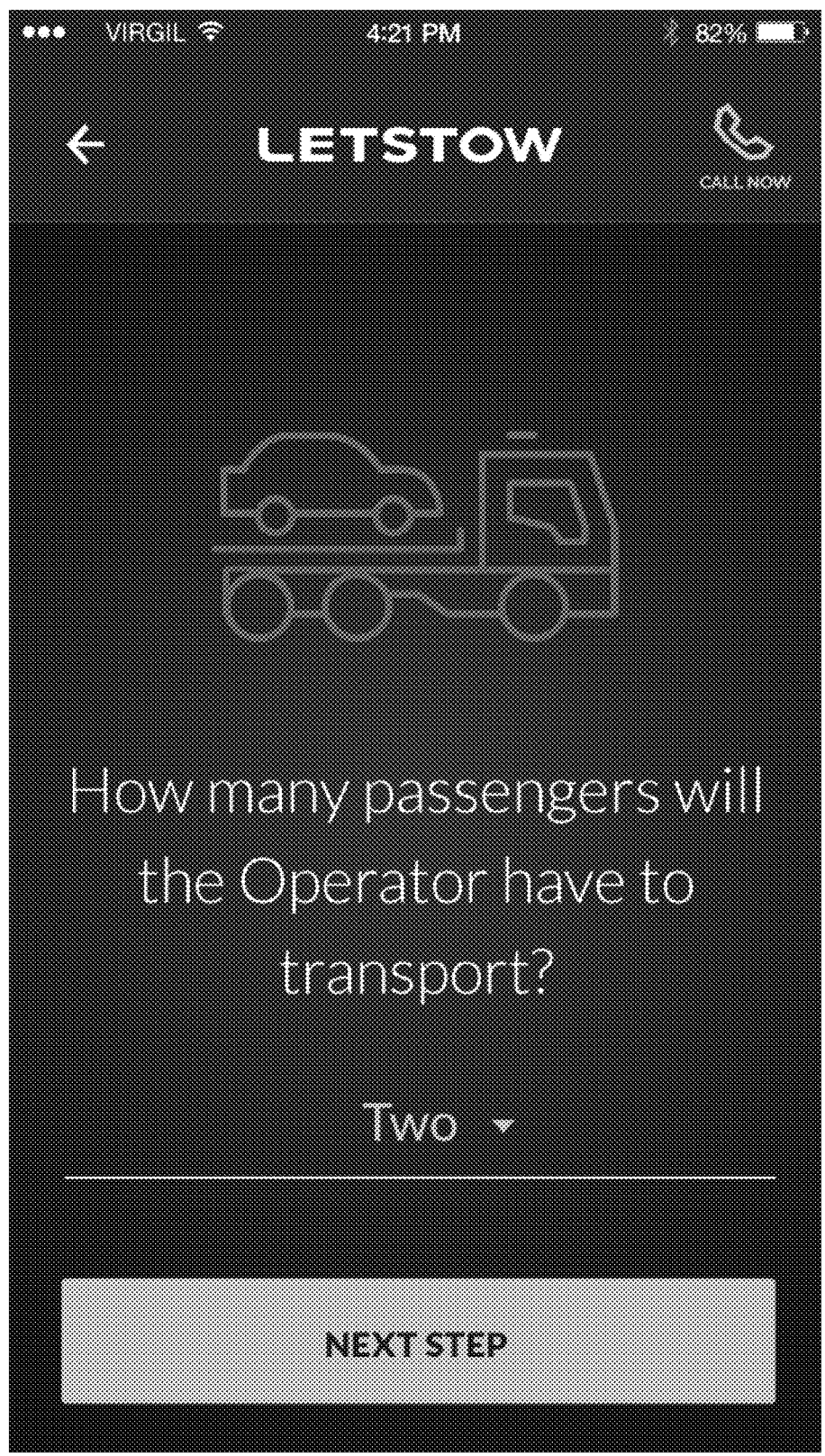

FIG. 30 is a screenshot of a fifth submenu allowing selection of a fifth subparameter of the transport type, which may also be a follow-up to the pullout type service.

Figure 31:
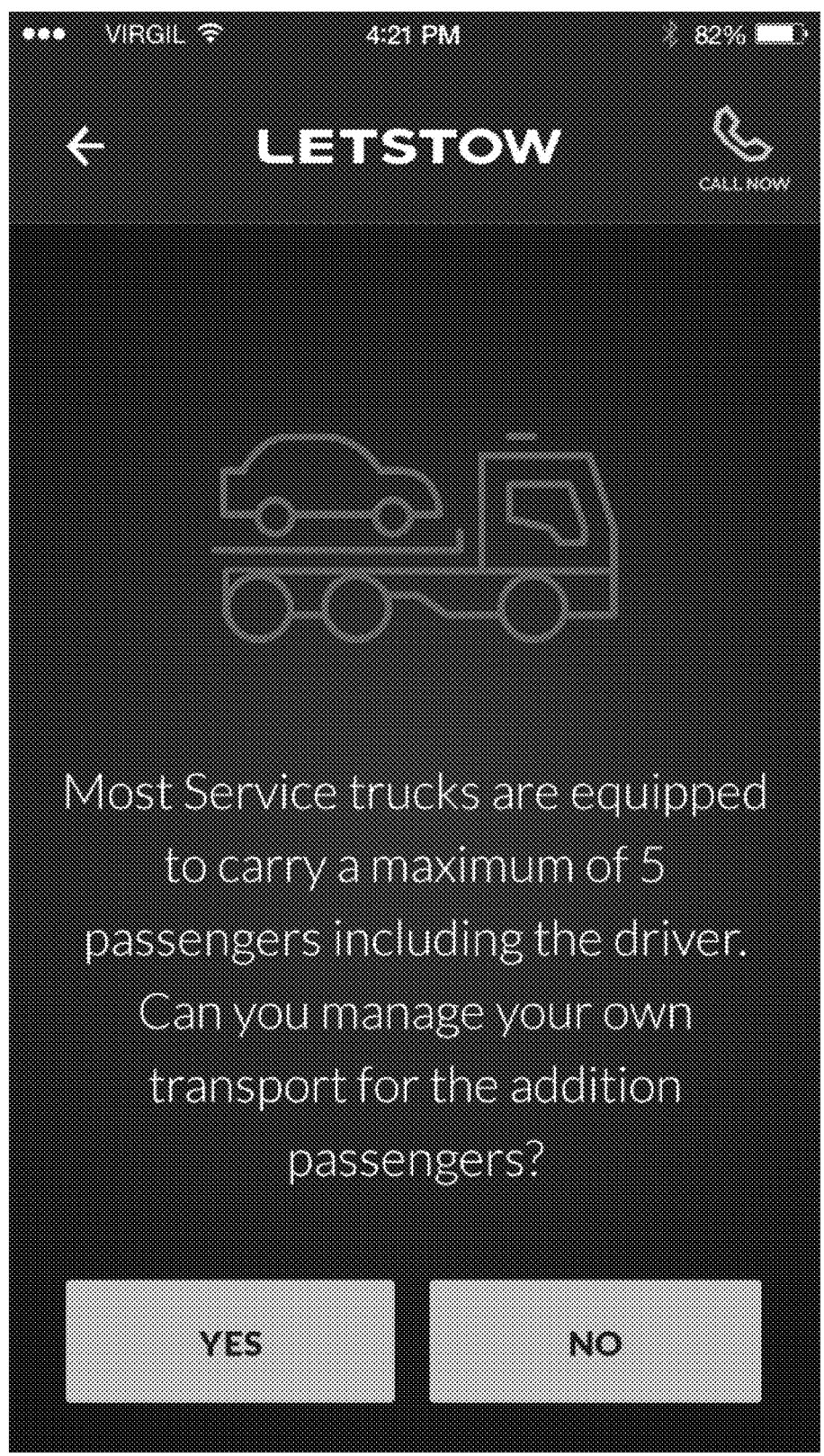

FIG. 31 is a screenshot of a sixth submenu allowing selection of a seventh subparameter of the transport type, which may also be a follow-up to the pullout type service.

Figure 32:
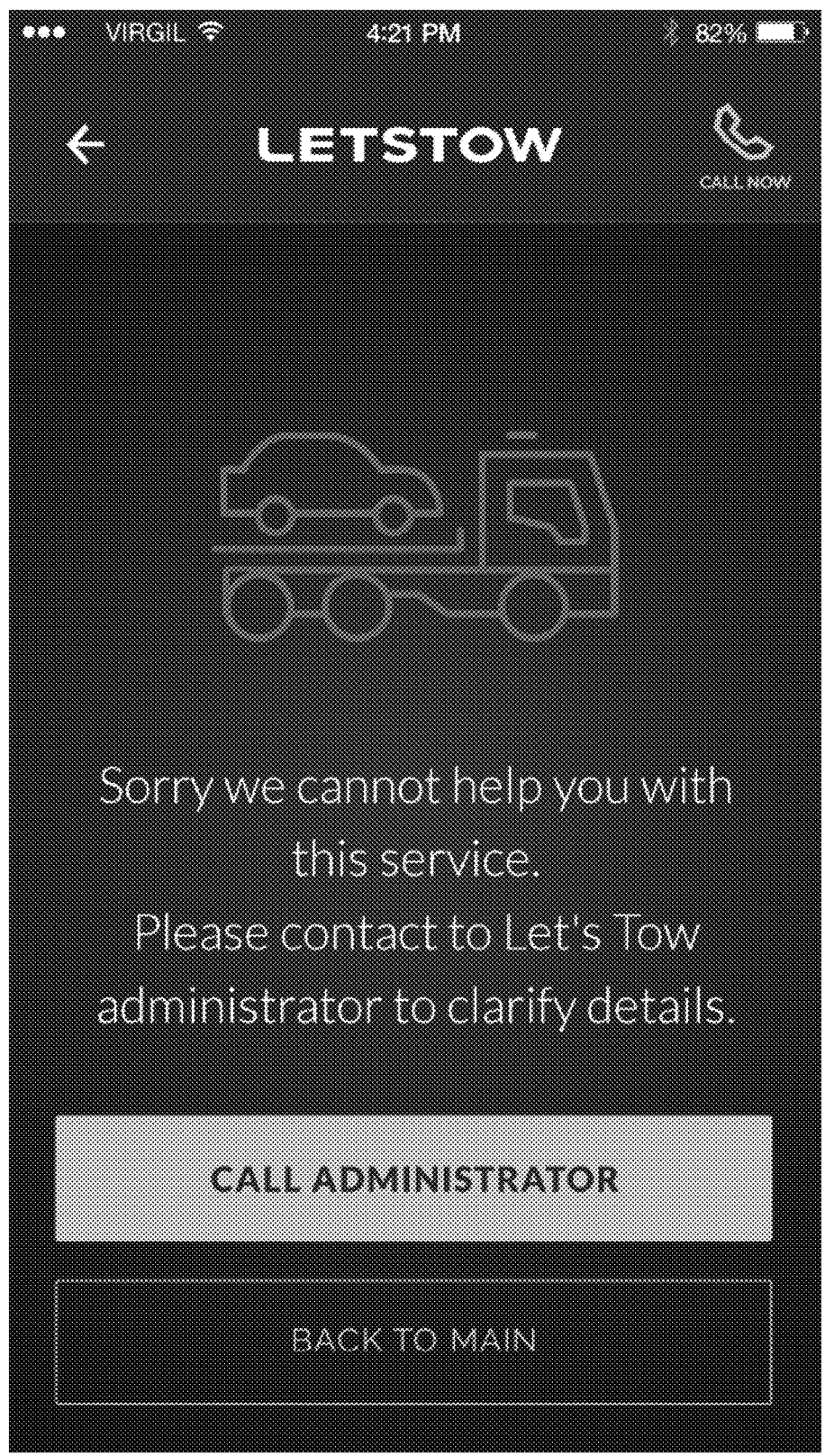

FIG. 32 is a screenshot of a notification requiring a driver to obtain additional information in order to complete a request for an assistance of the transport type. A "call administrator" option is made available, whereby the driver entity can contact a customer representative, for example, so as to have the administrator manually create an electronic roadside assistance request if needed or to edit/add additional information to an electronic roadside assistance already created via a driver device 36 (ex: to add comments useful to the operator entity).

Figure 33:
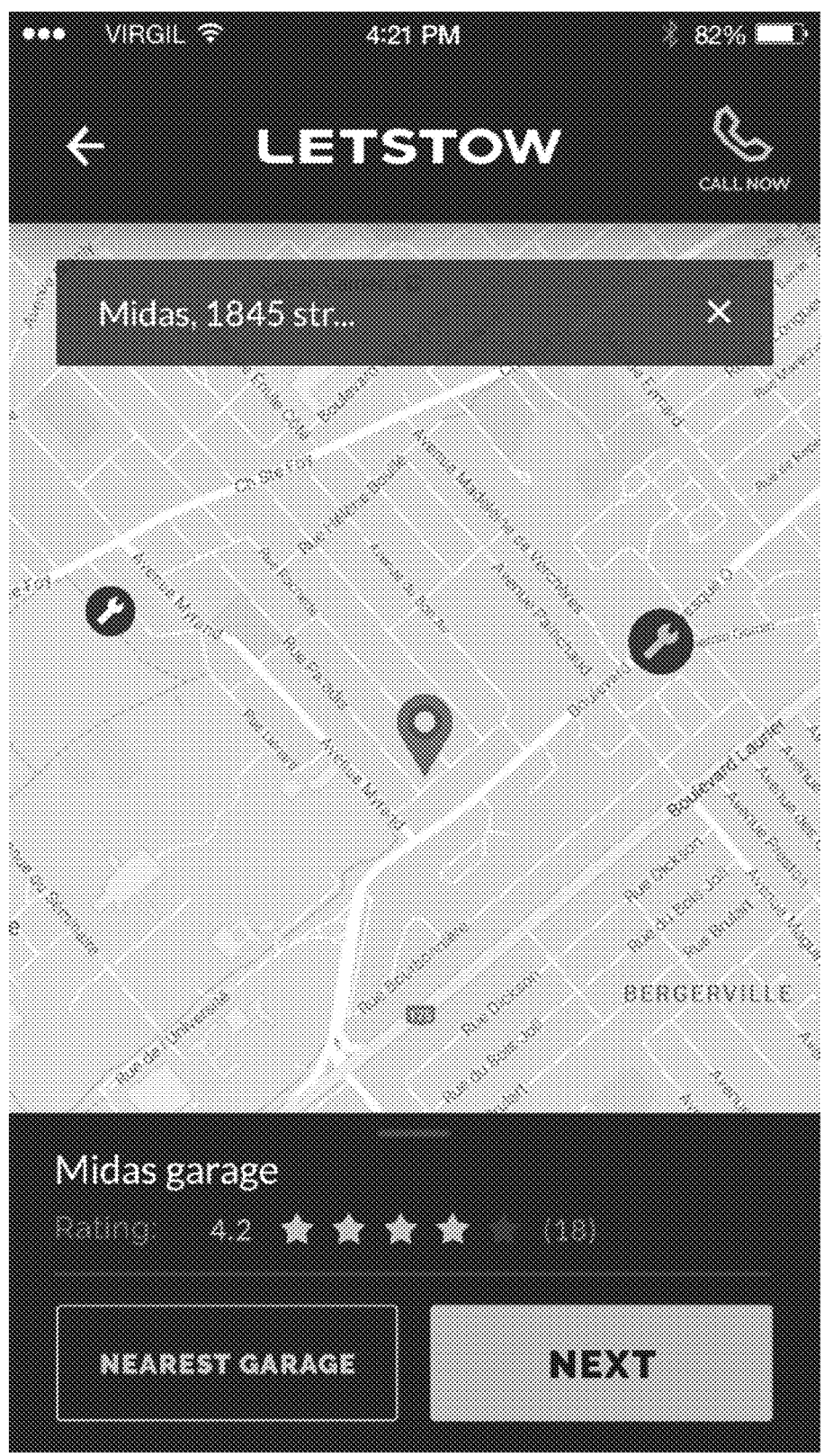

FIG. 33 is a screenshot of a sixth submenu allowing selection of a location where the driver entity's vehicle to be transported to. In the illustrated example, two options of nearby garages are displayed and the driver entity is given the option to choose to have the vehicle towed to one of the garages. FIG. 33 can also presented as a follow-up to the driver entity selecting the option to be towed to the nearest gas station within the submenu illustrated in FIG. 8.

Figure 34:
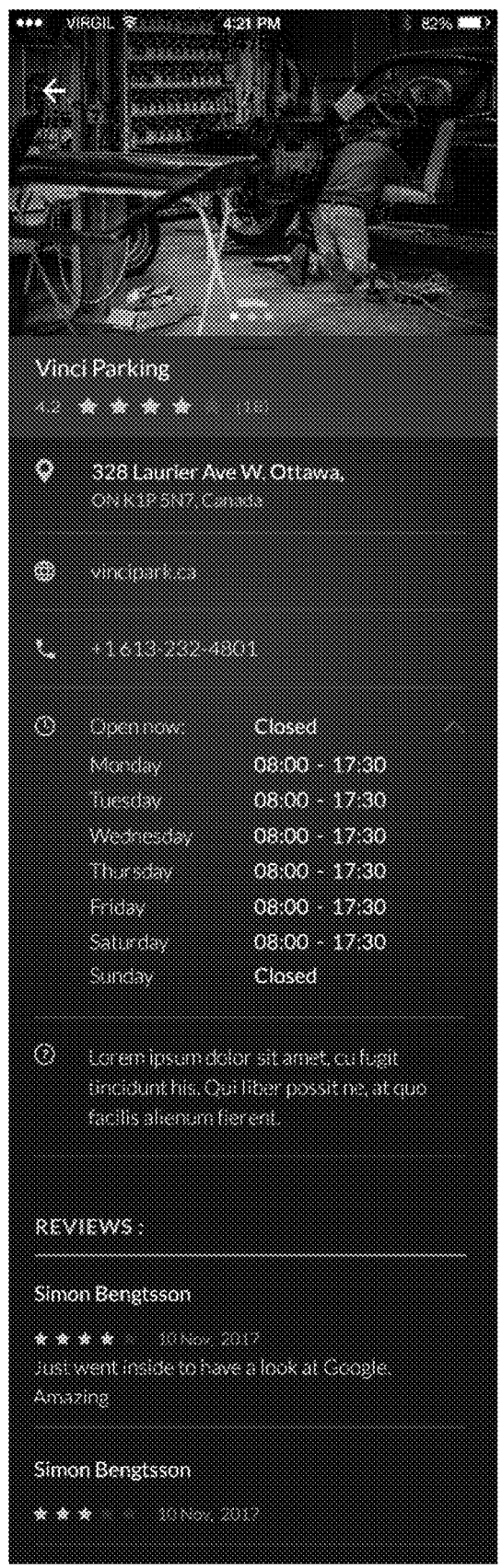

FIG. 34 is a screenshot of a page allowing the user to view information pertaining to one of the nearby garages.

Figure 35:
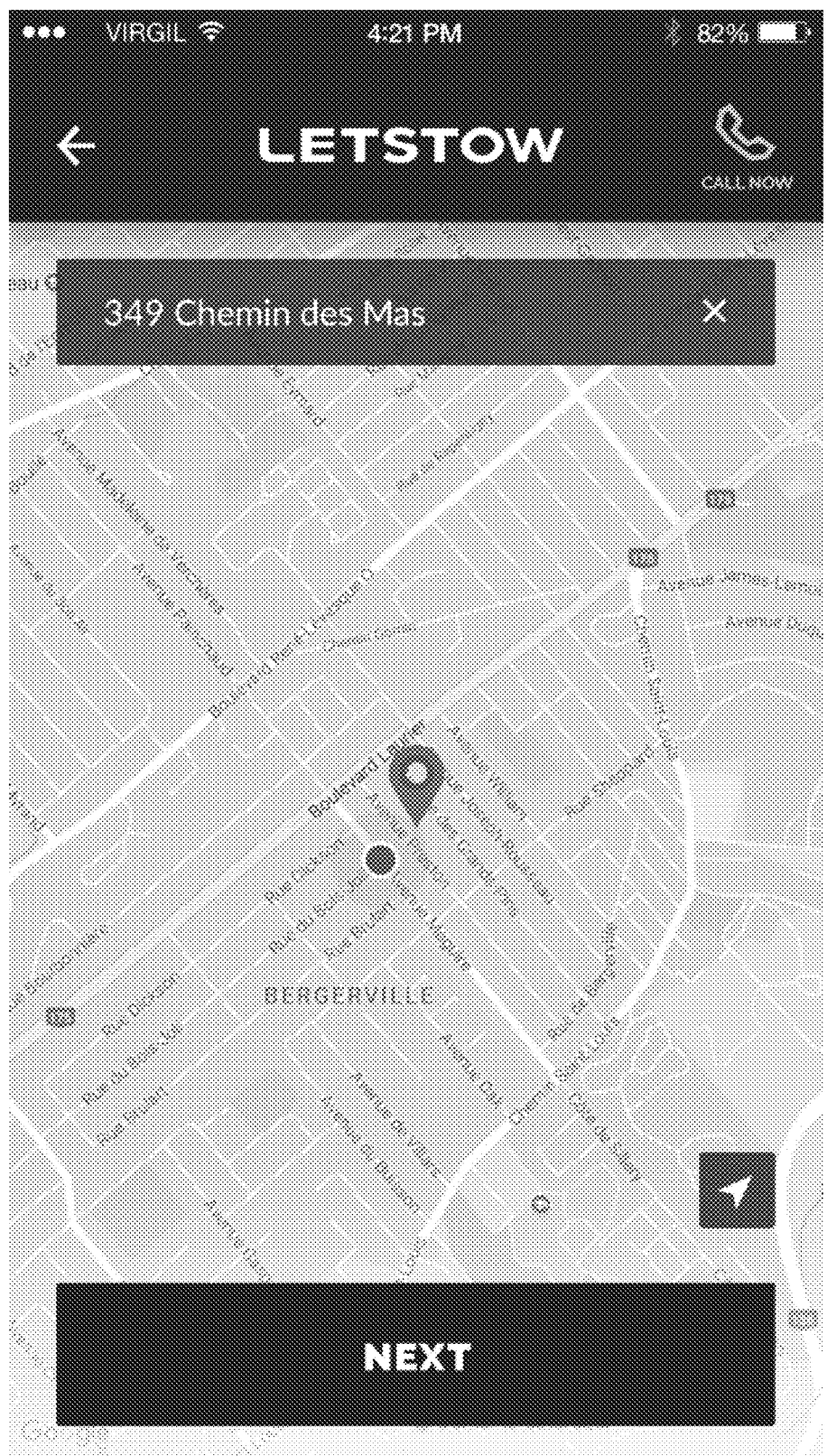

FIG. 35 is a screenshot of a submenu allowing selection of a parameter of the location of driver entity's vehicle. The driver entity is given the option to modify their current location from the location determined by the global position system of the driver device.

Figure 36:
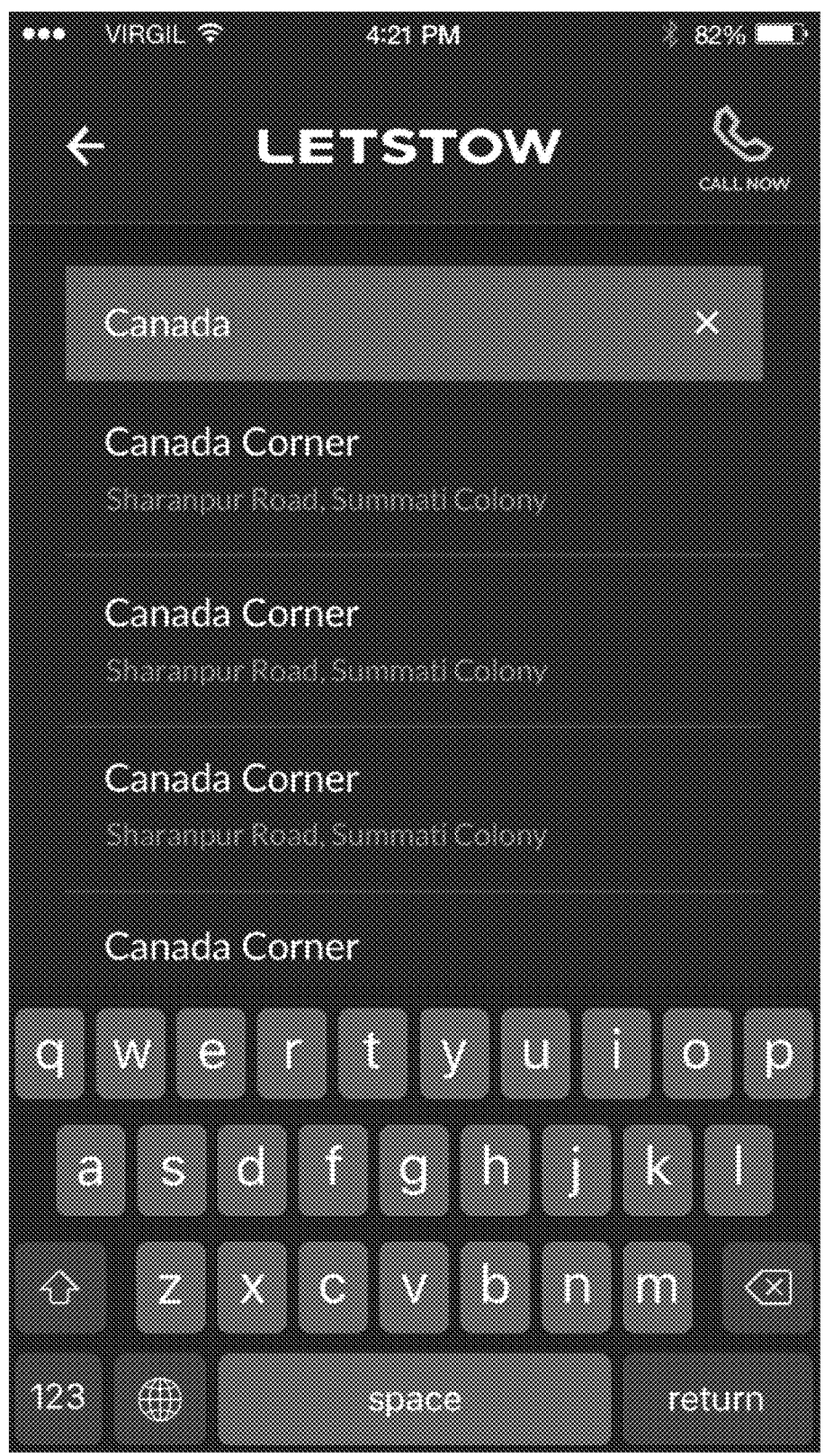

FIG. 36 is a screenshot of another submenu allowing selection of the location of the driver entity's vehicle.

Figure 37:
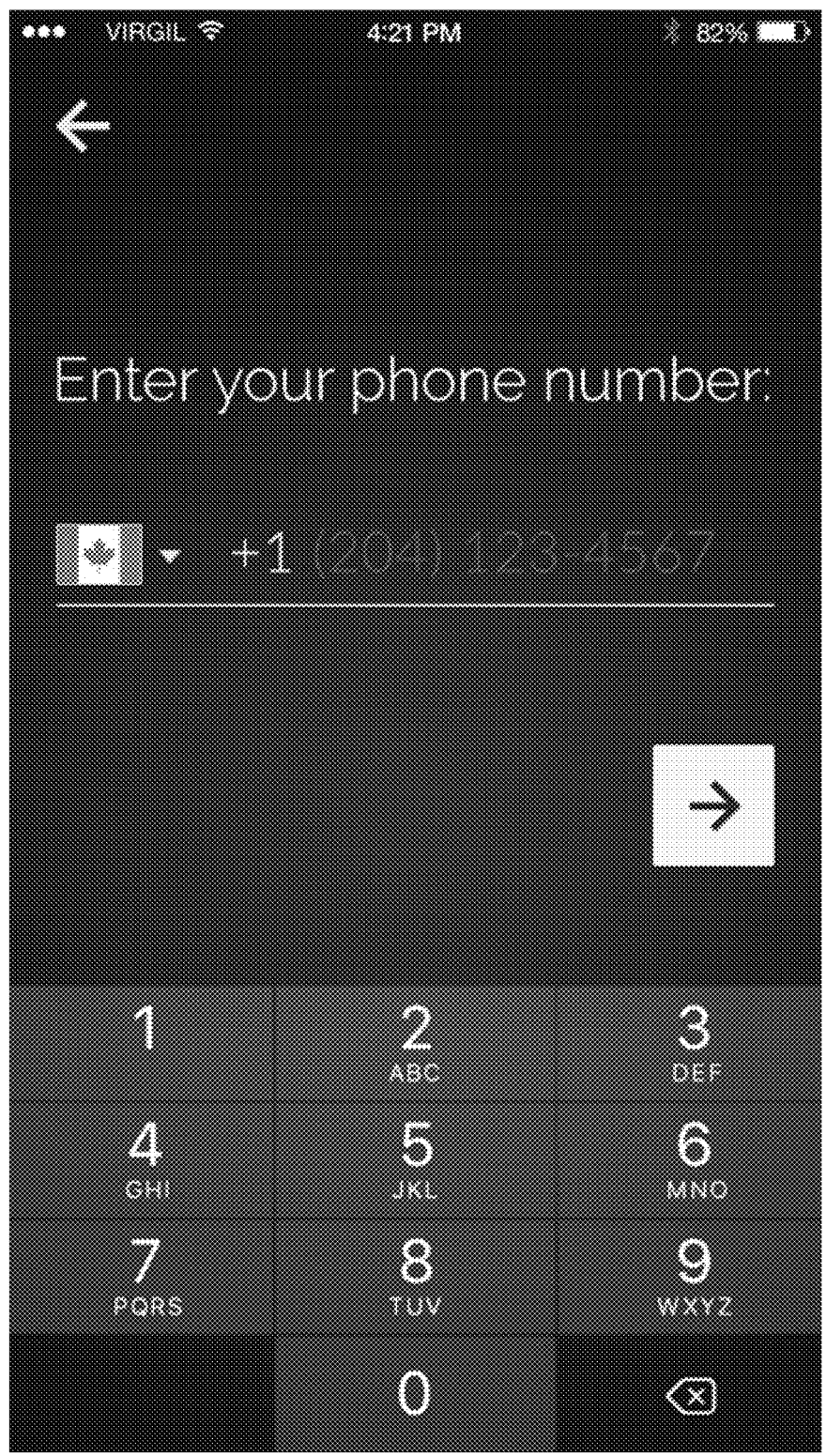

FIG. 37 is a screenshot of a submenu for the driver entity to enter their contact information, which may be part of a registration process.

Figure 38:
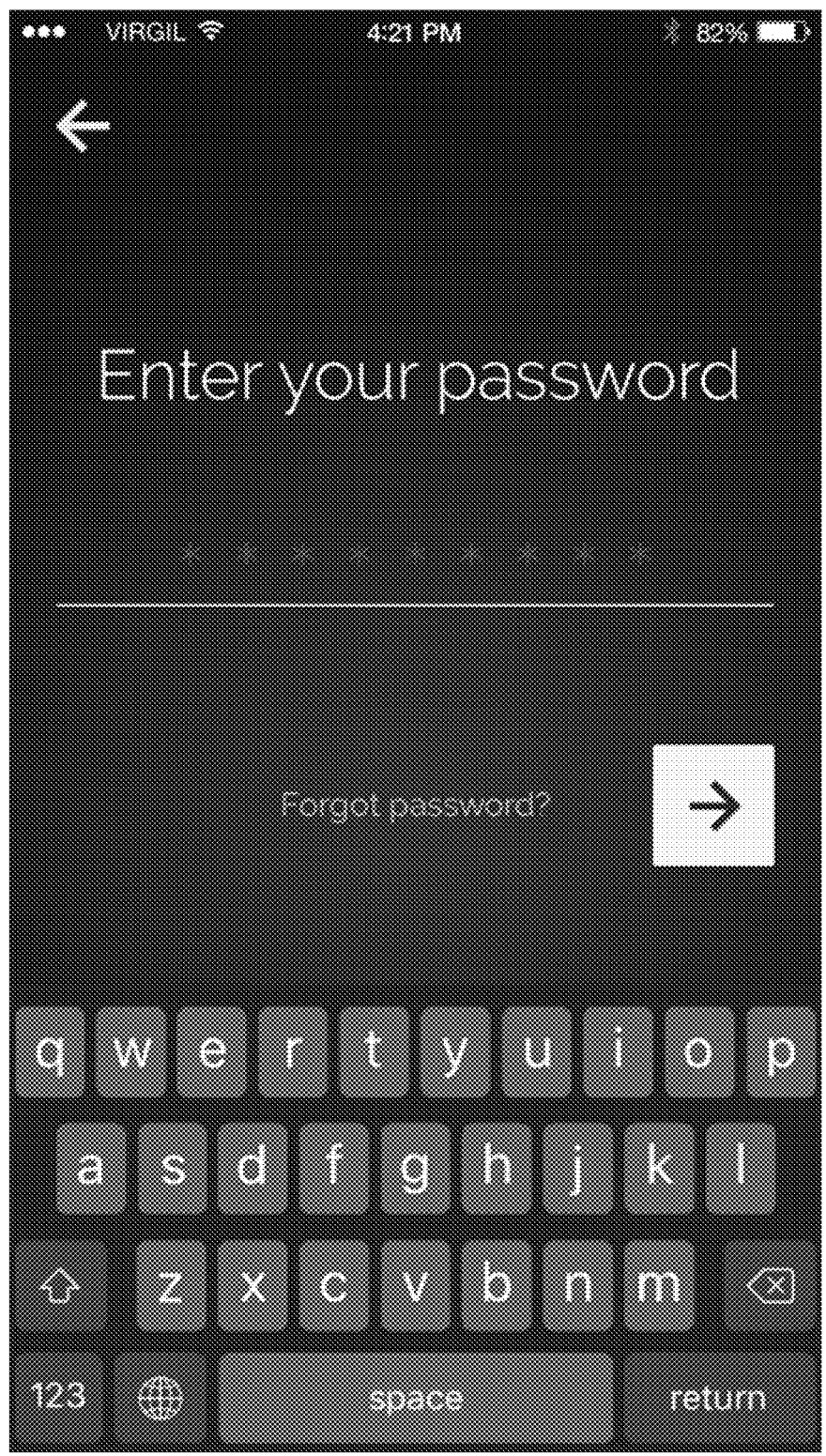

FIG. 38 is a screenshot of a submenu for the driver entity to enter a password, which may also be part of a registration process.

Figure 39:
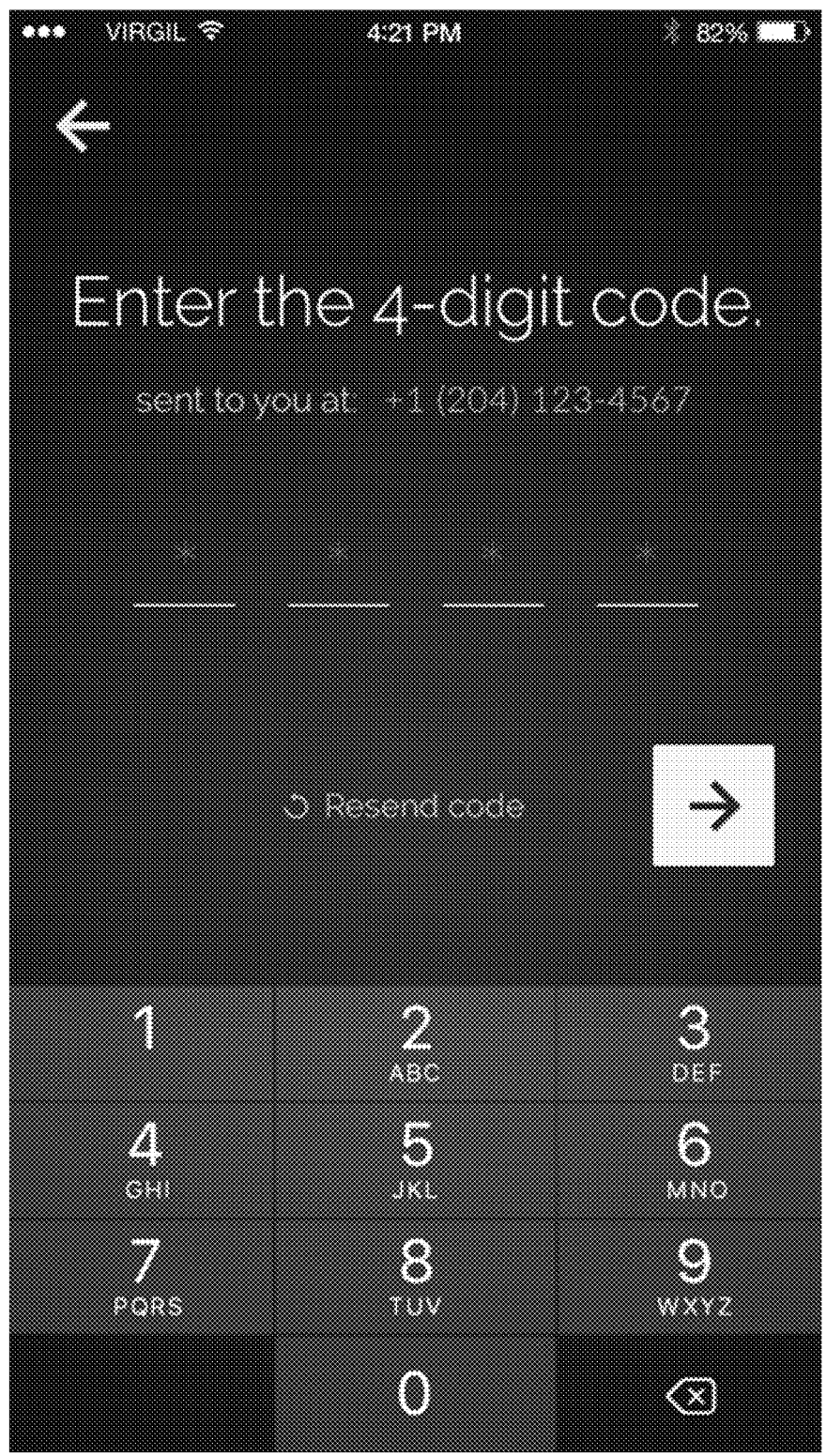

FIG. 39 is a screenshot of a submenu for the driver entity to enter a registration confirmation code, which may also be part of a registration process.

Figure 40:
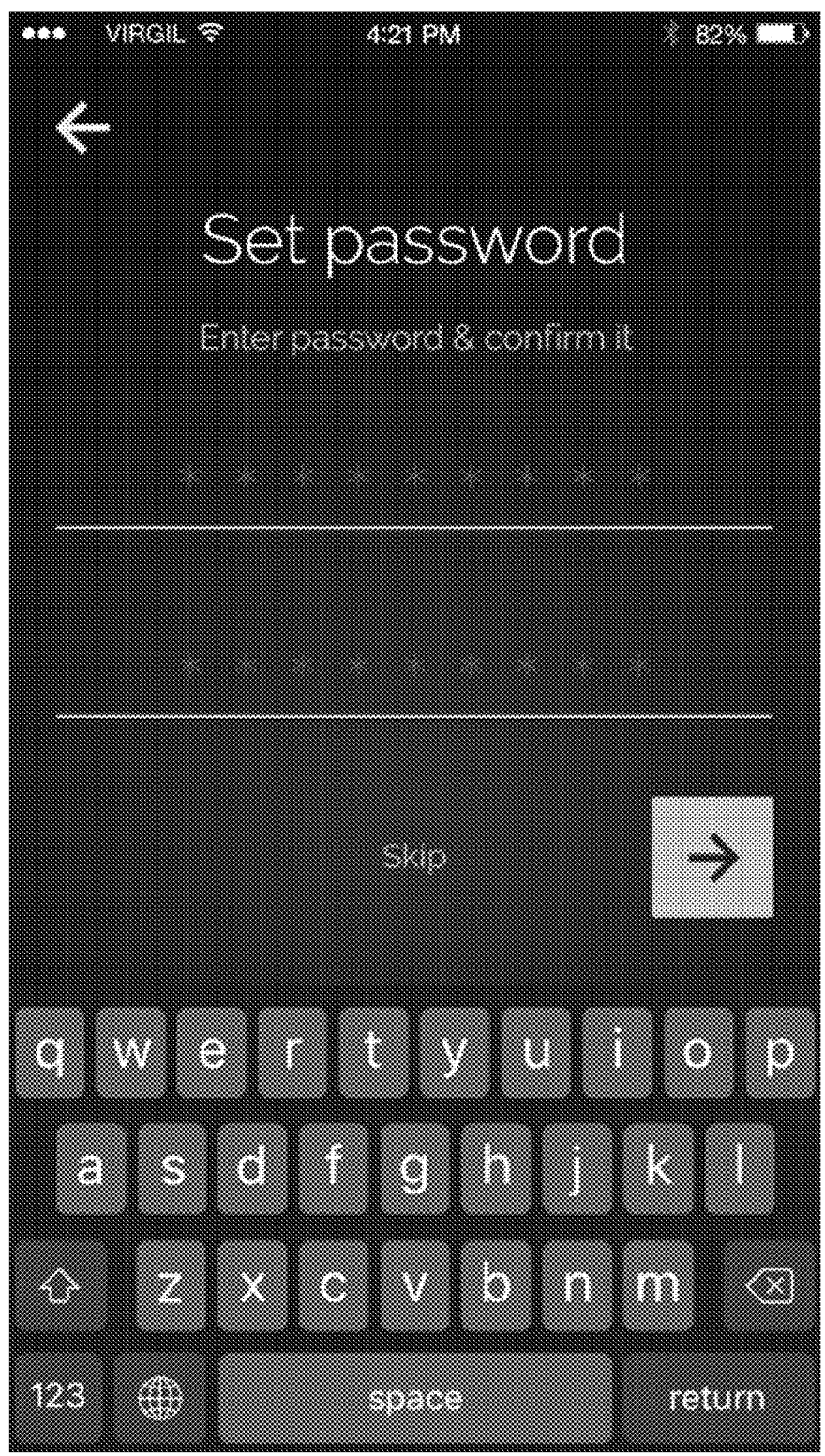

FIG. 40 is a screenshot of a submenu for the driver entity to confirm a password, which may also be part of a registration process.

Figure 41:
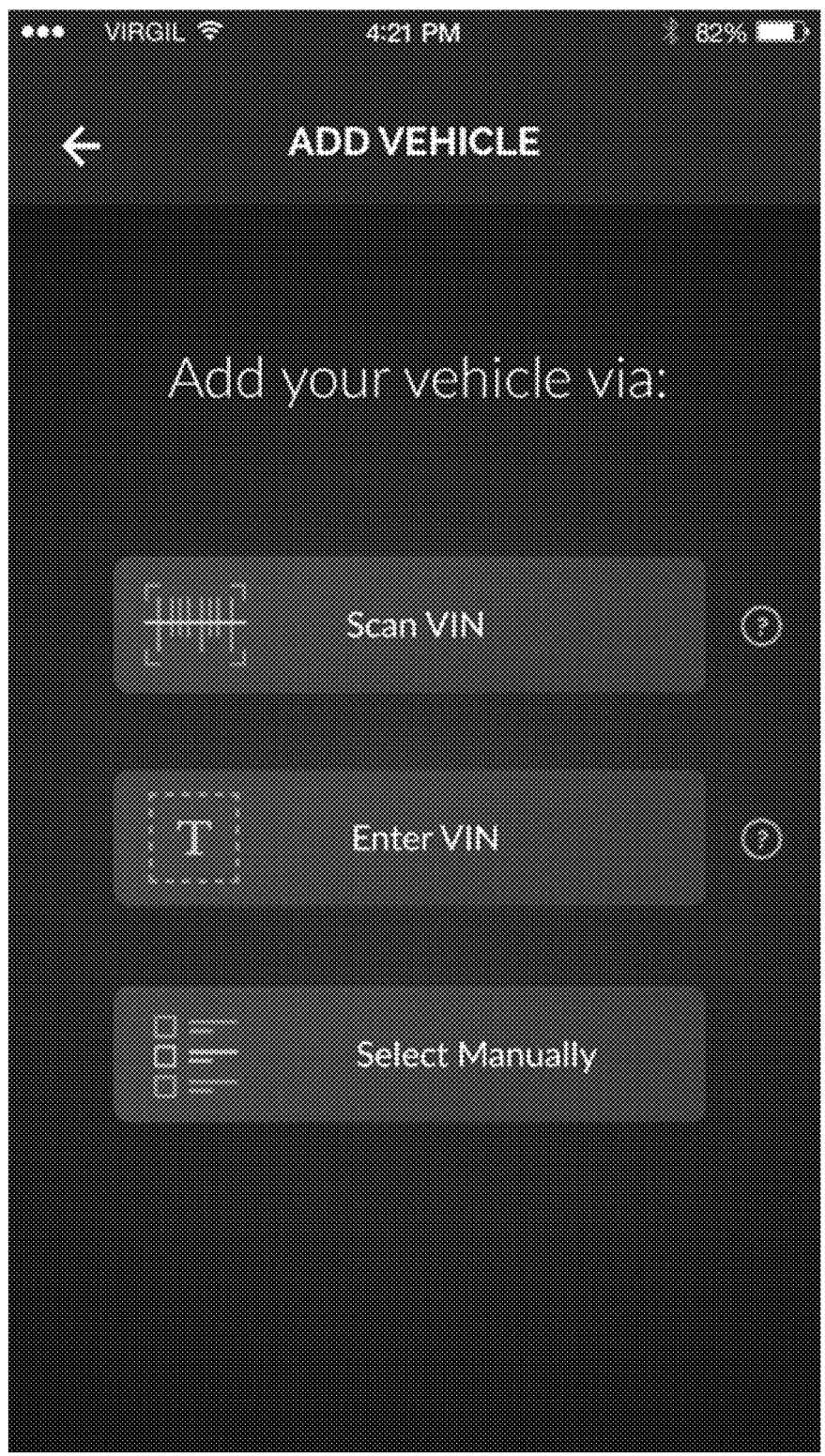

FIG. 41 is a screenshot of a submenu for the driver entity to enter their vehicle information (including the vehicle identification number), which may also be part of a registration process.

Figure 42:
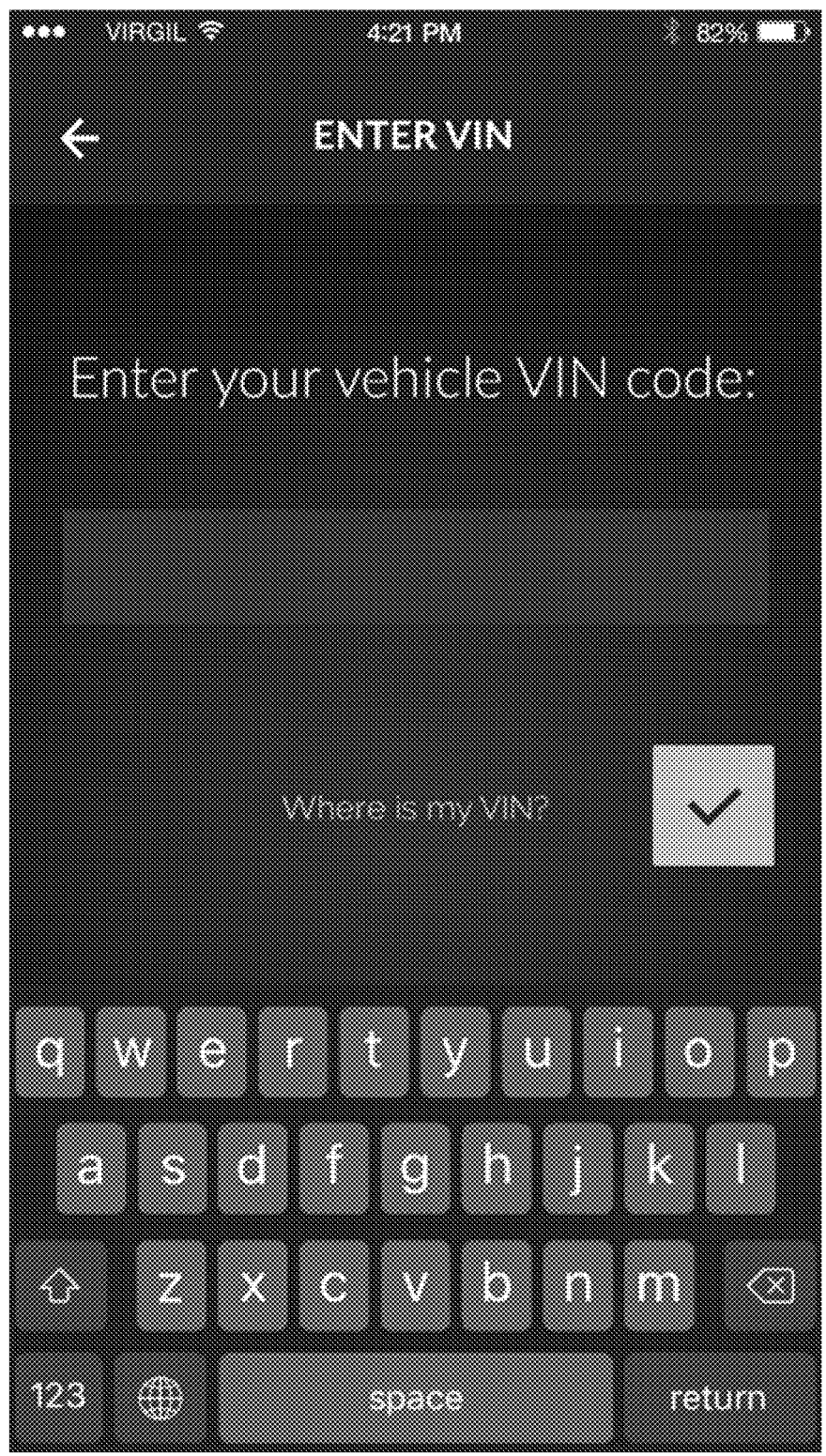

FIG. 42 is a screenshot of a submenu for the driver entity to manually enter their vehicle identification number, which may also be part of a registration process.

Figure 43:
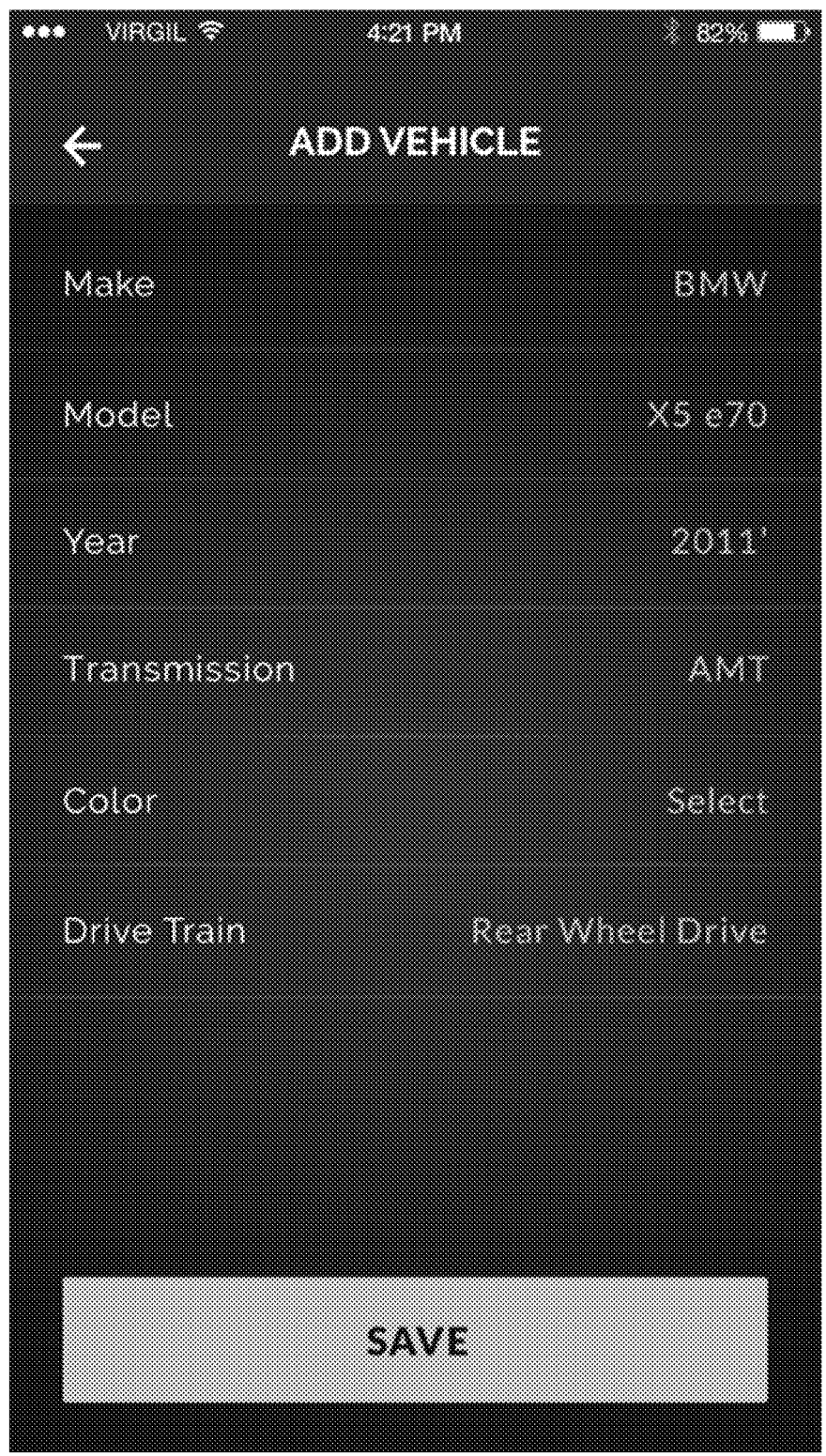

FIG. 43 is a screenshot of a submenu for the driver entity to review their vehicle information, which may also be part of a registration process.

Figure 44:
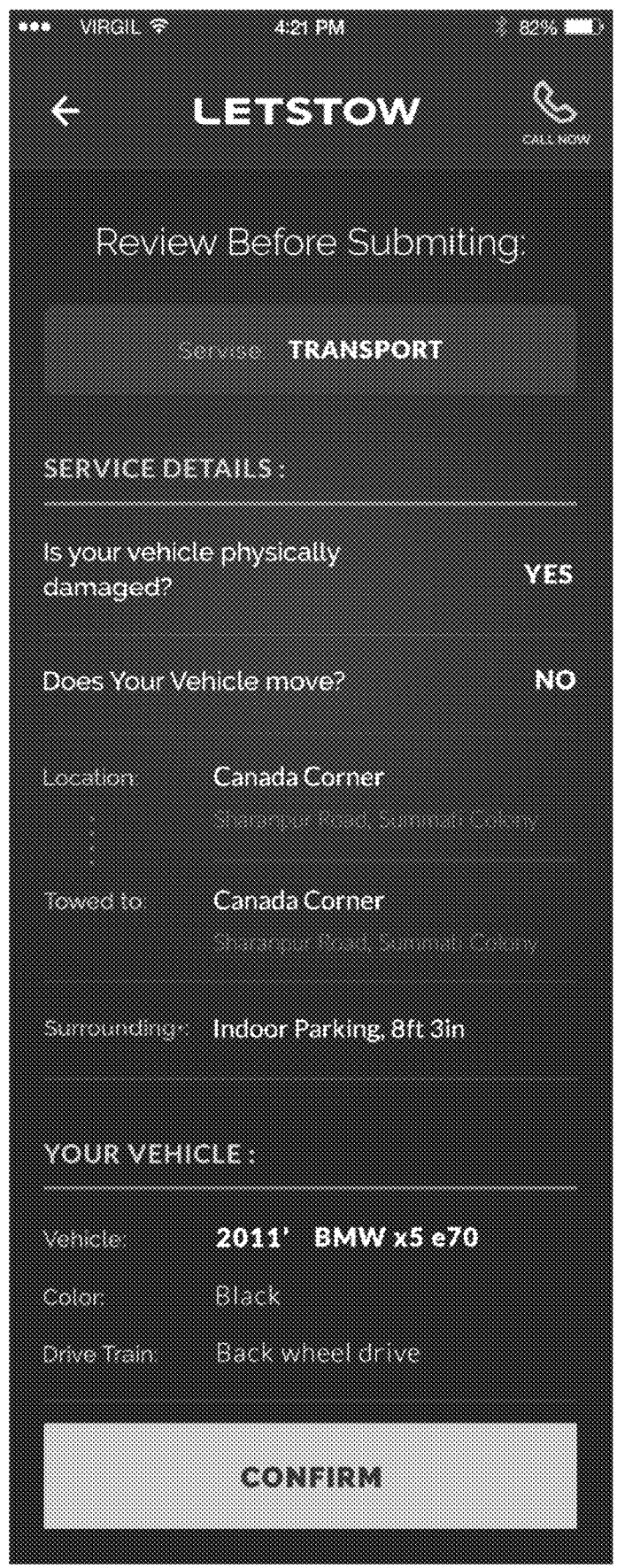

FIG. 44 is a screenshot of a submenu for the driver entity to review their roadside assistance request before transmitting.

Figure 45:
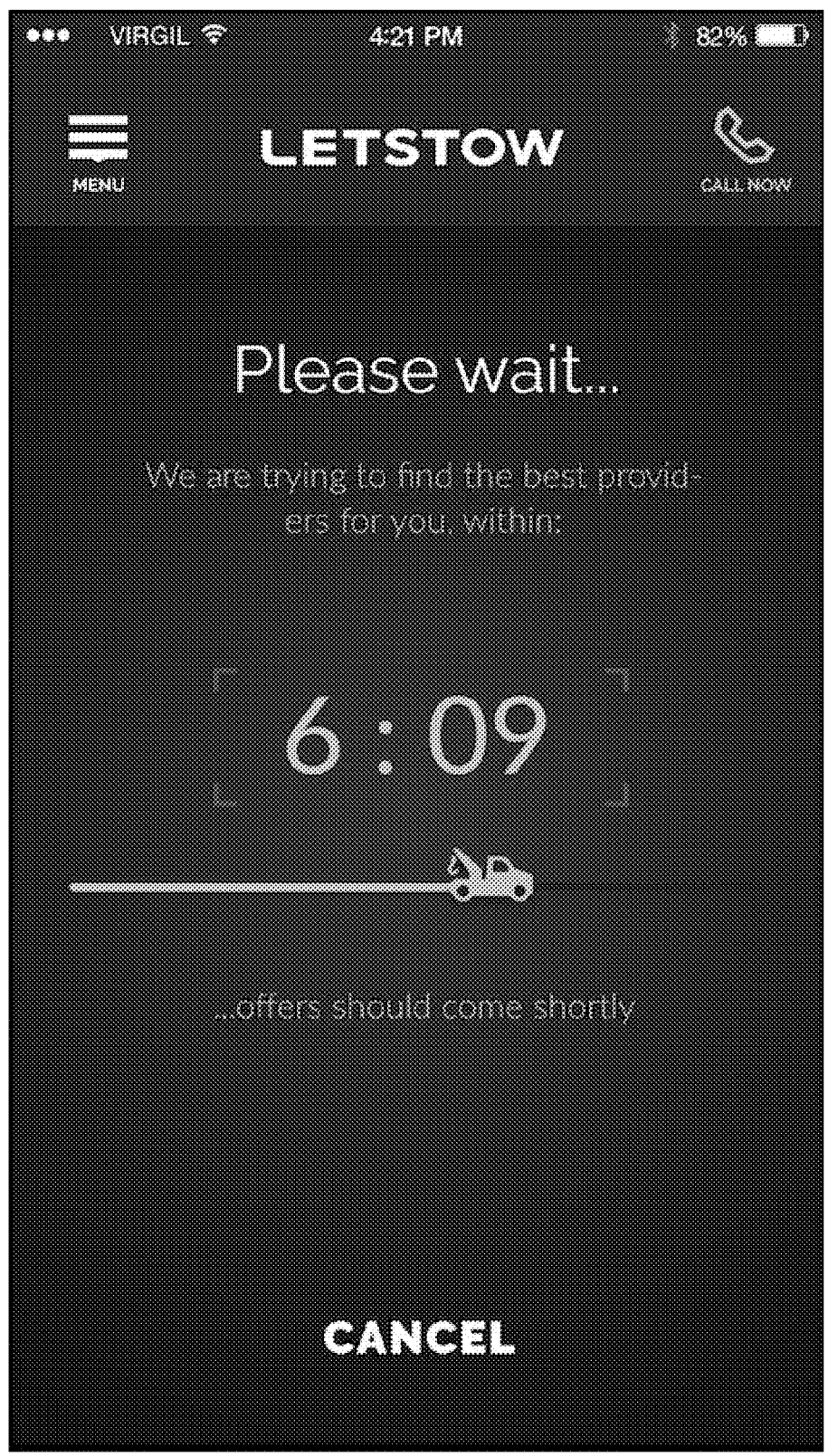

FIG. 45 is a screenshot of a waiting page indicating that the electronic roadside request has been submitted and that the system 1 is currently awaiting electronic roadside assistance offers from the available provider entities. The solicitation countdown timer is displayed to indicate the amount of time that provider entities have to submit their electronic roadside assistance offers.

Figure 46:
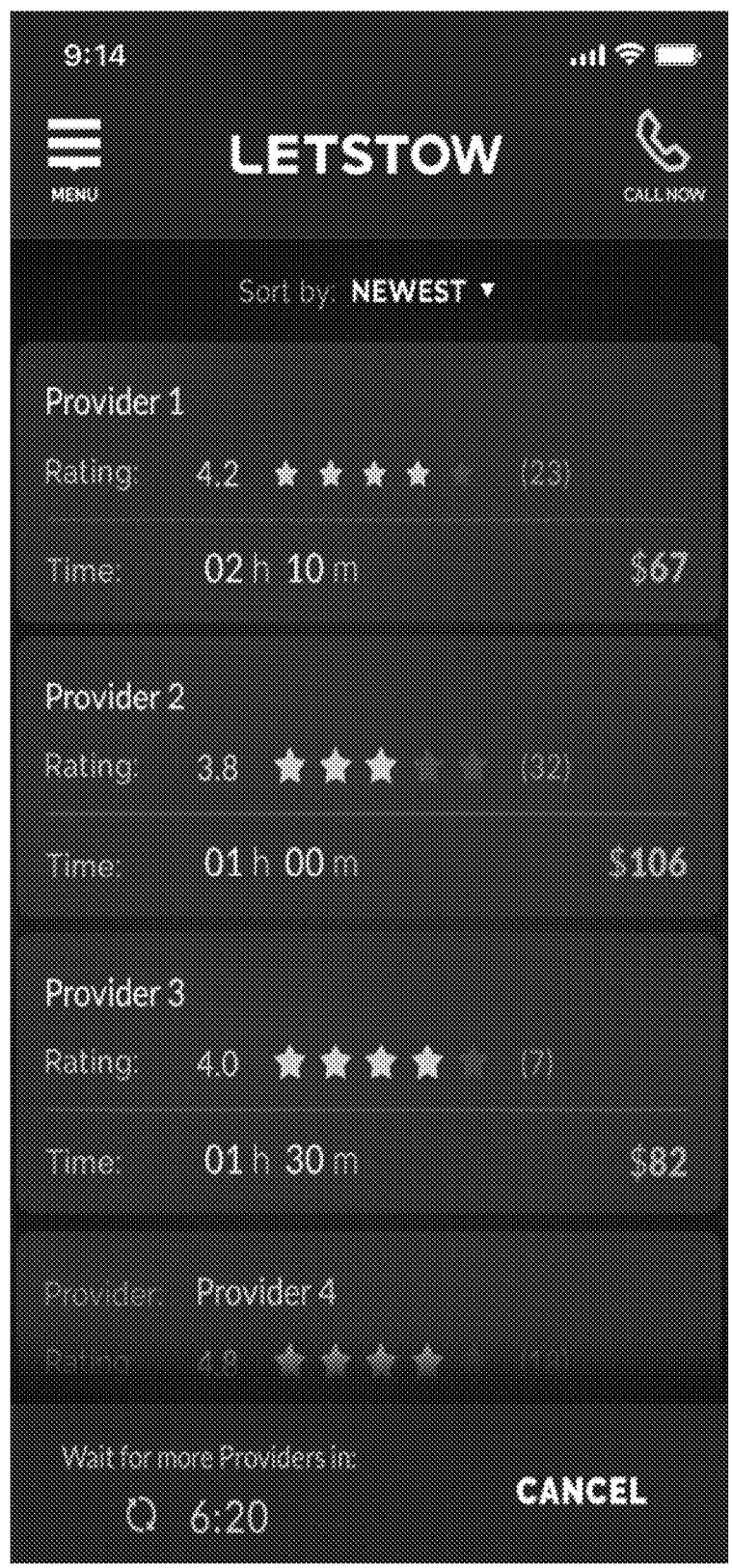

FIG. 46 is a screenshot presented on the driver device 36 that display information pertaining to electronic roadside assistance offers made by various provider entities in response to an initial electronic roadside assistance offer made by a driver entity from that driver device 36. The driver entity using the driver device 36 can review the details of each offer and select one of these offers.

Figure 47:
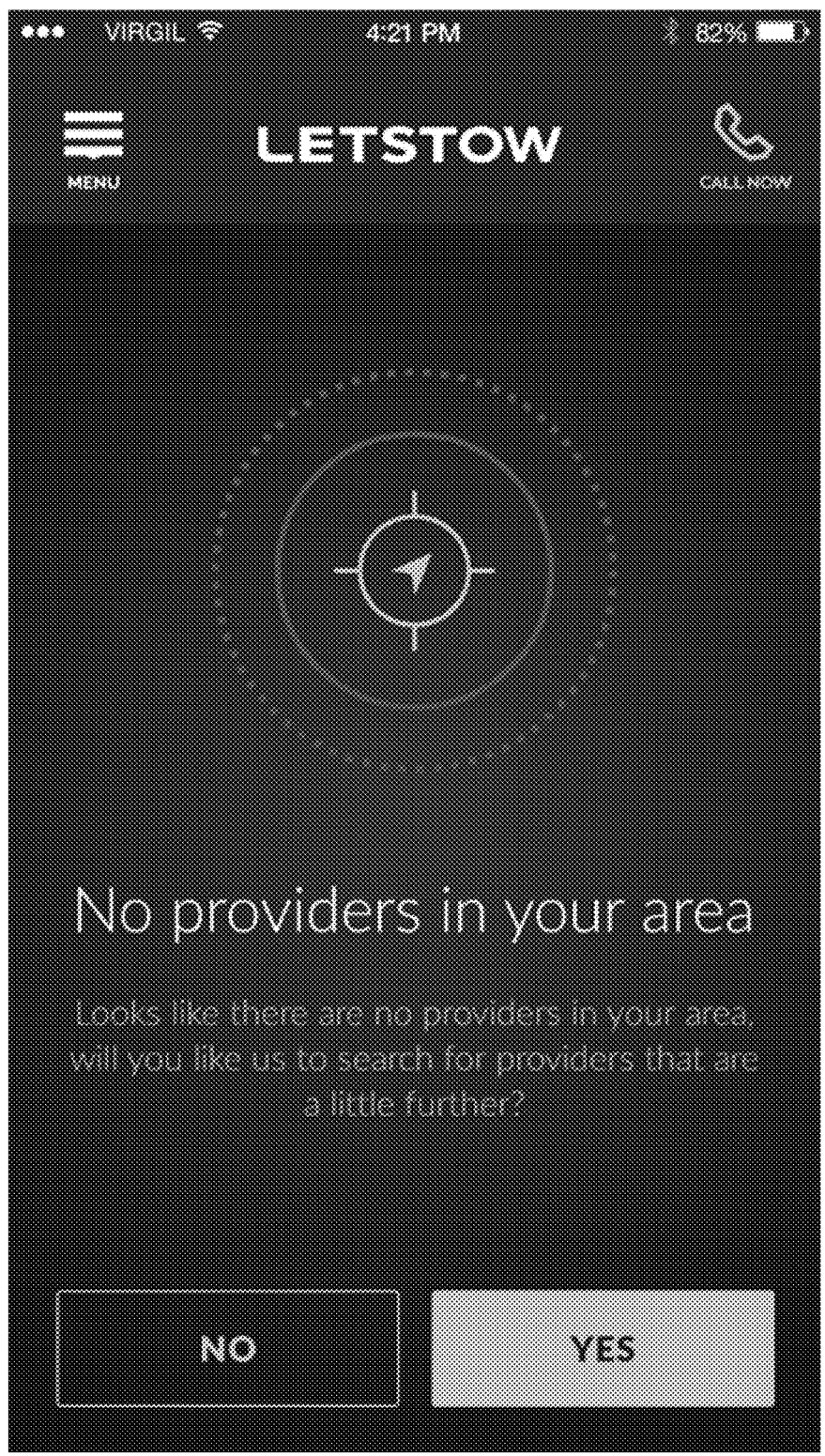

FIG. 47 is a screenshot presented on the driver device 36 indicating that available provider entities have not been found or offers have not be received therefrom, and providing the option to further expand the search for provider entities.

Figure 48:
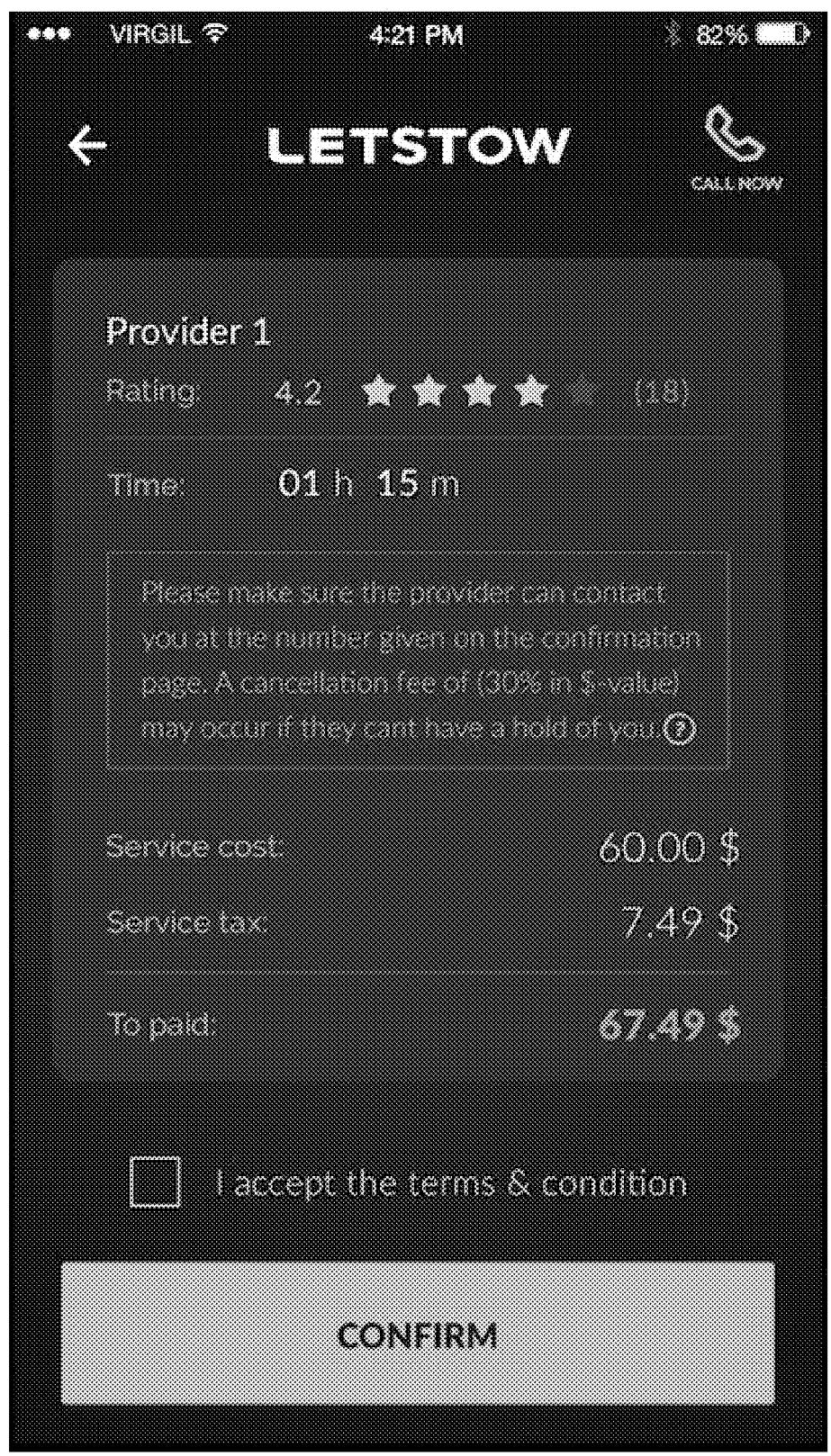

FIG. 48 is a screenshot presented on the driver device 36 that allows the driver entity to review the details of a particular selected electronic roadside assistance offer prior to confirming acceptance of the offer. As described elsewhere herein, in response to confirming the selection of a particular offer, an electronic response indicating this acceptance is transmitted to the roadside assistance management system 1, which further triggers the beginning of the operator arrival timer and the transmitting of a notification to the selected operator device with information of the roadside assistance instance.

Figure 49A:
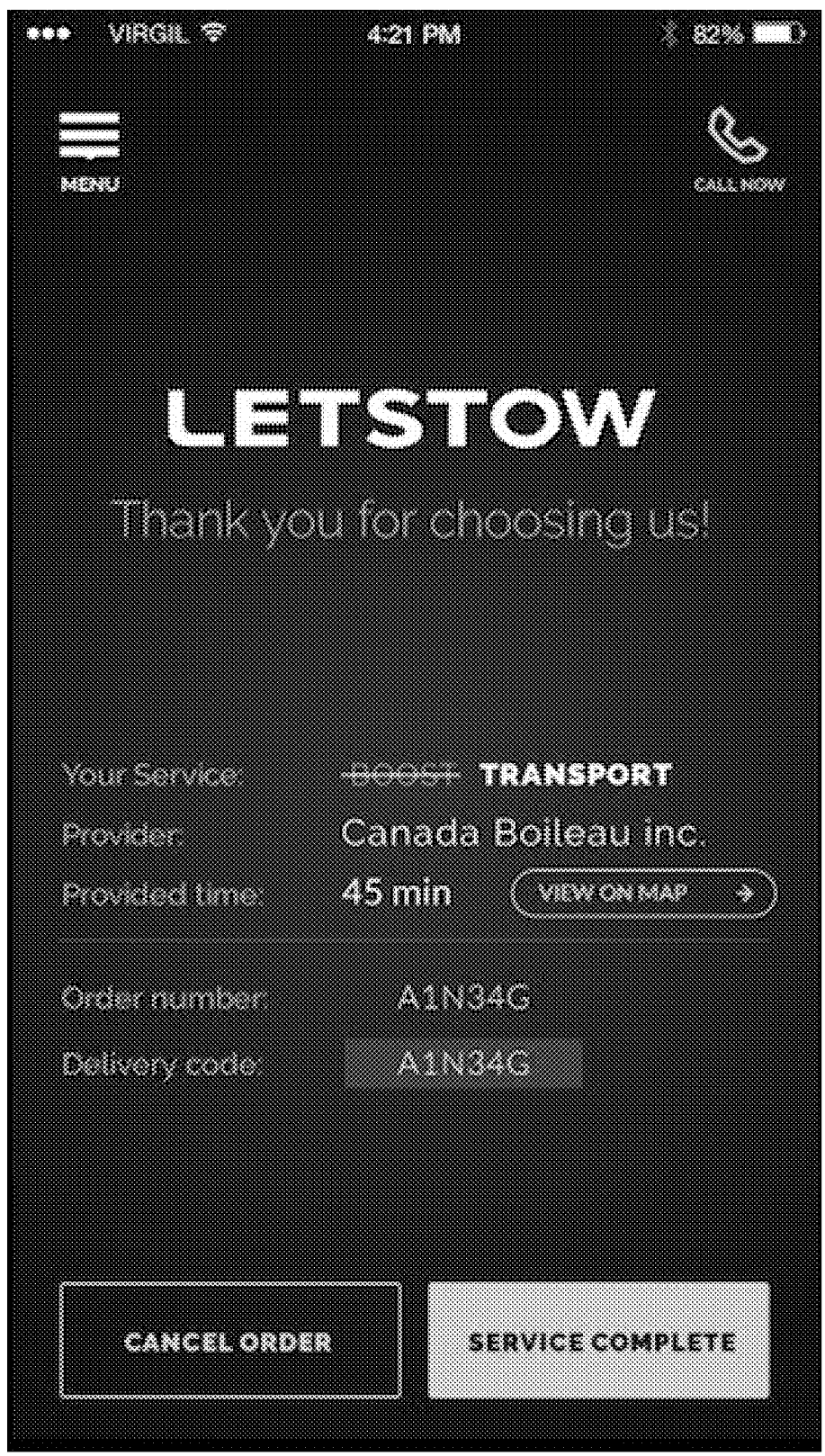

FIG. 49A is a screenshot presented on the driver device 36 that allows a user to make an electronic assistance adjustment request. The driver entity operating the driver device 36 can choose an option to indicate that the service has been completed (ex: "Service Complete")—this generates a notification indicating that the requested assistance has been completed and the notification is received at the assistance management system 1 (ex: Step 252 of method 200). Alternatively, the driver device 36 can choose an option to cancel the requested roadside assistance. A unique delivery code is generated for the roadside assistance instance and can be used to confirm that the requested roadside assistance has been completed. As described elsewhere herein, this screen can be modified to further include an option to declare an operator "no-show". This option is shown upon expiry of the operator arrival countdown timer. In some other example embodiments, a further option to "extend service" can also be included. This allows the driver entity to continue waiting for the operator despite the operator arrival countdown having expired.

Figure 49B:
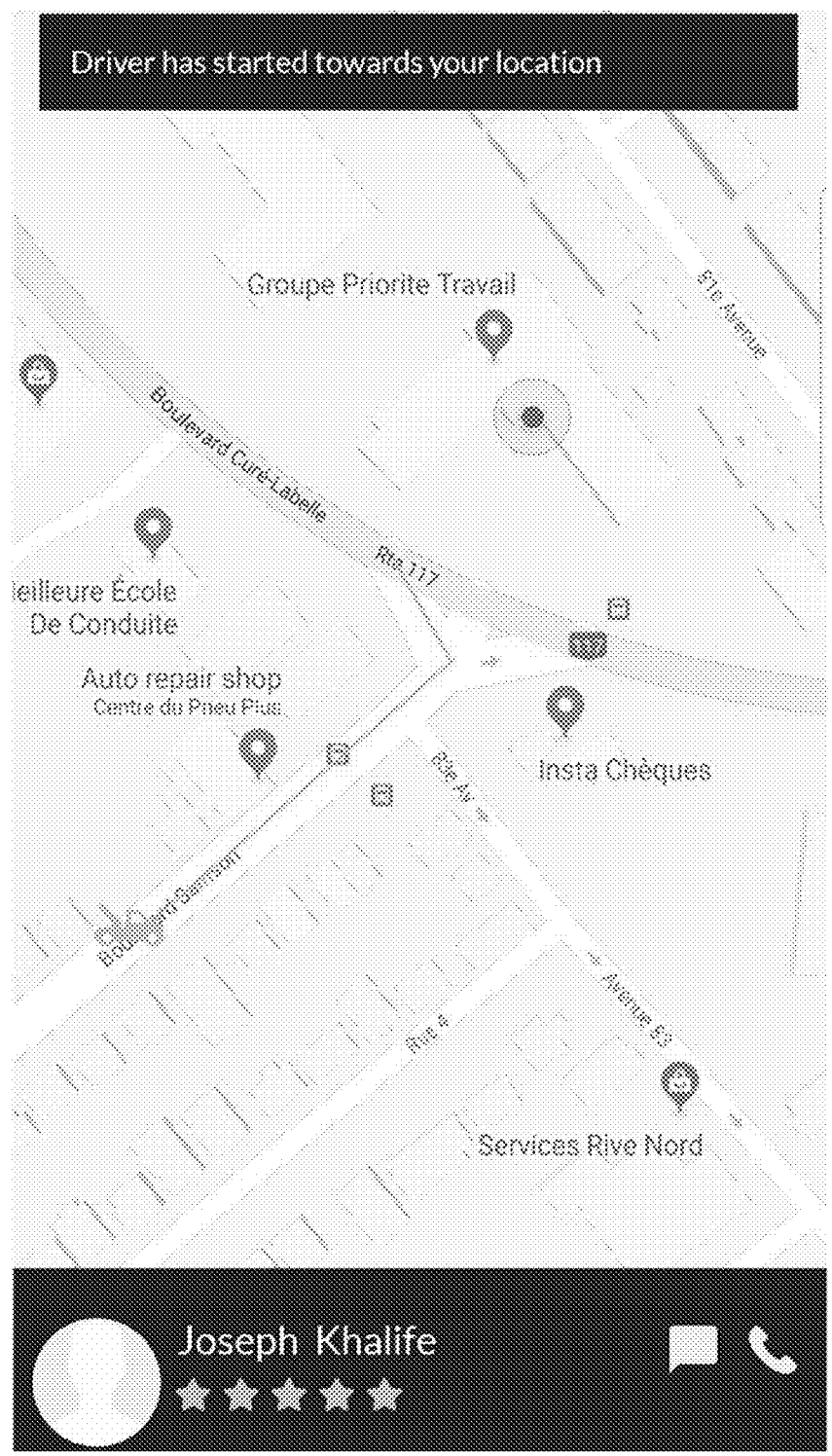

FIG. 49B is a screenshot presented on the driver device 36 that allows a user to view the status an ongoing electronic assistance instance. In this case, the current location of an operator tasked to assistance the driver entity is displayed on a map, to provide informational feedback to the driver entity. Option for contacting the operator (ex: by text message or by phone) can also be made available.

Figure 50:
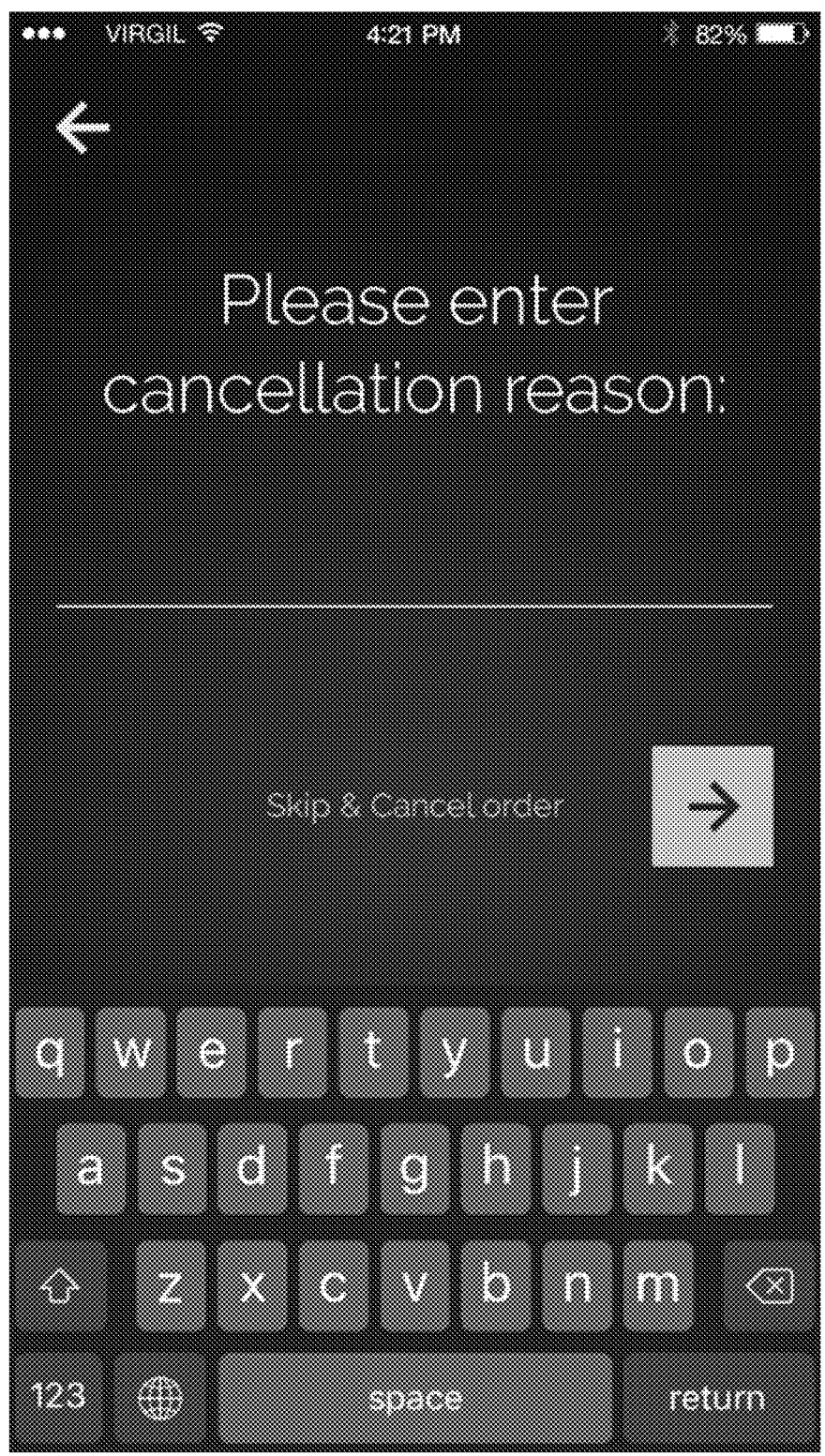

FIG. 50 is a screenshot presented on the driver device 36 allowing a driver entity to request cancellation of an electronic roadside assistance request.

Figure 51:
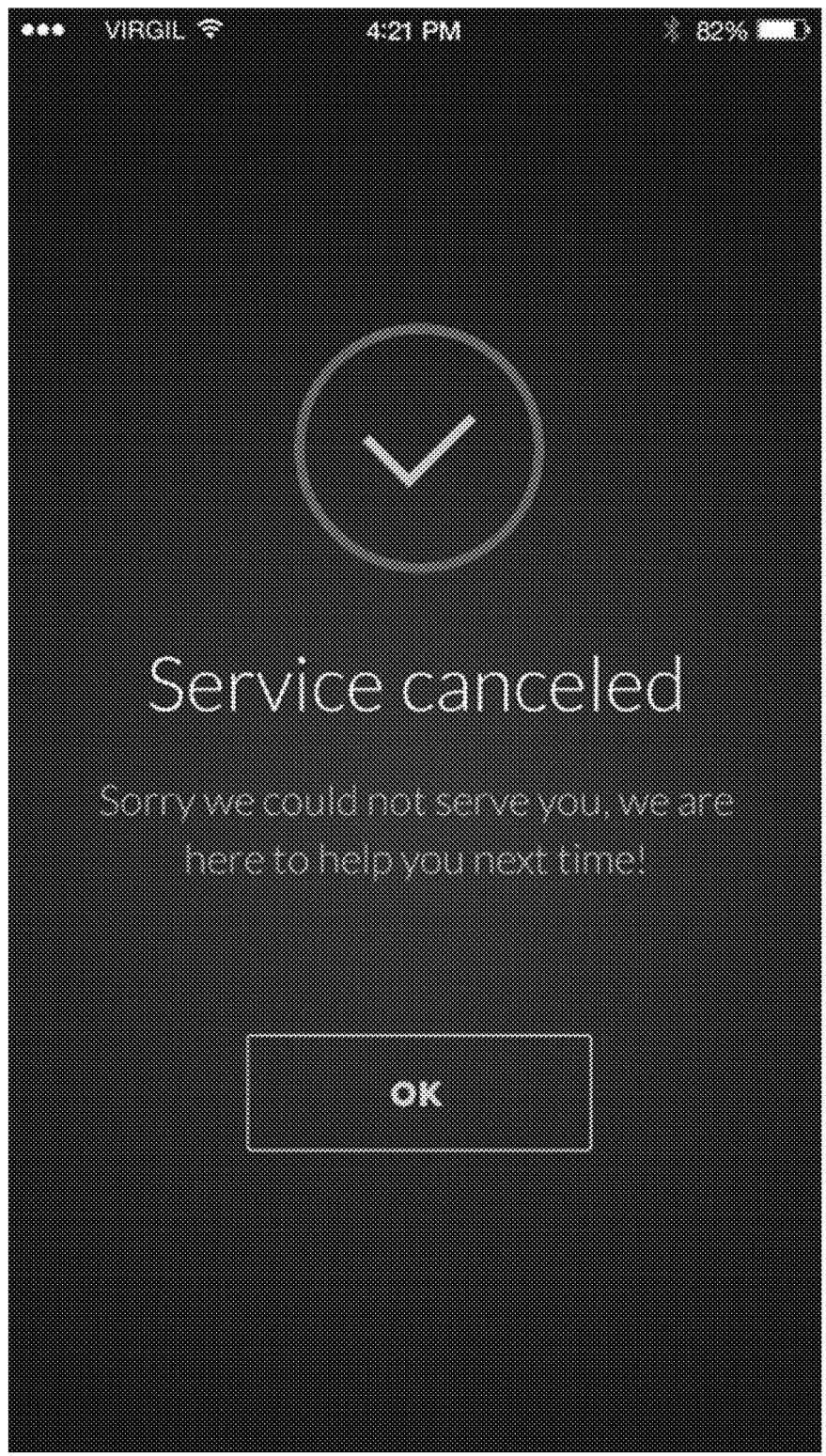

FIG. 51 is a screenshot of a confirmation of the cancellation of a requested roadside assistance request.

Figure 52:
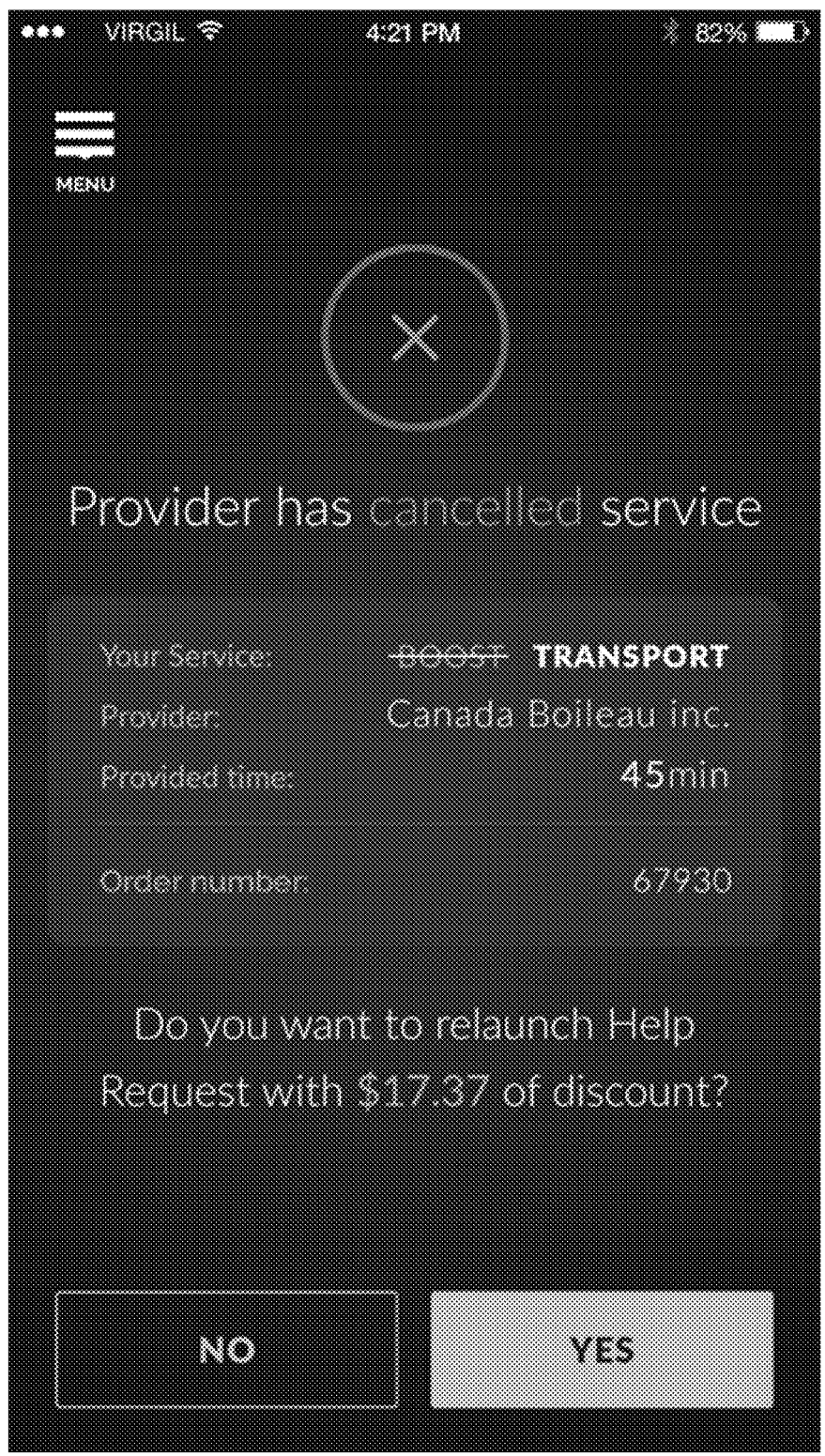

FIG. 52 is a screenshot presented on the driver device 36 providing a notification that the cancellation has been made by the provider entity. An option is provided to re-launch the request for assistance and a credit is applied in favor of the driver entity.

Figure 53:
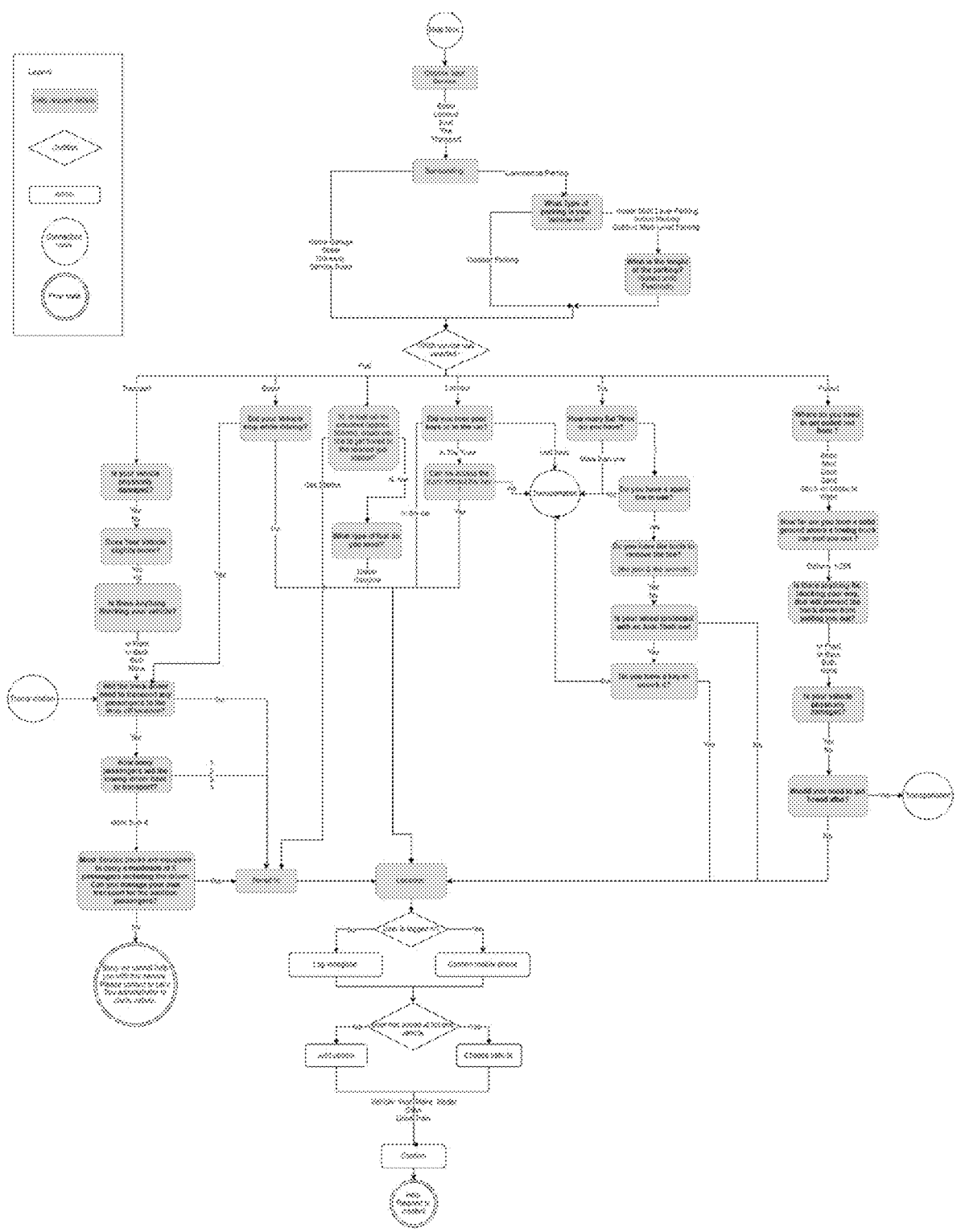
FIG. 53 illustrates logical flow according to one example embodiment for displaying submenus to allow the driver entity to select parameters and subparameters of the roadside assistance request.

FIG. 53 illustrates logical flow according to one example embodiment for displaying submenus to allow the driver entity to select parameters and subparameters of the roadside assistance request.

FIGS. 54 to 57 are screenshots of the user portal displayed on a provider device 44 (in the form of a smartphone or tablet) to permit a user entity to make an electronic roadside assistance offer in response to receiving electronic roadside assistance solicitations generated by the assistance management module 20 in response to electronic roadside assistance requests from driver entities.

Figure 54:
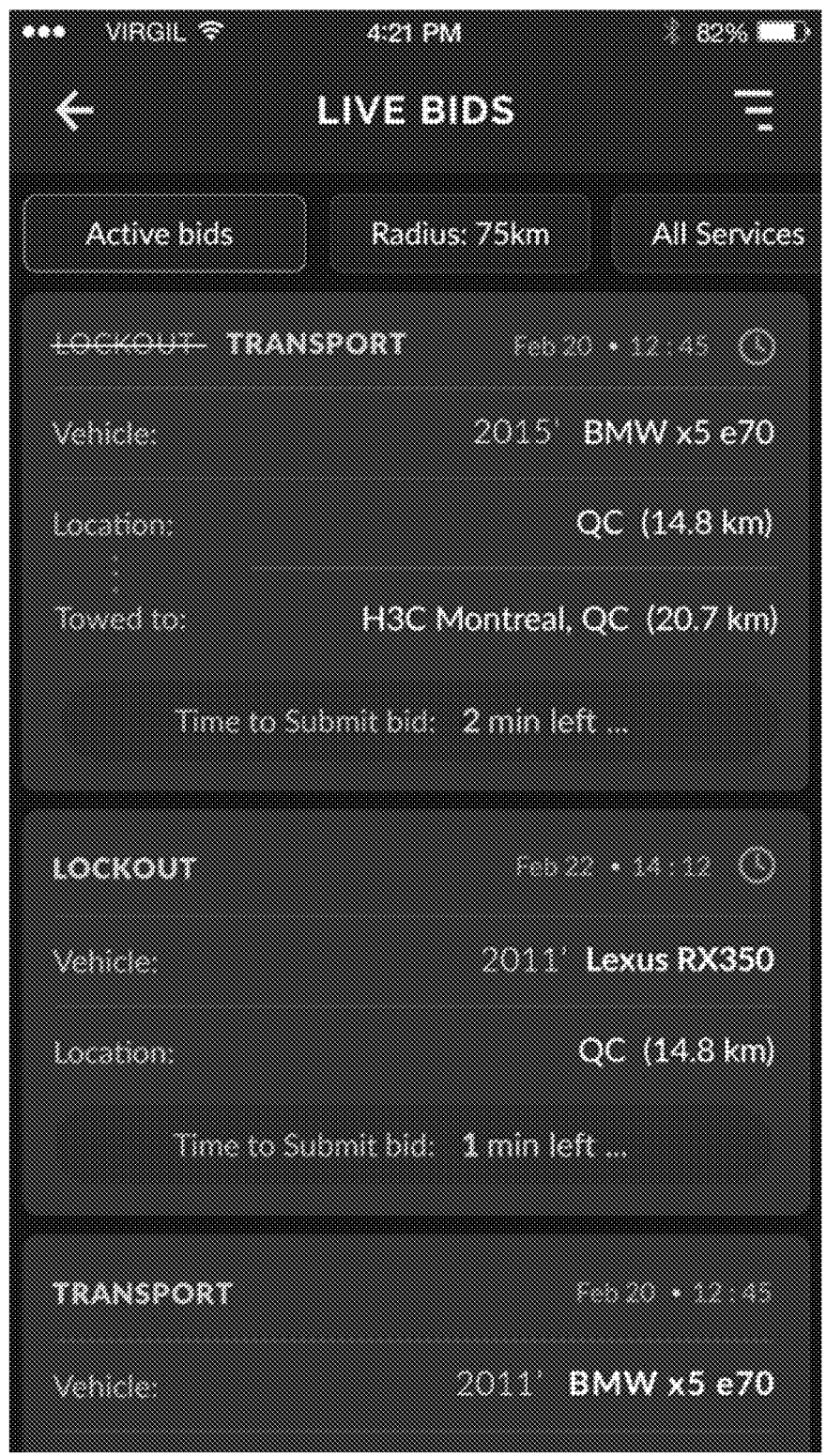
FIGS. 54 to 57 are screenshots of the user portal displayed on a provider device (smartphone, tablet, or the like) to permit a user entity to make an electronic roadside assistance offer.

FIG. 54 is a screenshot showing a listings page of pending electronic roadside assistance solicitations according to an example embodiment. It will be appreciated that as multiple driver entities make roadside assistance requests and those requests are matched to the given provider entity, solicitations are generated for these requests and are displayed within the page illustrated in FIG. 54.

Figure 55:
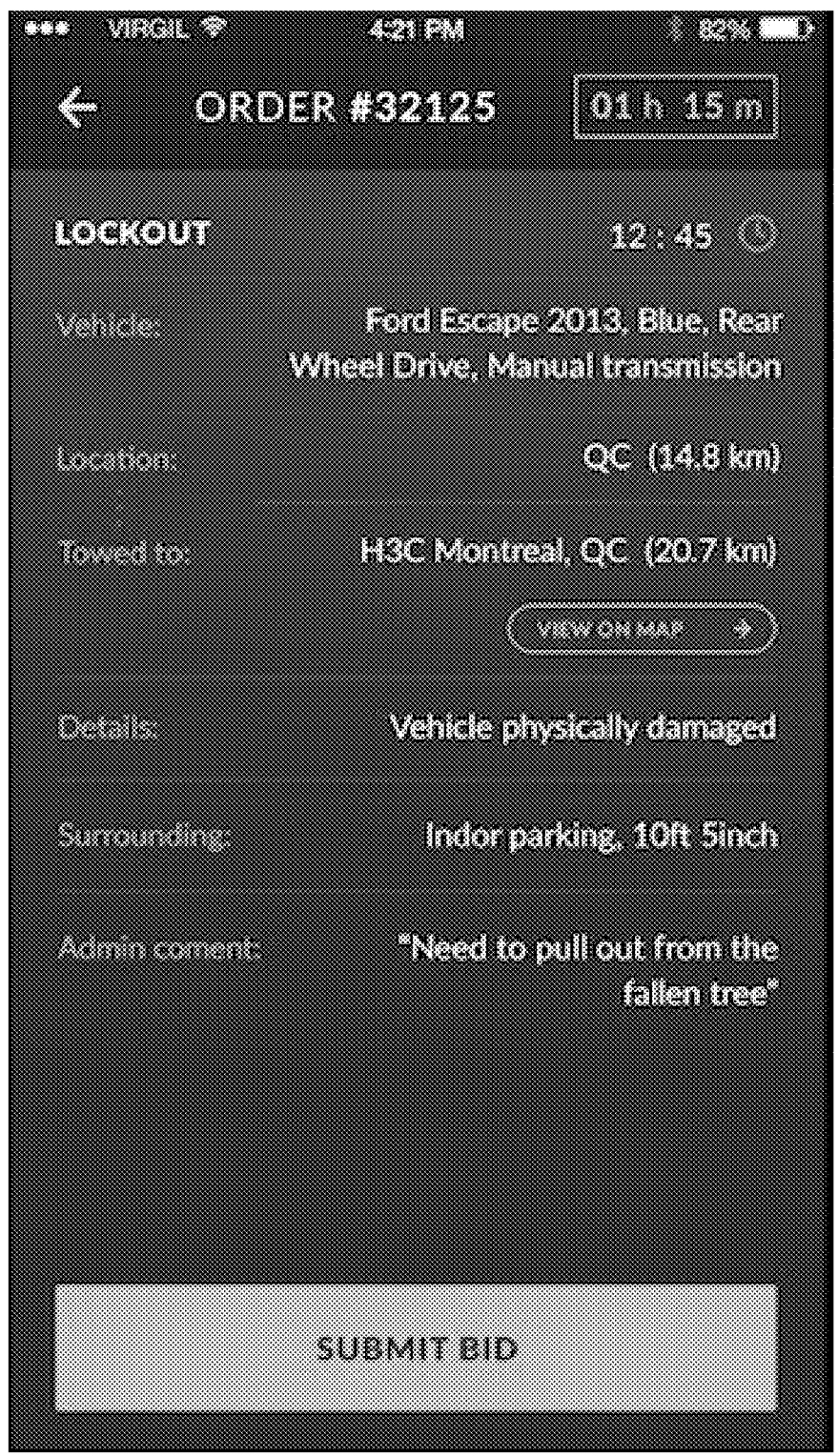

FIG. 55 is a screenshot for submitting an offer in response to a roadside assistance request. Selecting a given solicitation from the listing of solicitations opens up a subregion on the page that allows the provider entity to review additional details about the solicitation and to make an offer (ex: "SUBMIT BID") to assist in the request.

Figure 56:
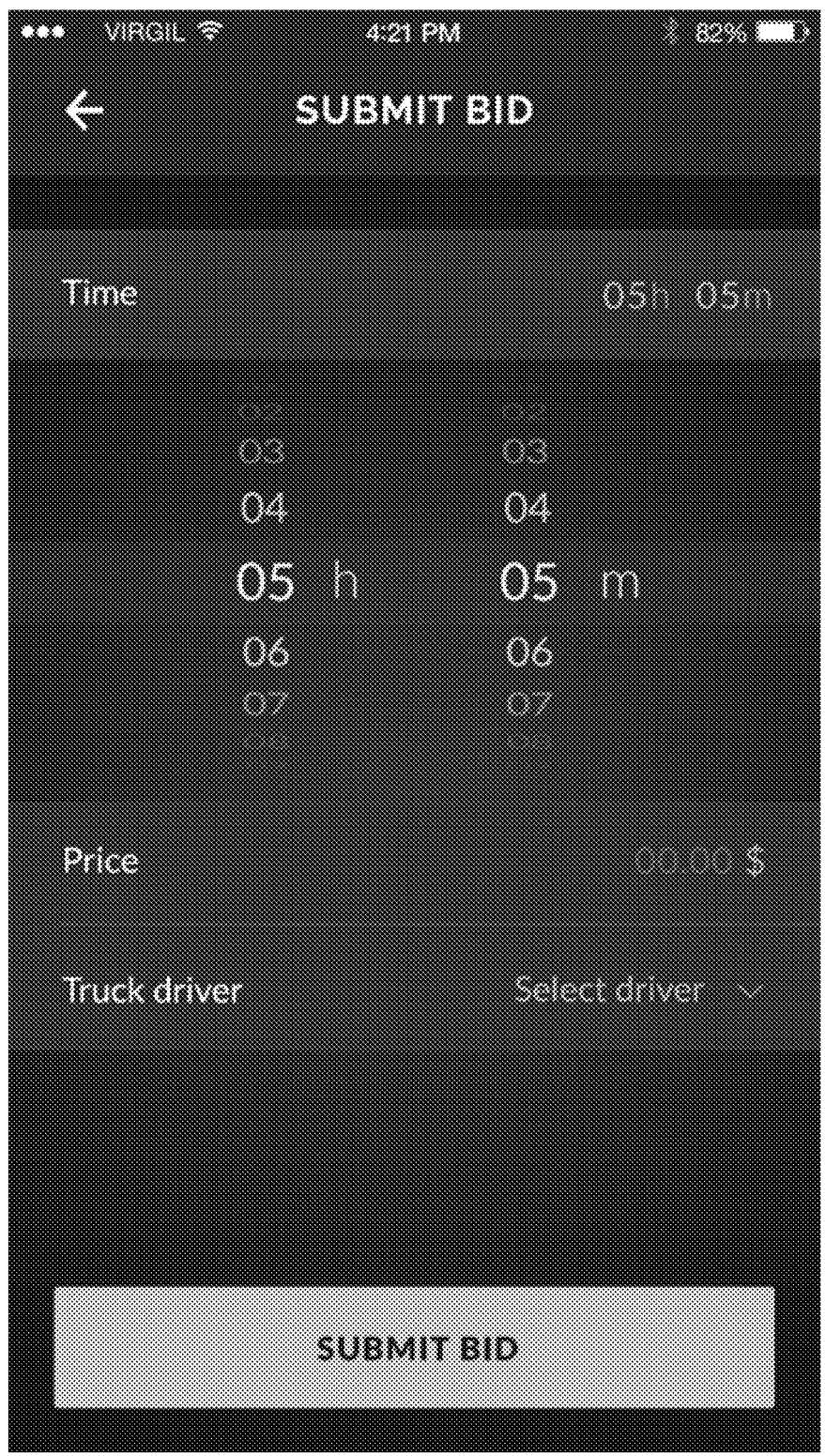

FIG. 56 is a screenshot showing a submenu that allows the provider entity interacting with the displayed environment to indicate an estimated time of arrival and an offer price. In the illustrated example, the provider can also select an operator to be assigned to the assistance task (ex "TRUCKER DRIVER: SELECT DRIVER").

Figure 57:
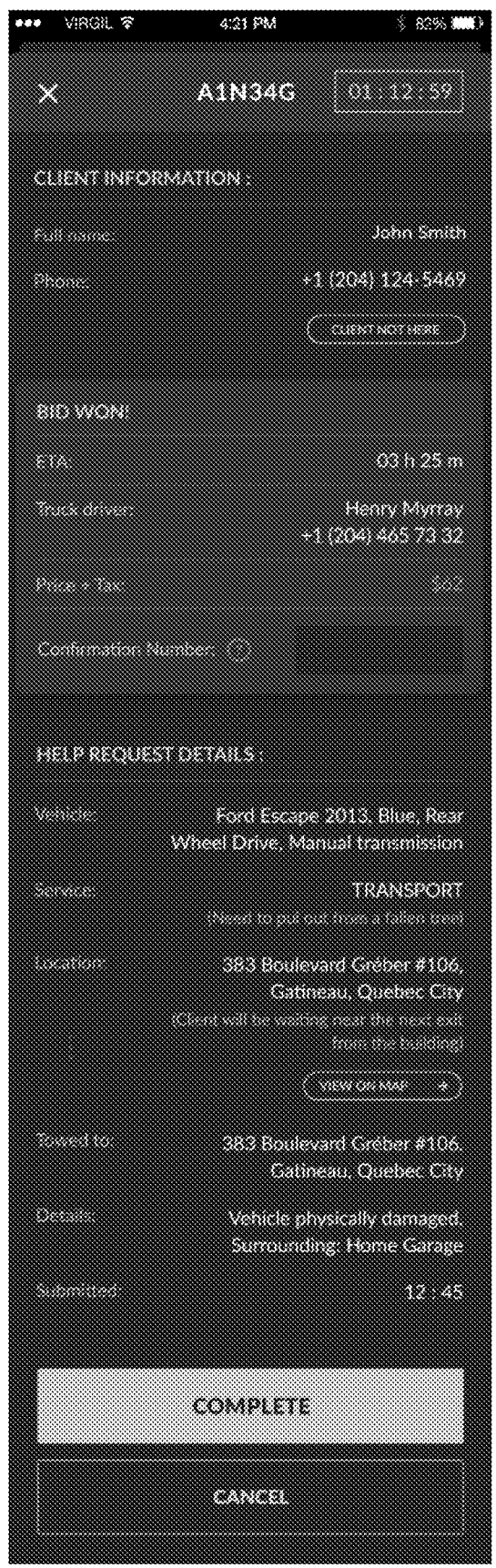

FIG. 57 is a screenshot of a page allowing the provider entity to review the details of an offer in response to a roadside assistance request.

According to various example embodiments, dispatchers that are associated or related within a same provider entity can access information pertaining to electronic roadside assistance offers made by other dispatchers of the same provider entity. This may be the case where more than one dispatcher each access the user portal on behalf of the provider entity at the same time. Visibility across dispatchers associated to a same provider entity ensures that an operator is not assigned to more than one roadside assistance request at any given time.

FIGS. 58 to 62 are screenshots of the user portal displayed on a provider device 44 (in the form of webpage to be displayed on a desktop computer/laptop computer) to permit a user entity to make an electronic roadside assistance offer in response to receiving electronic roadside assistance solicitations generated by the assistance management module 20 in response to electronic roadside assistance requests from driver entities.

Figure 58:
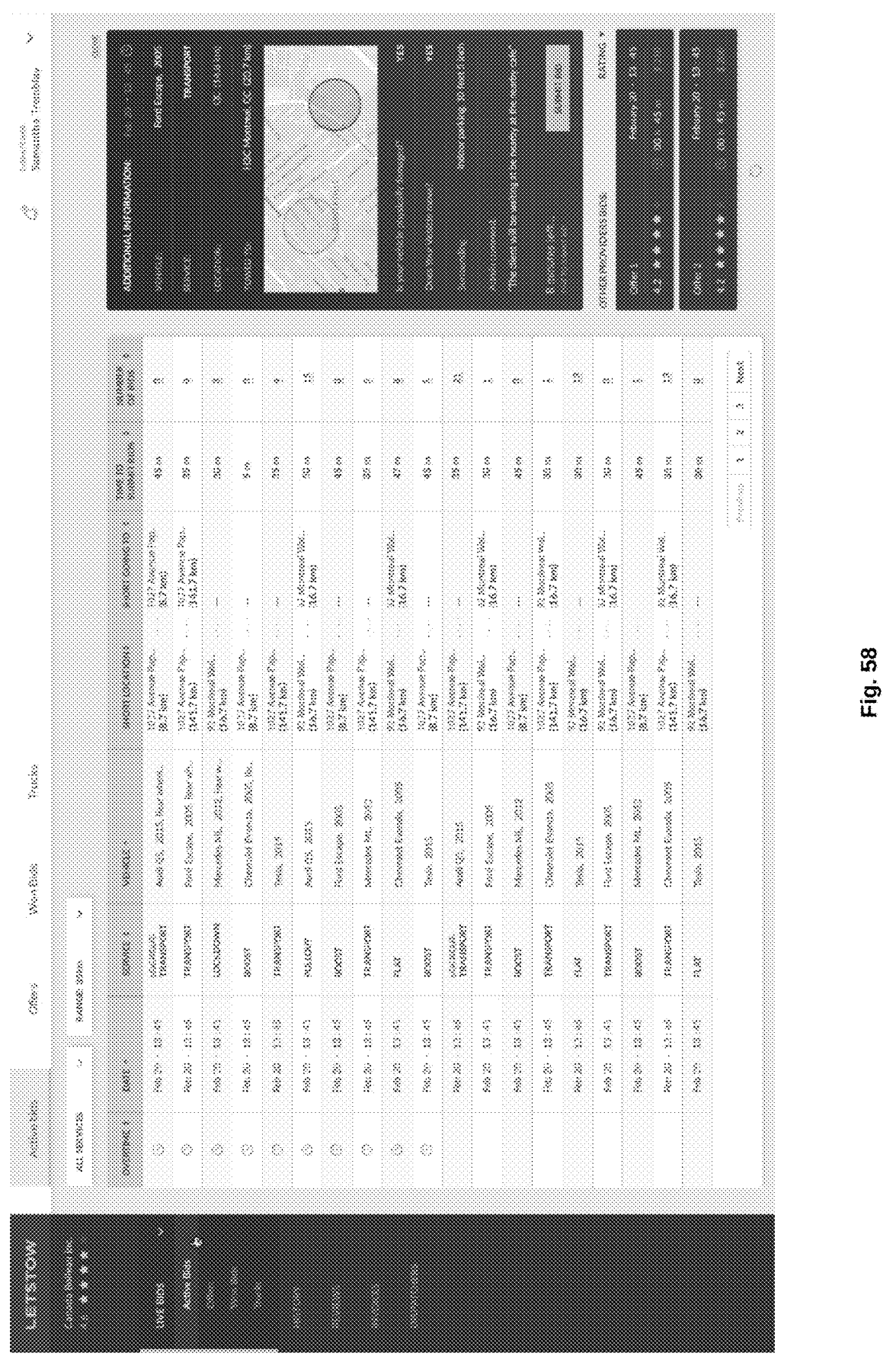

FIG. 58 is a screenshot showing a listings page of pending electronic roadside assistance solicitations according to an example embodiment. It will be appreciated that as multiple driver entities make roadside assistance requests and those requests are matched to the given provider entity, solicitations are generated for these requests and are displayed within the page illustrated in FIG. 58.

Figure 59:

FIG. 59 is a screenshot showing a submenu of the listing illustrated in FIG. 42 according to an example embodiment. This submenu allows the provider entity interacting with the displayed environment to indicate an estimated time of arrival and an offer price. In the illustrated example, the provider can also select an operator to be assigned to the assistance task (ex: "SELECT TRUCKER").

Figure 60:
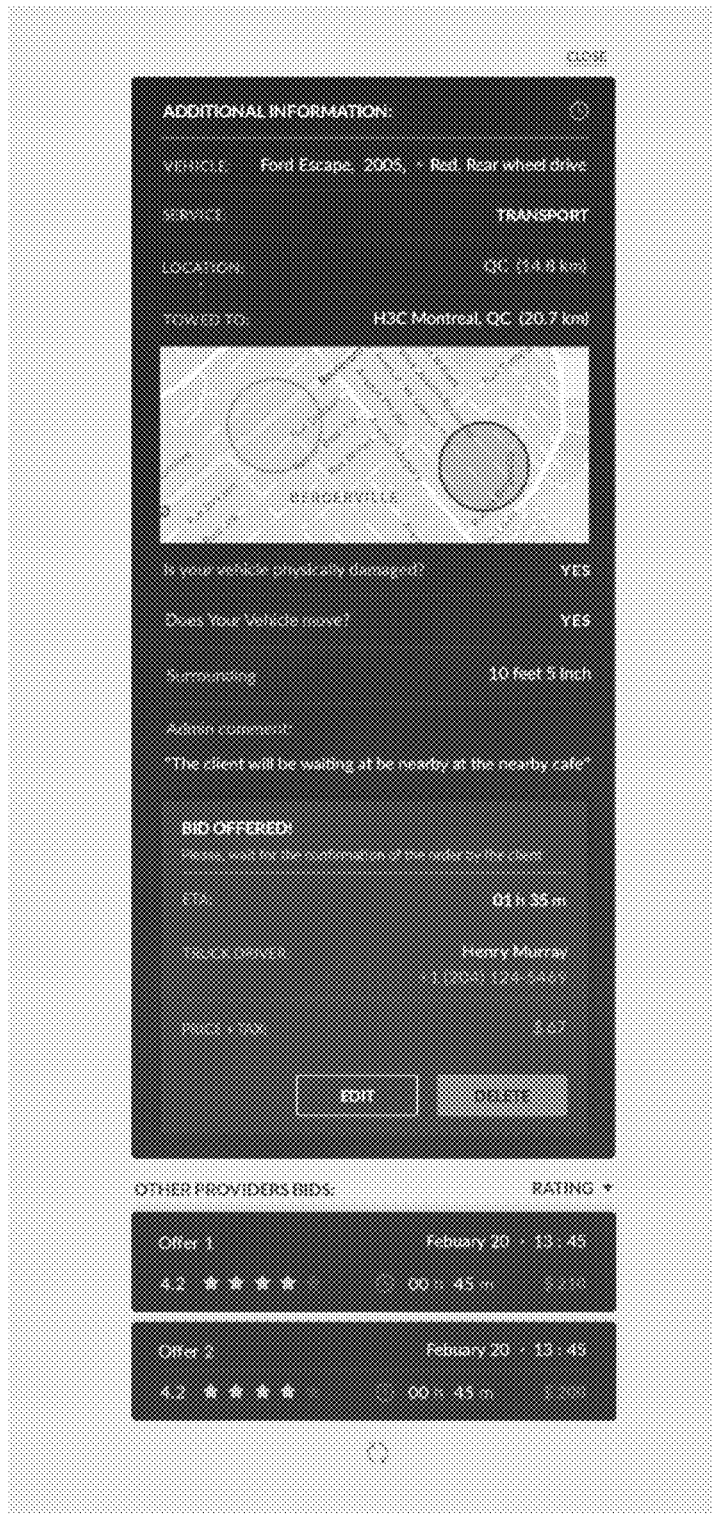

FIG. 60 is a screenshot showing a subpage of the listings page after the provider entity has submitted an electronic roadside assistance offer in response to an assistance solicitation offer. Options to edit and delete the offer are made available on the subpage.

Figure 61:

FIG. 61 is a screenshot showing a listings of assistance instances that a provider entity participated in and that have since terminated. The provider entity can then review those instances that were completed and those instances that were canceled, either by the driver entity or the provider entity.

Figure 62:
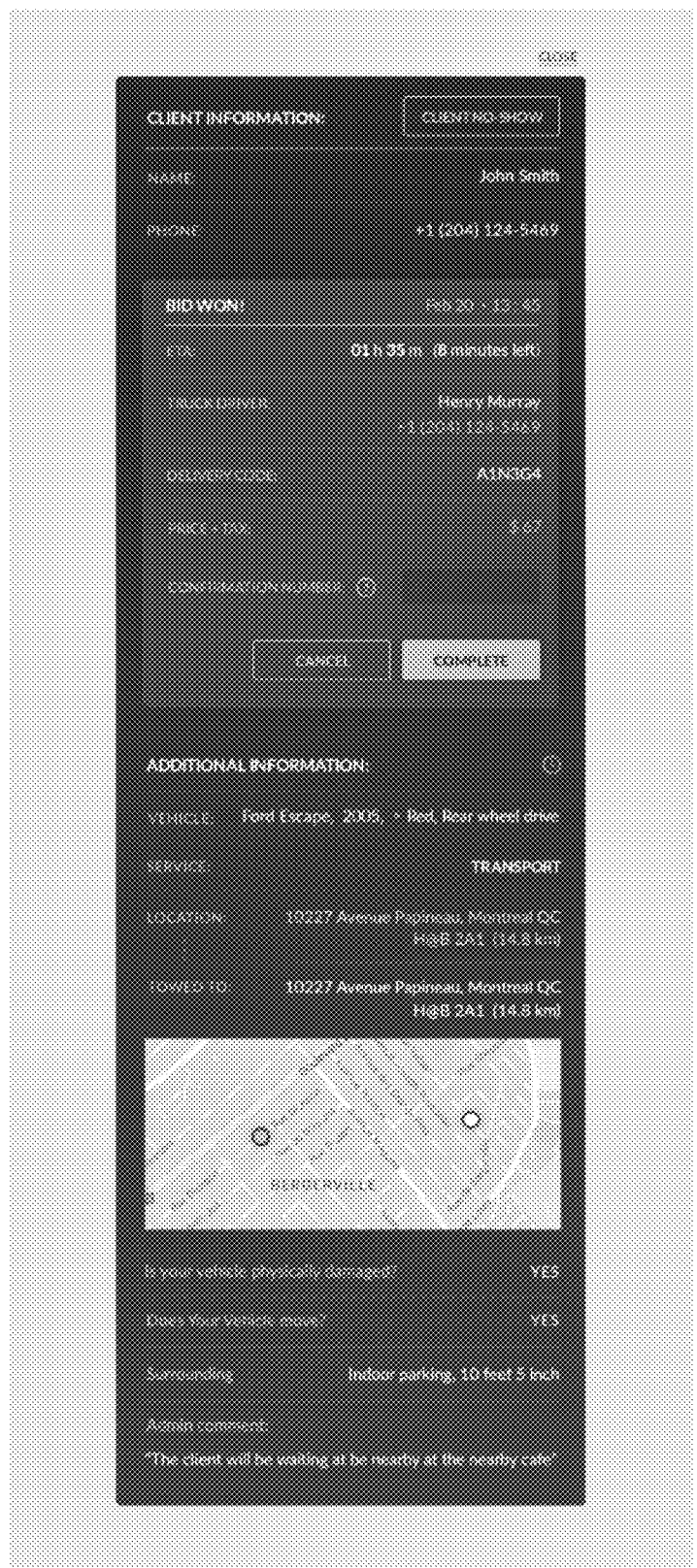

FIG. 62 illustrates a screenshot presented on the provider device 44 of the provider entity whose roadside assistance offer was selected by the driver entity. This environment can also be provided on the operator device 52 of the operator entity assigned to the roadside instance. The driver entity can share the unique delivery code displayed on their driver device 36 with the provider entity or operator entity. The provider entity or operator entity can then enter the code into the textbox (ex: "Confirmation number") to validate that the task has been completed—this also generates a notification indicating that the requested assistance has been completed and the notification is received at the assistance management system 1 (ex: Step 252 of method 200). An option is also made available for the provider entity or operator entity to indicate that the driver entity is not present at the location indicated in the initial roadside assistance request (ex: "Client no-show"). As described elsewhere herein, selecting this option triggers an assistance adjustment request.

According to one example embodiment, after the driver entity selects one of the roadside assistance offers and causes an operator entity to be deployed, the driver entity or the provider entity can, via their respective driver device 36 or provider device 40, make a modification to the roadside assistance instance. This modification is made in the form of an electronic assistance adjustment request. An electronic assistance adjustment request is received at the roadside assistance management system 1. The system 1 may be configured to release a portion of the funds received from the driver entity based on the assistance adjustment request. How the amount of funds are to be released and to whom the funds are released to may be determined based on the type of the assistance adjustment request and the amount of time remaining on the operator arrival timer at the moment of receiving the assistance adjustment request.

Figure 63:
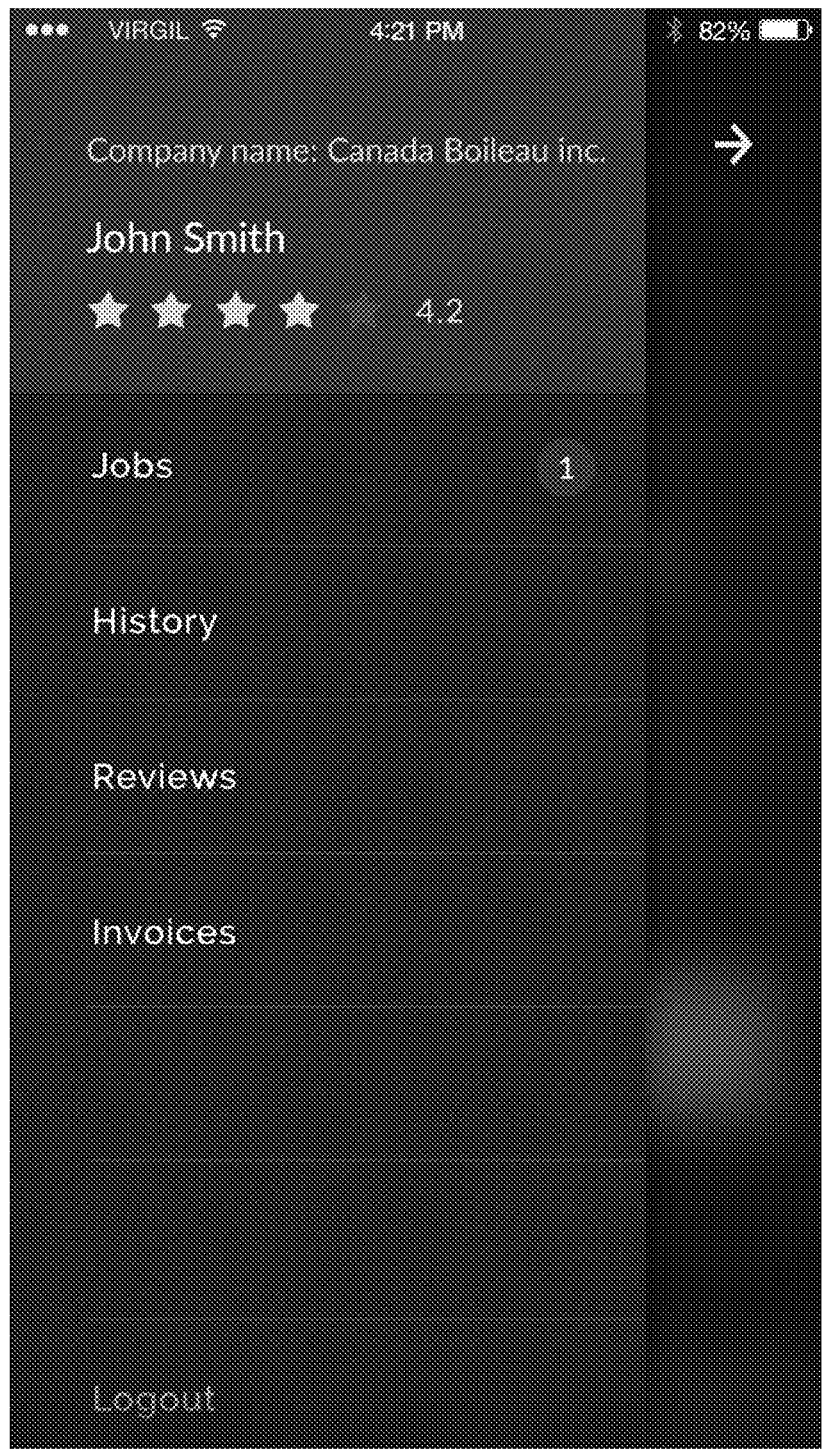
FIG. 63 is a screenshot of a user portal displayed on an operator device to permit an operator to view electronic roadside assistance tasks assigned to them.

FIG. 63 is a screenshot of a user portal displayed on an operator device 52. The operator entity associated to the device can view their ongoing tasks (ex: "Jobs=1") as well as other pertinent information such as history, reviews and invoices.

Figure 64:
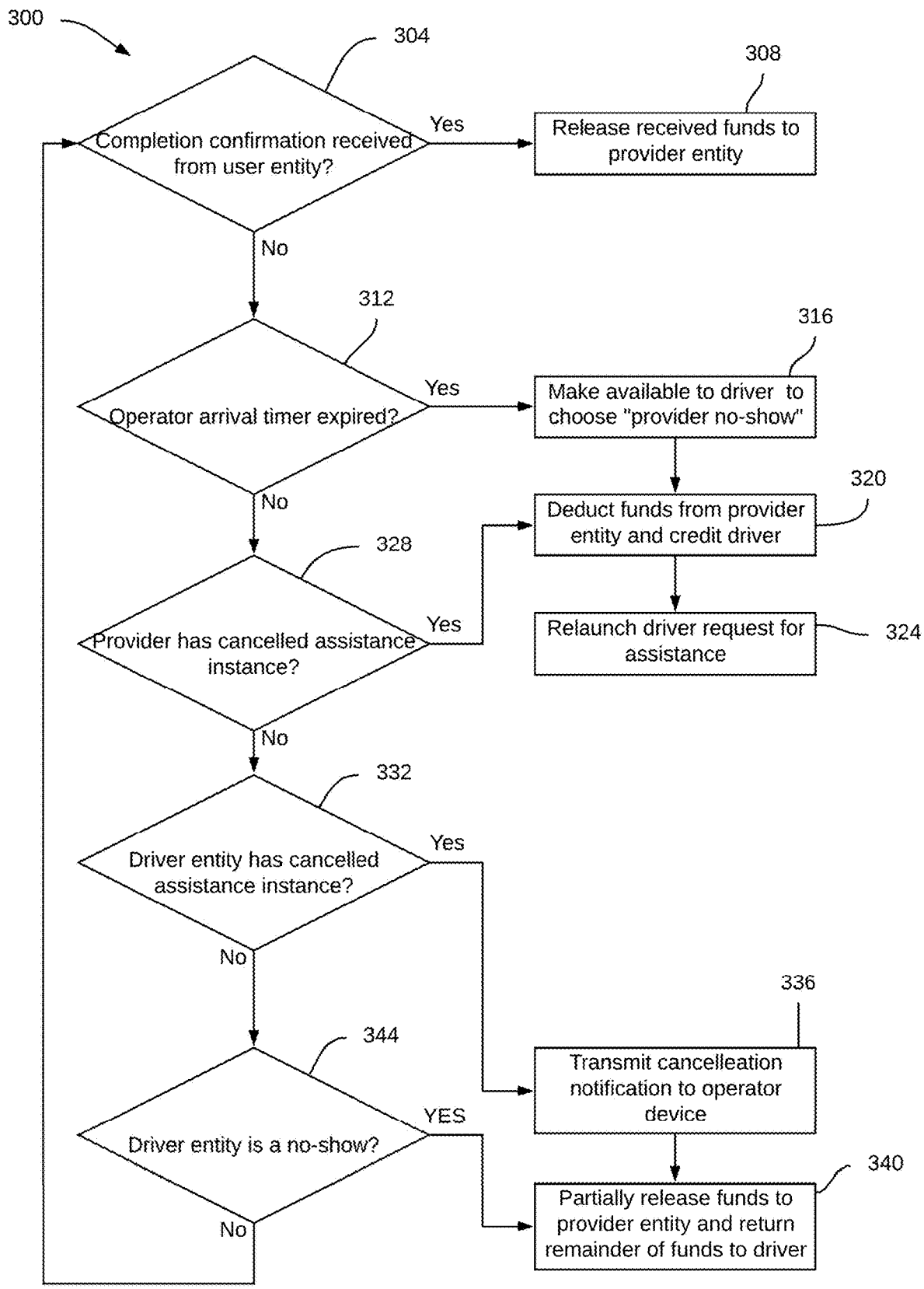
FIG. 64 illustrates a flowchart showing the operational steps of a method for managing and responding to various types of assistance adjustment requests.

Referring now to FIG. 64, therein illustrated is a flowchart showing the operational steps of a method 300 for managing various types of assistance adjustment requests according to one example embodiment. The monitoring of received assistance adjustment requests can be performed after step 248 of method 200 as described herein. Method 300 can also be performed at the assistance management module 20.

At step 304, it is determined whether an assistance adjustment request of the "completion" type has been received. This type of assistance adjustment request indicates that the requested roadside assistance task has been completed. If this type of request is received, the method proceeds to step 308 to release the funds received from the requesting driver entity (as received at step 244 of method 200). According to an embodiment, a portion of the released funds is transferred to an electronic payment account associated to the provider entity that performed the roadside assistance task and another portion of the released funds is transferred to an electronic payment account associated to an entity that maintains the roadside assistance management system 1.

Alternatively, where the accounting is managed by an entity that manages the roadside assistance management system 1, the provider entity can be credited the funds at step 308 and the funds can be periodically transferred to the provider entities according to their respective credit amounts.

At step 312, it is determined whether the operator arrival timer has expired. The expiry of the timer represents a situation in which the operator did not arrive at the location indicated in a roadside assistance request within the arrival time indicated in an accepted roadside assistance offer. If the operator arrival timer has expired, an option is made available on the display of the driver device 36 belonging to the driver entity to allow the driver entity to select an option that the operator entity has not arrived in time ("operator no-show"). The driver entity selecting this option triggers an assistance adjustment request of the "operator no-show" type. At step 320, in response to receiving this type of assistance adjustment request, an amount of funds is deducted from an electronic payment account associated to the provider entity that made the accepted roadside assistance offer. For example, a predetermined fraction (ex: 30%) of the price indicated in the accepted roadside assistance offer is deducted. A substantially equivalent amount of funds is also credited to the user entity. This credit of funds can be applied as a discount to further roadside assistance requests that the user will make. For example, since the initially provider entity was unable to perform the requested roadside assistance task, the driver entity can select another of the roadside assistance offers made by other provider entities. Alternatively, or additionally, the driver entity can make a new request for roadside assistance at step 324.

In some example embodiments, after expiration of the operator arrival timer at step 312, an option can be made available on the display of the driver device 36 belonging to the driver entity to allow the driver entity to select an option to continue the assistance instance. That is, the driver entity can choose to continue waiting for arrival of the operator despite that operator arrival timer having expired. Contact information for the operator can be further made available on the display of the driver device 36 to allow the driver entity to directly contact the operator (ex: by phone or text message).

At step 328, it is determined whether the provider entity has made an assistance adjustment request to cancel the roadside assistance instance (provider cancellation notification type). This represents a situation where the provider entity has voluntarily indicated that it will not complete the requested roadside assistance task. As described elsewhere herein, the provider entity can make this request via the user interface presented on the provider device. If this request is made, the method proceeds to step 320 to deduct an amount of funds from an electronic payment account associated to the provider entity that made the accepted roadside assistance offer. For example, a predetermined fraction (ex: 30%) of the price indicated in the accepted roadside assistance offer is deducted. Alternatively, the amount of funds to be deducted can be determined based on an amount of time remaining on the operator arrival timer at the time that the provider cancellation notification is made. For example, an amount of funds deducted for a provider cancellation notification that is made at an earlier time (i.e. more time remaining on the operator arrival timer) is less than an amount of funds deducted for a provider cancellation notification that is made at a later time (i.e. less time remaining on the operator arrival timer). Furthermore, a substantially equivalent amount of funds is also credited to the user entity. This credit of funds can be applied as a discount to further roadside assistance requests that the user will make. For example, since the initial provider entity was unable to perform the requested roadside assistance task, the driver entity can select another of the roadside assistance offers made by other provider entities. Alternatively, or additionally, the driver entity can make a new request for roadside assistance at step 324.

At step 332, it is determined whether the driver entity has made an assistance adjustment to cancel the roadside assistance instance (driver cancellation notification type). This represents a situation where the driver entity has voluntarily indicated that it will not complete the requested roadside assistance task. As described elsewhere herein, the driver entity can make this request via the user interface presented on the driver device. If this request is made, the method proceeds to step 336 to transmit a cancellation notification to the operator device, thereby notifying the assigned operator entity that the requested roadside assistance task no longer needs to be carried out. Furthermore, at step 340, a portion of the funds received from the electronic payment account associated to the driver entity is further released. More particularly, a first portion of funds is refunded to that driver entity and a second portion of the funds is released to an electronic payment account associated to the provider entity whose electronic roadside assistance offer was previously accepted by the driver entity. The first portion can be a first predetermined fraction of the price indicated in the accepted roadside assistance offer and the second portion can be a second predetermined fraction of that price. Alternatively, the amount of funds to be deducted can be determined based on an amount of time remaining on the operator arrival timer at the time that the provider cancellation notification is made. For example, an amount of funds (i.e. first portion) refunded to the driver entity for a driver cancellation notification that is made at an earlier time (i.e. more time remaining on the operator arrival timer) is more than an amount of funds refunded for a driver cancellation notification that is made at a later time (i.e. less time remaining on the operator arrival timer). Conversely, an amount of funds released to the provider entity (i.e. second portion) for a driver cancellation notification that is made at an earlier time (i.e. more time remaining on the operator arrival timer) is less than an amount of funds refunded for a driver cancellation notification that is made at a later time (i.e. less time remaining on the operator arrival timer).

At step 344, it is determined whether a driver no-show situation has occurred. This represents a situation where when the operator entity arrives at the location indicated in a roadside assistance instance, the driver entity is no longer present at the location (ex: the driver entity may have obtained assistance elsewhere). As described elsewhere, the operator can indicate a driver no-show situation via an option displayed on the operator device 52 (ex: see FIG. 62) If there is an instance of a driver no-show (Step 344:YES), the method proceeds to step 340 to release a portion of the funds received from the electronic payment account associated to the driver entity. A portion of funds is refunded to that driver entity and a second portion of funds is released to an electronic payment account associated to the provider entity. The amounts of the funds that are refunded to the driver entity and that are released to the provider entity can differ from the amounts for a driver entity cancellation (Step 332: YES). These amounts can be predetermined fractions of the price indicated in the accepted roadside assistance offer.

The monitoring for the receiving of an assistance adjustment request can be continued until the current roadside assistance instance is terminated. It will be appreciated that the instance can be terminated either from the task being completed (step 304:YES), the operator entity not arriving on time (step 312: YES), the provider entity cancelling the instance (step 328: YES), the driver cancelling the assistance instance (step 332: YES), or a driver no-show instance (step 344: YES).

In a typical use case, a driver of a road vehicle suffers an accident or a breakdown and requires roadside assistance. The driver can use a mobile device (driver device 36) to communicate with the roadside assistance management system 1 and enter a roadside assistance request. The driver can indicate their current location and the type of assistance that they need. The roadside assistance management system 1 determines which providers are a match for that request based on a match in geographical coverage and roadside assistance capabilities. The system 1 further sends roadside assistance solicitations to providers that are a match. Dispatchers at these providers operate a user device (provider device) to make offers to assist in response to the solicitations. The solicitations define a price and estimated time of arrival. A list of offers made by the providers are then displayed on driver's device and the driver can browse these to pick the most acceptable offer. The provider entity whose offer is selected is notified of that selection and an operator entity associated to that provider is also notified. The operator is therefore dispatched to assist the driver.

As described above, in other contexts and/or industries, actors may also require the assistance of a service provider in which the parameters of the required assistance are similar or analogous to a roadside assistance. Such actors can also request assistance from the service provider in a manner analogous to the requesting of roadside assistance by a driver entity described hereinabove. The management of the request for assistance within such contexts, including the transmitting of an electronic assistance solicitation, the receiving of electronic assistance offers, the receiving of an electronic response indicating an acceptance of an offer and the subsequent tracking of the completion of the work and managing electronic payment, including any cancellations, can also be carried out in an analogous manner to the systems and methods described hereinabove for managing a request for roadside assistance. Accordingly, it is contemplated that various embodiments described herein for managing a request for roadside assistance are also applicable, and encompass, such other analogous context and/or industries.

One particular context that is analogous to the providing of roadside assistance is the management of equipment requiring transportation and servicing, such as in the construction or rental industry. Accordingly, "driver entity" is described above to cover suppliers or users of pieces equipment. Such driver entities in this context can include construction companies, rental companies and/or contractors.

It was observed that carrying out a construction job that requires use of a piece of equipment often includes the step of transporting the piece of equipment from one work site to another, or to and from a storage facility. The piece of equipment can be a piece of heavy machinery, such as, but not limited to: loader, excavator, compact roller, scissor lift, forklift, boom lift, tele handler. Furthermore, where the equipment is not owned by the entity carrying out the construction task, the transportation of the equipment can be supplied by a third party. A common example is where the piece of equipment is supplied by a rental company specialized in renting out pieces of equipment and the rented equipment is operated by another party, such as a contractor, to carry out the construction job. Either the rental company or the contractor may request the services of a third party transporter to transport the rented piece of equipment to and from the work site where the contractor is carrying out the construction job. The piece of equipment can be transported to the work site from a storage facility associated to the rental company or from another work site where it was previously being operated (ex: by another contractor). Similarly, the piece of equipment can be transported from the work site (after completion of the construction job) to the storage facility associated to the rental company or to another work site (for used by another contractor).

It was further observed that the transporter that transports the rented piece of equipment will often use the same type of roadside assistance vehicles (ex: a flatbed truck) use for carrying out roadside assistance. It is contemplated that within the context of construction and/or rental industry, the requesting of equipment transportation services for transporting pieces of equipment is analogous to requesting roadside assistance. Accordingly, the management of requests for transportation services within the construction/rental context can be carried out in substantially the same manner as the management of a request for roadside assistance.

Referring back to FIG. 1, the roadside assistance management system 1 can be applied in an analogous to the construction/rental context with the following adaptations:

the driver devices 36 are used by driver entities, which can either be a rental company or a client renting the equipment (ex: contractor);

the electronic assistance request is now an electronic transportation assistance request;

the electronic transportation assistance request can be made by the rental company using a driver device 36 (ex: to transport the rented piece of equipment to the work site at which the renting contractor will be operating the equipment, to pick up the equipment from the work site, to transport the piece of equipment between two different work sites);

the electronic transportation assistance request can also be made by the renting client (ex: contractor) using a driver device 36 in some example embodiments (ex: to transport the rented piece of equipment between two work sites where the same contractor is carrying out jobs);

the electronic transportation assistance request parameters of the assistance task, including the pick up location for the piece of equipment, the drop off location for the piece of equipment, the requested pick-up time, the requested drop-off time (or operating hours at the pick-up and/or drop-off sites), properties of the piece of equipment (ex: type, size, weight, and/or model no., etc), and/or presence of hazardous material;

the provider properties entry 124 also stores equipment transportation assistance capabilities of the provider entity, such as the maximum size, maximum weight and any other capabilities or restrictions;

the provider properties entry 124 can further store transportation assistance tasks scheduled for the future (ex: based on a request pick-up time of a transportation assistance request scheduled for the future)

the provider entities that match a given transportation assistance request is determined based on the transportation assistance capabilities, the transportation assistance request parameters, the current location of the operators and/or the zones of operation for a given provider, and the availabilities of operators based on future scheduled assistance tasks;

once provider entities matching a given transportation assistance request have been determined, the transmission of electronic transportation assistance solicitations to the provider devices 44, the receiving of assistance offers from the provide devices 44, the transmission of the offers to driver device 36, the receiving of a response from the driver device 36 indicating an acceptance of the offer and the creating of an electronic transportation assistance instance, can be carried out in substantially the same manner as analogous steps for the roadside assistance context;

the operator arrival timer is set based on the requested pick-up time and/or the requested drop-off time defined in the transportation assistance request—multiple countdown timers can be defined if the transportation assistance task is a multi-step task (ex: pick-up time at a first location triggers a first countdown timer and drop-off time at a second location triggers a second countdown timer);

multiple transportation tasks can be daisy chained within a single transportation assistance request:

pieces of equipment are to be picked up from different locations prior to dropping of the equipment at a defined drop-off location;

after dropping off a given set of one or more pieces of equipment at a given drop-off location, the assistance vehicle (ex: flatbed truck) can pick up another set of pieces of equipment at the same location for transportation to another drop-off location;

prior to the operator entity tasked to a transportation assistance instance arriving at the pick-up location to pick up the set of one or more pieces of equipment for transportation, the cancellation of the transportation assistance instance (either by the driver entity or by the provider entity) operates in the same way as for cancellation of a roadside assistance instance (see FIG. 64);

if the operator entity tasked to a transportation assistance instance has already picked up the set of one or more pieces of equipment for transportation, and the cancellation occurs after the pick up (ex: the contractor requesting the equipment no longer needs the equipment), the portion of funds refunded to the driver entity (ex: the rental company making the request) is determined based on a cost for the operator entity to transport the picked-up piece of equipment to an appropriate storage site—this amount can be automatically determined based on the distance traveled by the operator entity.

Referring back to FIG. 2, the method 200 for managing a roadside assistance instance can be carried out in an analogous manner for managing a transportation assistance instance. At step 202, the driver entity (ex: an equipment rental company) makes a transportation request. In the same manner for making a roadside assistance request, a user can interact with the device 36 to define parameters of the transportation assistance request. A user interface can be presented as a series of questions so that the driver entity can accurately define the type of service required while avoiding errors or contradictions when defining the request. Step 202 is illustrated using dashed lines to indicate that this step may be carried on the driver device 36 and outside the assistance management system 1.

Figure 65:
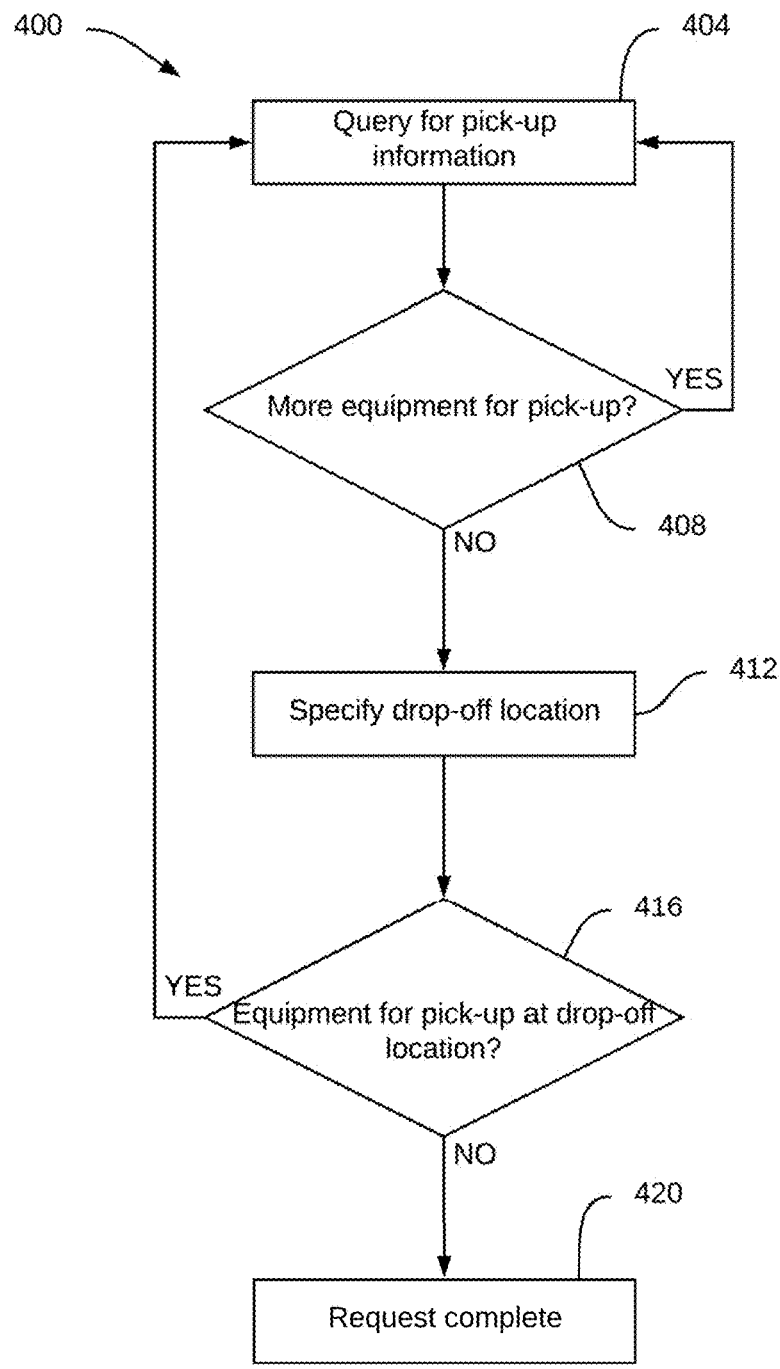
FIG. 65 illustrates a flowchart showing the operational steps of a method for making a request for transportation assistance in which multiple transportation tasks can be daisy chained according to an exemplary embodiment.

Referring now to FIG. 65, therein illustrated is a flowchart showing the operational steps of a method 400 for making a request for transportation assistance in which multiple transportation tasks can be daisy chained according to an example embodiment. The method 400 is carried out at the driver device 36, at the user interface module 12 of the assistance management system 1, or the steps are split between the driver device 36 and the user interface module 12.

At step 404, a user interface screen is presented to query for pick-up information. The user can use the driver device 36 to enter parameters of the first pick-up task to be carried out as part of the transportation assistance request. As described elsewhere, the parameters can include:

address of the pick-up location;

a scheduled pick-up time (ex: immediate pick-up, pick-up at a future time, or operating hours window during which pick-up can be carried out at any time within the window);

properties of the piece of equipment to be picked up (ex: equipment type, serial number, instruction manual number, height, weight, length, width, whether hazardous material, etc.).

At step 408, it is determined whether another piece of equipment needs to be picked up. The another piece of equipment to be picked up is to be transported in combination with the piece of equipment already defined at set 404 to form a set of pieces of equipment to be transported to the same drop-off location. For example, a user interface screen is presented with the option for the user to select "Pickup another piece of equipment" or "Specify Drop-off Location".

If it is determined that the further piece of equipment need to be picked up, the method 400 returns to step 404 to allow the user to define the parameters of the further piece of equipment.

If it is determined that no other piece of equipment is to be picked-up at step 408, the method proceeds to step 412.

At step 412, a user interface screen is presented to query for drop-off location. The user can use the driver device 36 to enter parameters of the drop-off location, such as location address, contact information, and operating hours at the drop-off location. The operating hours can be a window of time during which the drop-off can occur at any time within the window.

At step 416, it is determined whether a piece of equipment is to be picked up at the drop-off location for further transportation. The piece of equipment can be a rental equipment that is currently being used at the drop-off location but is to be transported to another work site for use by another party (ex: another contractor). This further pick-up of a piece of equipment represents the next link in the daisy chain of transportation tasks. For example, a user interface screen is presented with the option for the user to select whether there is another piece of equipment for pick-up at the drop-off location.

If it is determined that a piece of equipment is to be picked up at the drop-off location at step 416, the method proceeds back to step 404 to allow the user to define the parameters of the piece of equipment to be picked. It will be appreciated that step 404 proceeds in the same way as for the first piece of equipment that was initially defined. Accordingly, returning to step 404 allows for defining parameters of the next transportation task in the daisy chain of transportation tasks within a same transportation assistance instance.

If it is determined that a piece of equipment is not to be picked-up at the drop-off location at step 416, the method proceeds to step 420, at which point defining the transportation assistance request is complete.

Returning to FIG. 2, in the context of managing transportation assistance requests, after completion of the assistance request at step 202, the electronic transportation assistance request is received at step 204. The request indicates the parameters of the transportation assistance request as described hereinabove.

At step 208, the set of available provider entities that are a match for the received electronic transportation assistance request is determined.

At step 212, electronic transportation assistance solicitations are transmitted to the provider devices of each of the available provider entities.

At step 216, a solicitation countdown timer can be optionally initialized. The countdown timer defines a window of time during which provider entities can respond to the solicitation by making electronic transportation assistance offers.

Steps 208 to 216 may be also be repeated iteratively for electronic transportation assistance requests.

At step 220, one or more electronic transportation assistance offers are received from a subset of the available providers. Each offer can define an offer price. In the case where the transportation assistance is to be carried out immediately, the offer can define an estimated time of arrival of a transportation assistance operation. In the case where a pick-up time is specified in the transportation assistance request, an estimated time of arrival may not need to be specified. In an embodiment wherein a solicitation countdown timer is initialized, only electronic transportation assistance offers received while the solicitation countdown timer has not expired will be considered.

At step 228, an electronic response indicating an acceptance/selection of one of the electronic transportation assistance offers is received.

At step 232, an alert message is transmitted to the provider device belonging to the provider entity whose electronic transportation assistance offer was accepted at step 228.

At step 236, electronic payment of an amount of funds corresponding to the offer price defined in the accepted electronic transportation assistance offer is received. In some example embodiments, the electronic payment of funds is received prior to an alert message being transmitted to the provider device.

At step 240, an indication of a selection of an operator entity controlled by the provider entity is received. In some embodiments, the selection of the operator entity can be defined earlier within step 220.

At step 244, a notification is transmitted to the selected operator entity. The notification may indicate a location of the driver entity requiring transportation assistance and the parameters of the requested transportation assistance.

At step 248, an operator arrival countdown timer is initialized. The countdown timer can be made available to the driver device 36 of the driver entity so that the driver can see how much time is left before the ETA provided by the provider remains. The ETA can be the ETA specified in the electronic transportation assistance offer specified at step 220 and received at step 228. Alternatively, the operator arrival countdown timer can correspond to the pick-up time specified in the transportation assistance request, where such a scheduled pick-up time is specified. If an operating hours window is defined, the expiry of the countdown timer can correspond to the end of the operating hours window. In some embodiments, a confirmation code can also be transmitted to the driver device 36. The confirmation code can be used by the driver entity to confirm completion of the requested assistance.

At step 252, a notification that indicates completion of the requested transportation assistance is received. The indication can be received from the driver device 36 (ex: from the driver entity selecting "SERVICE COMPLETE"). The indication can also be received from an operator device 52. In the latter case, the operator device 52 can provide a signature line on its user interface and a driver entity can provide their signature (when picking-up and/or dropping off a piece of equipment), whereby the signature from the driver entity on the signature line on the operator device 52 can be used to confirm completion of the requested transportation assistance.

Referring back to FIG. 64, the method 300 for managing various types of assistance adjustment requests for roadside assistance can be carried out in an analogous manner for managing adjustments to transportation assistance requests.

At step 304, it is determined whether an assistance adjustment request of the "completion" type has been received. This type of assistance adjustment request indicates that the requested transportation assistance task has been completed. A transportation assistance task can be considered as being completed when all of the pieces of equipment have been picked and dropped off at that the appropriate transportation locations. If this type of request is received, the method proceeds to step 308 to release the funds received from the requesting driver entity (as received at step 244 of method 200). According to an embodiment, a portion of the released funds is transferred to an electronic payment account associated to the provider entity that performed the transportation assistance task and another portion of the released funds is transferred to an electronic payment account associated to an entity that maintains the roadside assistance management system 1.

At step 312, it is determined whether the operator arrival timer has expired. The expiry of the timer represents a situation in which the operator did not arrive at the pick-up location indicated in a transportation assistance request within the arrival time indicated in an accepted transportation assistance offer (ex: the ETA specified in the request or the scheduled pick-up time). If the operator arrival timer has expired, an option is made available on the display of the driver device 36 belonging to the driver entity to allow the driver entity to select an option that the operator entity has not arrived in time ("operator no-show"). The driver entity selecting this option triggers an assistance adjustment request of the "operator no-show" type. At step 320, in response to receiving this type of assistance adjustment request, an amount of funds is deducted from an electronic payment account associated to the provider entity that made the accepted transportation assistance offer. For example, a predetermined fraction (ex: 30%) of the price indicated in the accepted transportation assistance offer is deducted. A substantially equivalent amount of funds is also credited to the driver entity. This credit of funds can be applied as a discount to further transportation assistance requests that the user will make. For example, since the initially provider entity was unable to perform the requested transportation assistance task, the driver entity can select another of the transportation assistance offers made by other provider entities. Alternatively, or additionally, the driver entity can make a new request for transportation assistance at step 324.

In some example embodiments, after expiration of the operator arrival timer at step 312, an option can be made available on the display of the driver device 36 belonging to the driver entity to allow the driver entity to select an option to continue the assistance instance. That is, the driver entity can choose to continue waiting for arrival of the operator despite that operator arrival timer having expired. Contact information for the operator can be further made available on the display of the driver device 36 to allow the driver entity to directly contact the operator (ex: by phone or text message).

At step 328, it is determined whether the provider entity has made an assistance adjustment request to cancel the transportation assistance instance (provider cancellation notification type). This represents a situation where the provider entity has voluntarily indicated that it will not complete the requested transportation assistance task. As described elsewhere herein, the provider entity can make this request via the user interface presented on the provider device. If this request is made, the method proceeds to step 320 to deduct an amount of funds from an electronic payment account associated to the provider entity that made the accepted transportation assistance offer. For example, a predetermined fraction (ex: 30%) of the price indicated in the accepted transportation assistance offer is deducted. Alternatively, the amount of funds to be deducted can be determined based on an amount of time remaining on the operator arrival timer at the time that the provider cancellation notification is made. For example, an amount of funds deducted for a provider cancellation notification that is made at an earlier time (i.e. more time remaining on the operator arrival timer) is less than an amount of funds deducted for a provider cancellation notification that is made at a later time (i.e. less time remaining on the operator arrival timer). Furthermore, a substantially equivalent amount of funds is also credited to the user entity. This credit of funds can be applied as a discount to further transportation assistance requests that the user will make. For example, since the initial provider entity was unable to perform the requested transportation assistance task, the driver entity can select another of the transportation assistance offers made by other provider entities. Alternatively, or additionally, the driver entity can make a new request for transportation assistance at step 324.

At step 332, it is determined whether the driver entity has made an assistance adjustment to cancel the transportation assistance instance (driver cancellation notification type). This represents a situation where the driver entity has voluntarily indicated that it will not complete the requested transportation assistance task. As described elsewhere herein, the driver entity can make this request via the user interface presented on the driver device. If this request is made, the method proceeds to step 336 to transmit a cancellation notification to the operator device, thereby notifying the assigned operator entity that the requested transportation assistance task no longer needs to be carried out. Furthermore, at step 340, a portion of the funds received from the electronic payment account associated to the driver entity is further released. More particularly, a first portion of funds is refunded to that driver entity and a second portion of the funds is released to an electronic payment account associated to the provider entity whose electronic transportation assistance offer was previously accepted by the driver entity.

The determination of the amount of the funds to be refunded may be based on whether the piece of equipment to be transported has already been picked-up. It will be appreciated that cancellation after the piece of equipment has been picked-up represents an additional burden to the provider entity because its operator must dispose of the picked up piece of equipment (ex: bringing it to an appropriate storage facility) before it can move onto any other transportation or roadside assistance tasks.

Accordingly, where the cancellation occurs prior to the piece of equipment being picked up, the first portion to be refunded can be a first predetermined fraction of the price indicated in the accepted roadside assistance offer and the second portion can be a second predetermined fraction of that price. Alternatively, the amount of funds to be deducted can be determined based on an amount of time remaining on the operator arrival timer at the time that the provider cancellation notification is made. For example, an amount of funds (i.e. first portion) refunded to the driver entity for a driver cancellation notification that is made at an earlier time (i.e. more time remaining on the operator arrival timer) is more than an amount of funds refunded for a driver cancellation notification that is made at a later time (i.e. less time remaining on the operator arrival timer). Conversely, an amount of funds released to the provider entity (i.e. second portion) for a driver cancellation notification that is made at an earlier time (i.e. more time remaining on the operator arrival timer) is less than an amount of funds refunded for a driver cancellation notification that is made at a later time (i.e. less time remaining on the operator arrival timer).

Where the cancellation occurs subsequent to the piece of equipment being picked up, the portion of funds to be refunded can be determined to further account for costs to be incurred by the provider entity (i.e. the operator associated to the provider entity) to bring the piece of equipment to an appropriate storage facility. For example, such a cancellation request can occur when a rented piece of equipment that is currently being used at a first work site is scheduled to be transported to another work site for used by a second contractor. The second contractor may then subsequently no longer require that piece of equipment, but it has already been picked up by the operator entity of the provider entity. In such cases, the portion of funds to be released to the provider entity can be further determined based on the distance traveled by the operator entity to transport that piece of equipment to the storage facility (ex: to bring the piece of equipment back to a facility belonging to the rental company). The payment management module 28 can be configured to automatically determine the portion of funds to be refunded based on the distance traveled by the operator as determined from a location-enable module (i.e. GPS) of the operator device 52. In one instance, this portion of funds can be a multiplier of the mileage (ex: amount/mile multiplied by miles traveled).

At step 344, it is determined whether a driver no-show situation has occurred. This represents a situation where when the operator entity arrives at either the pick-up location or the drop-off location indicated in a transportation assistance instance, the driver entity is no longer present to either give the piece of equipment or to receive the piece of equipment. As described elsewhere, the operator can indicate a driver no-show situation via an option displayed on the operator device 52. If there is an instance of a driver no-show (Step 344:YES), the method proceeds to step 340 to release a portion of the funds received from the electronic payment account associated to the driver entity. A portion of funds is refunded to that driver entity and a second portion of funds is released to an electronic payment account associated to the provider entity. The amounts of the funds that are refunded to the driver entity and that are released to the provider entity can differ from the amounts for a driver entity cancellation (Step 332: YES). The amounts can also differ based on whether a piece of equipment has already been picked-up.

The monitoring for the receiving of an assistance adjustment request can be continued until the current transportation assistance instance is terminated. It will be appreciated that the instance can be terminated either from the task being completed (step 304:YES), the operator entity not arriving on time (step 312: YES), the provider entity cancelling the instance (step 328: YES), the driver cancelling the assistance instance (step 332: YES), or a driver no-show instance (step 344: YES).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A computer-implemented method for managing a roadside assistance request, the method comprising:
  receiving at a computer-implemented roadside assistance management system, over a wireless communication network, an electronic assistance request from a driver mobile device associated to a driver entity, the request defining a location of the driver mobile device and at least one roadside assistance parameter, the request being made via a user interface displayed on the driver mobile device, the at least one roadside assistance parameter being entered via the user interface, and the location of the driver mobile device being determined by a location-enabled module of the driver mobile device;
  determining, at the computer-implemented roadside assistance management system from a pool of provider entities, a set of one or more available provider entities, the computer-implemented roadside assistance management system storing for each provider entity of the pool of provider entities, a respective geographical coverage zone for the provider entity and an operator mobile device associated to at least one roadside assistance operator vehicle associated to the provider entity, each available provider entity of the set of one or more available provider entities having a geographical coverage zone encompassing the location of the driver mobile device;
  automatically transmitting from the computer-implemented roadside assistance management system, over a communication network, an electronic assistance solicitation to each provider entity of the set of available provider entities, the electronic assistance solicitation indicating the location and the at least one assistance parameter defined in the received electronic assistance request;
  receiving at the computer-implemented roadside assistance management system, over the communication network, an electronic roadside assistance offer from each of a subset of the set of available provider entities, each electronic assistance offer defining a respective offer price and a respective estimated time of arrival;
  automatically transmitting from the computer-implemented roadside assistance management system, over the wireless communication network, the received one or more electronic assistance offers to the driver mobile device, the respective offer price and the respective estimated time of arrival being made available for display and for selection via the user interface of the driver mobile device;
  receiving at the computer-implemented roadside assistance management system, over the communication network, an electronic response from the driver mobile device indicating an acceptance of one of the electronic assistance offers made via a selection of the accepted electronic assistance offer via the user interface of the driver mobile device;
  receiving an electronic payment from the driver entity of an amount of funds corresponding to the offer price defined in the accepted electronic assistance offer;
  in response to receiving the electronic payment, automatically transmitting from the computer-implemented roadside assistance management system, over a wireless communication network, an electronic notification to the operator mobile device associated to the roadside assistance operator vehicle associated to the provider entity of the accepted electronic assistance offer, the electronic notification indicating the location and at least one assistance parameter defined in the received electronic assistance request, the location and the at least one assistance parameter being made available for display on the operator mobile device;

determining at the computer-implemented roadside assistance management system a duration of an operator arrival timer based on the estimated time of arrival defined in the accepted electronic assistance offer; and upon transmitting the notification to the operator mobile device, immediately beginning counting down of the operator arrival timer;

receiving, at the computer-implemented roadside assistance management system, a roadside assistance adjustment request indicating a change in a status in the performance of the accepted electronic roadside assistance offer, the adjustment request being made via a user interface of the operator mobile device or via the user interface of the driver mobile device;

releasing at least a portion of the received amount of funds based on the roadside assistance adjustment request, wherein the amount of funds to be released and the recipient of the released portion is determined based on the type of the roadside assistance adjustment request and an amount of time remaining on the operator arrival timer at the time of receiving the roadside assistance adjustment request.

2. The method of claim 1, wherein each provider entity is further defined by a respective set of roadside assistance capabilities; and wherein each available provider entity further has a set of roadside assistance capabilities encompassing the at least one roadside assistance parameter defined in the received electronic roadside assistance request.

3. The method of claim 1, wherein the type of the assistance adjustment request is an assistance completion confirmation; and wherein in response to receiving the assistance completion confirmation, a portion of the funds is released to an electronic payment account associated to the provider entity of the accepted electronic roadside assistance offer.

4. The method of claim 1, wherein the type of the assistance adjustment request is an assistance incomplete notification; and wherein the amount of funds to be released and the recipient of the released portion is determined based on the amount of time remaining on the operator arrival timer at the time of receiving the assistance incomplete notification.

5. The method of claim 4, wherein the type of assistance incomplete notification is an operator no-show notification; and wherein in response to receiving the operator no-show notification:
further receiving an electronic payment from the provider entity of the accepted electronic roadside assistance offer; and
recording a credit to the driver entity of a portion of the electronic payment received from the provider entity of the accepted electronic roadside assistance offer; and
wherein the method further comprises:

upon expiry of the operator arrival timer, making available at the driver device an interactive element to select an operator no-show notification; and
receiving, over the communication network an electronic response from the driver device indicating selection of the operator no-show notification.

6. The method of claim 4, wherein the type of the assistance incomplete notification is a provider cancellation notification; and wherein in response to receiving the provider cancellation notification:
further receiving an electronic payment from the provider entity of the accepted electronic roadside assistance offer; and
recording a credit to the user entity of a portion of the electronic payment received from the provider entity of the accepted electronic roadside assistance offer.

7. The method of claim 6, wherein the amount of the electronic payment received from the provider entity of the accepted electronic roadside assistance offer is determined based on the amount of time remaining on the operator arrival timer at the time of the provider cancellation notification.

8. The method of claim 4, wherein the type of the assistance incomplete notification is a driver cancellation notification; and wherein in response to receiving the driver cancellation notification, a first portion of the funds are refunded to the driver entity and a second portion of the funds are released to an electronic payment account associated to the provider entity of the accepted electronic roadside assistance offer.

9. The method of claim 8, wherein the amount of funds refunded to the driver entity and the amount of funds released to the electronic payment account associated to the provider is determined based on the amount of time remaining on the operator arrival timer at the time of the driver cancellation notification.

10. The method of claim 1, wherein the one or more electronic roadside assistance offers are transmitted for display on the driver device;

wherein the offer price of each roadside assistance offer is displayed on the driver device and the identity of the provider entity for each roadside assistance offer is hidden from view on the display of the driver device; and wherein after receiving the electronic response indicating the acceptance of the one of the electronic roadside assistance offers, displaying on the driver device the identity of the provider entity for the accepted electronic roadside assistance offer.

11. The method of claim 1, wherein the request for assistance is a request for transportation assistance for transportation of a piece of equipment;

wherein the electronic assistance request is an electronic transportation assistance request;

wherein the at least one assistance parameter comprises at least one transportation assistance parameter;

wherein the electronic assistance solicitation is an electronic transportation assistance solicitation;

wherein the electronic assistance offer is an electronic transportation assistance offer; and wherein the assistance operator entity is a transportation assistance operator entity.

12. The method of claim 1, further comprising:
receiving a current location of each roadside assistance operator vehicle associated to each provider entity, the current location being determined using a location-enabled module of the operator mobile device, the computer-implemented roadside assistance management system further storing, for each provider entity, the current location of each of the at least one roadside assistance operator vehicle associated to the provider entity; and wherein the set of one or more available provider entities is determined based the provider entity being associated with at least one roadside assistance operator vehicle having a current location within a predetermined distance of the location of the driver mobile device.

13. A computer-implemented system for managing a roadside assistance request, the system comprising:

at least one data storage device; and at least one processor operably coupled to the at least one storage device, the at least one processor being configured for:

receiving, over a wireless communication network, an electronic assistance request from a driver mobile device associated to a driver entity, the request defining a location of the driver mobile device and at least one roadside assistance parameter, the request being made via a user interface displayed on the driver mobile device, the at least one roadside assistance parameter being entered via the user interface, and the location of the driver mobile device being determined by a location-enabled module of the driver mobile device;

determining from a pool of provider entities, a set of one or more available provider entities, the system storing for each provider entity of the pool of provider entities, a respective geographical coverage zone for the provider entity and an operator mobile device associated to at least one roadside assistance operator vehicle associated to the provider entity, each available provider entity of the set of one or more available provider entities having a geographical coverage zone encompassing the location of the driver mobile device;

automatically transmitting, over a communication network, an electronic assistance solicitation to each provider entity of the set of available provider entities, the electronic assistance solicitation indicating the location and the at least one assistance parameter defined in the received electronic assistance request;

receiving, over the communication network, an electronic roadside assistance offer from each of a subset of the set of available provider entities, each electronic assistance offer defining a respective offer price and a respective estimated time of arrival;

automatically transmitting over the wireless communication network the received one or more electronic assistance offers to the driver mobile device, the respective offer price and the respective estimated time of arrival being made available for display and for selection via the user interface of the driver mobile device;

receiving, over the communication network, an electronic response from the driver mobile device indicating an acceptance of one of the electronic assistance offers made via a selection of the accepted electronic assistance offer via the user interface of the driver mobile device;

receiving an electronic payment from the driver entity of an amount of funds corresponding to the offer price defined in the accepted electronic assistance offer;

in response to receiving the electronic payment, automatically transmitting, over a wireless communication network, an electronic notification to the operator mobile device associated to the roadside assistance operator vehicle associated to the provider entity of the accepted electronic assistance offer, the notification indicating the location and at least one assistance parameter defined in the received electronic assistance request, the location and the at least one assistance parameter being made available for display on the operator mobile device;

determining a duration of an operator arrival timer based on the estimated time of arrival defined in the accepted electronic assistance offer; and upon transmitting the notification to the operator mobile device, immediately beginning counting down of the operator arrival timer;

receiving, at the computer-implemented roadside assistance management system, a roadside assistance adjustment request indicating a change in a status in the performance of the accepted electronic roadside assistance offer, the adjustment request being made via a user interface of the operator mobile device or via the user interface of the driver mobile device;

releasing at least a portion of the received amount of funds based on the roadside assistance adjustment request, wherein the amount of funds to be released and the recipient of the released portion is determined based on the type of the roadside assistance adjustment request and an amount of time remaining on the operator arrival timer at the time of receiving the roadside assistance adjustment request.

14. The system of claim 13, wherein each provider entity is further defined by a respective set of roadside assistance capabilities; and wherein each available provider entity further has a set of roadside assistance capabilities encompassing the at least one roadside assistance parameter defined in the received electronic roadside assistance request.

15. The system of claim 13, wherein the type of the assistance adjustment request is an assistance completion confirmation; and wherein in response to receiving the assistance completion confirmation, a portion of the funds is released to an electronic payment account associated to the provider entity of the accepted electronic roadside assistance offer.

16. The system of claim 13, wherein the type of the assistance adjustment request is an assistance incomplete notification; and wherein the amount of funds to be released and the recipient of the released portion is determined based on the amount of time remaining on the operator arrival timer at the time of receiving the assistance incomplete notification.

17. The system of claim 16, wherein the type of assistance incomplete notification is an operator no-show notification; and wherein the processor is further configured for, in response to receiving the operator no-show notification:

further receiving an electronic payment from the provider entity of the accepted electronic roadside assistance offer; and recording a credit to the driver entity of a portion of the electronic payment received from the provider entity of the accepted electronic roadside assistance offer; and wherein the processor is further configured for:

upon expiry of the operator arrival timer, making available at the driver device an interactive element to select an operator no-show notification; and receiving, over the communication network an electronic response from the driver device indicating selection of the operator no-show notification.

18. The system of claims 16, wherein the type of the assistance incomplete notification is a provider cancellation notification; and wherein the processor is further configured for, in response to receiving the provider cancellation notification:

further receiving an electronic payment from the provider entity of the accepted electronic roadside assistance offer; and recording a credit to the user entity of a portion of the electronic payment received from the provider entity of the accepted electronic roadside assistance offer.

19. The system of claim 18, wherein the amount of the electronic payment received from the provider entity of the accepted electronic roadside assistance offer is determined based on the amount of time remaining on the operator arrival timer at the time of the provider cancellation notification.

20. The system of claim 16, wherein the type of the assistance incomplete notification is a driver cancellation notification; and wherein in response to receiving the driver cancellation notification, a first portion of the funds are refunded to the driver entity and a second portion of the funds are released to an electronic payment account associated to the provider entity of the accepted electronic roadside assistance offer.

21. The system of claim 20, wherein the amount of funds refunded to the driver entity and the amount of funds released to the electronic payment account associated to the provider is determined based on an amount of time remaining on the operator arrival timer at the time of the driver cancellation notification.

22. The system of claim 13, wherein the one or more electronic roadside assistance offers are transmitted for display on the driver device; and wherein the offer price of each roadside assistance offer is displayed on the driver device and the identity of the provider entity for each roadside assistance offer is hidden from view on the display of the driver device; and wherein after receiving the electronic response indicating the acceptance of the one of the electronic roadside assistance offers, displaying on the driver device the identity of the provider entity for the accepted electronic roadside assistance offer.

23. The system of claim 13, wherein the request for assistance is a request for transportation assistance for transportation of a piece of equipment;

wherein the electronic assistance request is an electronic transportation assistance request;

wherein the at least one assistance parameter comprises at least one transportation assistance parameter;

wherein the electronic assistance solicitation is an electronic transportation assistance solicitation;

wherein the electronic assistance offer is an electronic transportation assistance offer; and wherein the assistance operator entity is a transportation assistance operator entity.

24. The system of claim 13, wherein the processor is further configured for:

receiving a current location of each roadside assistance operator vehicle associated to each provider entity, the current location being determined using a location-enabled module of the operator mobile device, the computer-implemented roadside assistance management system further storing, for each provider entity, the current location of each of the at least one roadside assistance operator vehicle associated to the provider entity; and wherein the set of one or more available provider entities is determined based the provider entity being associated with at least one roadside assistance operator vehicle having a current location within a predetermined distance of the location of the driver mobile device.

* * * * *